(12) United States Patent
Kim et al.

(10) Patent No.: US 10,917,862 B2
(45) Date of Patent: Feb. 9, 2021

(54) METHOD AND APPARATUS FOR PERFORMING AND REPORTING MEASUREMENTS BY USER EQUIPMENT CONFIGURED WITH MULTIPLE CARRIERS IN MOBILE COMMUNICATION SYSTEMS

(71) Applicant: Samsung Electronics Co., Ltd., Gyeonggi-do (KR)

(72) Inventors: Soenghun Kim, Gyeonggi-do (KR); Sangbum Kim, Gyeonggi-do (KR); Jaehyuk Jang, Gyeonggi-do (KR); Kyeongin Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 15/063,348

(22) Filed: Mar. 7, 2016

(65) Prior Publication Data

US 2016/0262118 A1    Sep. 8, 2016

Related U.S. Application Data

(60) Provisional application No. 62/129,524, filed on Mar. 6, 2015.

(51) Int. Cl.
*H04W 52/36*    (2009.01)
*H04W 72/04*    (2009.01)

(52) U.S. Cl.
CPC ................. *H04W 52/365* (2013.01)

(58) Field of Classification Search
None
See application file for complete search history.

(56) References Cited

U.S. PATENT DOCUMENTS

| 10,014,984 | B2 * | 7/2018 | Lee ..................... H04L 5/0001 |
| 2012/0302173 | A1 | 11/2012 | Bostrom et al. |
| 2013/0182658 | A1 | 7/2013 | Xu et al. |

(Continued)

FOREIGN PATENT DOCUMENTS

| CN | 103597757 A | 2/2014 |
| CN | 104067545 A | 9/2014 |

(Continued)

OTHER PUBLICATIONS

International Search Report dated Jun. 29, 2016 in connection with International Application No. PCT/KR2016/002198, 3 pages.

(Continued)

*Primary Examiner* — Kevin C. Harper
*Assistant Examiner* — Derrick V Rose

(57) ABSTRACT

A communication method and system for supporting a high data transmission rate fuse 5G communication systems with IoT technology to transmit data at a high rate after 4G systems. The method for a terminal in a wireless communication system supporting carrier aggregation includes receiving a control message including indication information, the indication information indicating that physical uplink control channel (PUCCH) feedback for at least one secondary cell (SCell) is transmitted on a SCell; identifying whether the SCell is configured to the terminal and is activated; and if the SCell is configured to the terminal and is activated, obtaining Type 2 power headroom information for the SCell.

16 Claims, 41 Drawing Sheets

(56) References Cited

U.S. PATENT DOCUMENTS

| | | | |
|---|---|---|---|
| 2014/0023055 A1 | 1/2014 | Jeong et al. | |
| 2014/0119246 A1* | 5/2014 | Yin | H04W 72/12 370/280 |
| 2014/0321337 A1 | 10/2014 | Kim et al. | |
| 2015/0003418 A1 | 1/2015 | Rosa et al. | |
| 2015/0078286 A1 | 3/2015 | Kim et al. | |
| 2015/0124725 A1* | 5/2015 | Oizumi | H04W 72/04 370/329 |
| 2015/0249980 A1* | 9/2015 | You | H04L 1/1861 370/329 |
| 2016/0255621 A1* | 9/2016 | Wu | H04W 72/0413 370/329 |
| 2016/0323873 A1* | 11/2016 | Takeda | H04L 5/001 |
| 2017/0078984 A1* | 3/2017 | Uemura | H04W 52/34 |

FOREIGN PATENT DOCUMENTS

| | | |
|---|---|---|
| CN | 104396317 A | 3/2015 |
| EP | 2 849 357 A1 | 3/2015 |
| WO | 2013/168917 A1 | 11/2013 |

OTHER PUBLICATIONS

Ericsson, "PUCCH on SCell", 3GPP TSG-RAN WG2 #89, R2-150389, Athens, Greece, Feb. 9-13, 2015, 4 pages.

Huawei, et al., "Support of PUCCH on SCell Based on Dual Connectivity Mechanism", 3GPP TSG RAN WG1 Meeting #80, R1-150067, Athens, Greece, Feb. 9-13, 2015, 4 pages.

Supplementary European Search Report dated Jan. 22, 2018 in connection with European Patent Application No. 16 76 1942.

Intel Corporation, "Considerations for PUCCH on SCell in carrier aggregation", 3GPP TSG RAN WG2 Meeting #89 Feb. 9-13, 2015, 4 pages, R2-150169.

ZTE, "Discussion on the impact for the support of PUCCH on SCell", 3GPP TSG-RAN WG2 meeting #89 Feb. 9-13, 2015, 5 pages, R2-150151.

Alcatel-Lucent et al., "PUCCH on SCell for CA enhancement", 3GPP TSG-RAN WG2 Meeting #80, Feb. 9-13, 2015, 5 pages, R1-150167.

Intel Corporation, "Clarification on Type 2 PH reporting", Change Request, 3GPP TSG-RAN WG2 Meeting #89, Feb. 9-13, 2015, 3 pages, R2-150299.

Communication pursuant to Article 94(3) EPC dated Nov. 26, 2019 in connection with European Patent Application No. 16 761 942.8, 8 pages.

Nokia Corporation, "LTE Carver Aggregation Enhancement Beyond 5 Carriers", Status Report to TSG, 3GPP TSG RAN meeting #67, Mar. 9-12, 2015, RP-150272, 10 pages.

CATT, "Introduction of PUCCH Cell Group", 3GPP TSG RAN WG2 Meeting #89, Feb. 9-13, 2015, R2-150263, 3 pages.

Communication pursuant to Article 94(3) EPC dated Jun. 19, 2020 in connection with European Patent Application No. 16 761 942.8, 8 pages.

Office Action dated Apr. 7, 2020 in connection with Chinese Patent Application No. 201680025020.1, 19 pages.

* cited by examiner

FIG. 7

| $C_7$ | $C_6$ | $C_5$ | $C_4$ | $C_3$ | $C_2$ | $C_1$ | R | |
|---|---|---|---|---|---|---|---|---|
| P | V | \multicolumn{6}{c|}{PH (Type 2, PCell)} | ~710 |
| R | R | \multicolumn{6}{c|}{$P_{CMAX,c}1$} | ~715 |
| P | V | \multicolumn{6}{c|}{PH (Type 2, PSCell)} | ~720 |
| R | R | \multicolumn{6}{c|}{$P_{CMAX,c}2$} | ~725 |
| P | V | \multicolumn{6}{c|}{PH (Type 1, PCell)} | ~730 |
| R | R | \multicolumn{6}{c|}{$P_{CMAX,c}3$} | ~735 |
| P | V | \multicolumn{6}{c|}{PH (Type 1, Serving Cell 1)} | ~740 |
| R | R | \multicolumn{6}{c|}{$P_{CMAX,c}4$} | ~745 |

...

| P | V | PH (Type 1, Serving Cell n) | ~750 |
|---|---|---|---|
| R | R | $P_{CMAX,c}m$ | ~755 |

Row 705 contains: $C_7$, $C_6$, $C_5$, $C_4$, $C_3$, $C_2$, $C_1$, R

FIG. 8

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |

~805

| P | V | PH (Type 2, PCell) | ~810 |
| R | R | $P_{CMAX,c}1$ | ~815 |
| P | V | PH (Type 2, SCell) | ~820 |
| R | R | $P_{CMAX,c}2$ | ~825 |
| P | V | PH (Type 1, PCell) | ~830 |
| R | R | $P_{CMAX,c}3$ | ~835 |
| P | V | PH (Type 1, Serving Cell 1) | ~840 |
| R | R | $P_{CMAX,c}4$ | ~845 |

. . .

| P | V | PH (Type 1, Serving Cell n) | ~850 |
| R | R | $P_{CMAX,c}m$ | ~855 |

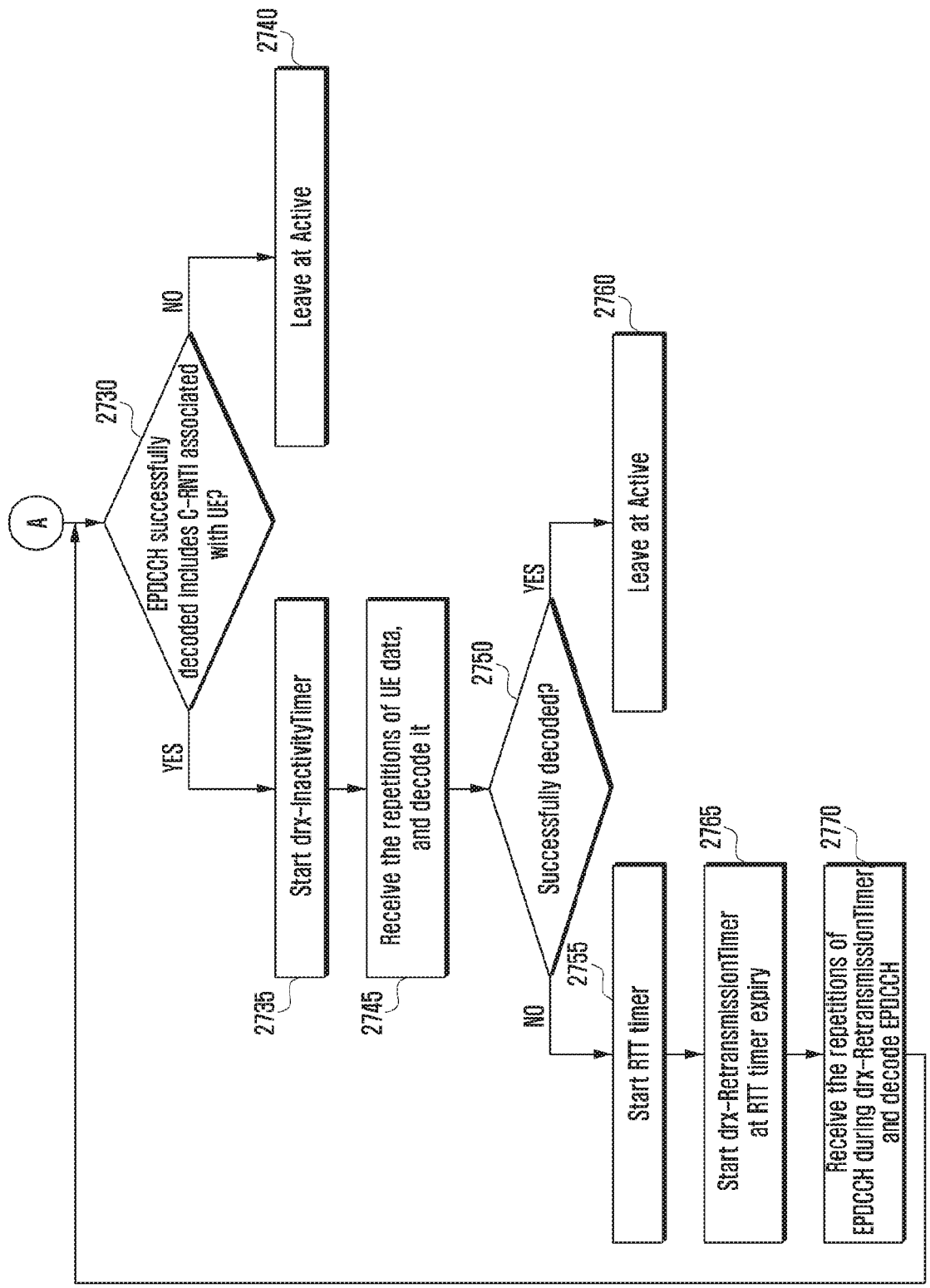

METHOD AND APPARATUS FOR PERFORMING AND REPORTING MEASUREMENTS BY USER EQUIPMENT CONFIGURED WITH MULTIPLE CARRIERS IN MOBILE COMMUNICATION SYSTEMS

CROSS-REFERENCE TO RELATED APPLICATION AND CLAIM OF PRIORITY

The present application is related to and claims benefit under 35 U.S.C. § 119(e) of U.S. Provisional application No. 62/129,524 filed on Mar. 6, 2015 in the U.S. Patent and Trademark Office, the entire disclosure of which is hereby incorporated by reference.

TECHNICAL FIELD

The present disclosure relates to wireless communication systems, and more particularly, to a method and apparatus for performing communication in a system supporting carrier aggregation.

BACKGROUND

Wireless communication systems that were providing voice-based services have evolved to broadband wireless communication systems that are capable of providing packet data services based on high quality and high speed, such as: Long Term Evolution (LTE) or Evolved Universal Terrestrial Radio Access (E-UTRA), LTE-Advanced (LTE-A) or EUTRA Evolution, High Speed Packet Access (HSPA) defined in 3GPP; Ultra Mobile Broadband (UMB), High Rate Packet Data (HRPD) defined 3GPP2; the communication standard IEEE 802.16e; etc. LTE-A refers to systems evolved from LTE. LTE-A further includes functions such as Carrier Aggregation (CA), Higher order Multiple Input Multiple Output (Higher order MIMO), etc. in addition to functions of LTE. In the following description, the terms LTE and LTE-A will be used in the same sense as long as they are specifically indicated.

The LTE and LTE-A systems, as typical examples of the broadband wireless communication systems, employ Orthogonal Frequency Division Multiplexing (OFDM) in the downlink and Single Carrier-Frequency Division Multiple Access (SC-FDMA) in the uplink. The Multiple Access performs allocation and management of time-frequency resources to carry data and control information according to users, so as not to overlap each other, i.e., so as to achieve orthogonality between them, thereby distinguishing data or control information between respective users.

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.' In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beamforming, massive MIMO, Full Dimensional MIMO (FD-MIMO), array antennas, analog beam-forming, large scale antennas, etc. In order to improve system networks for 5G communication systems, various technologies have been developed, e.g.: evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc. In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

Internet has evolved from a human-based connection network, where humans create and consume information to the Internet of Things (IoT) where distributed configurations, such as objects, exchange information with each other to process the information. The technology related to the IoT is starting to be combined with, for example, a technology for processing big data through connection with a cloud server, and this is called an Internet of Everything (IoE) technology. In order to manifest the IoT, various technical components are required, such as, a sensing technology, wired/wireless communication and network infra technology, a service interfacing technology, a security technology, etc. In recent years, a sensor network for connecting objects, Machine to Machine (M2M), Machine Type Communication (MTC), etc. have been researched. Under the IoT environment, intelligent Internet Technology (IT) services may be provided to collect and analyze data obtained from objects connected to each other and thus to create new value for human life. As existing information technologies are fused and combined with various industries, the IoT may also be applied within various fields, such as: smart homes, smart buildings, smart cities, smart cars or connected cars, smart grids, health care, smart home appliances, high quality medical services, etc.

Various attempts have been made to apply 5G communication systems to the IoT network. For example, various technologies related to sensor networks, Machine to Machine (M2M), Machine Type Communication (MTC), etc., have been implemented by beam-forming, MIMO, array antenna, etc., as 5G communication technology. The application of the cloud RAN as a big data processing technology described above may be an example of a hybrid of 5G technology and IoT technology.

SUMMARY

To address the above-discussed deficiencies, it is a primary object to provide at least the advantages described below. Accordingly, the present disclosure provides a method of configuring PUCCH SCell groups and a method of reporting TYPE 2 headroom information regarding PUCCH SCell in a wireless communication system supporting carrier aggregation.

The present disclosure further provides a method of making a measurement report by UE in a wireless communication system supporting carrier aggregation.

The present disclosure further provides a method of activating and deactivating PUCCH SCell in a wireless communication system supporting carrier aggregation.

The present disclosure further provides discontinuous reception (DRX) for machine type communication (MTC) devices.

The present disclosure further provides a method of configuring operation mode (duplex mode) of an unlicensed band, using licensed assisted access (LAA) in a wireless communication system supporting carrier aggregation.

In accordance with an aspect of the present disclosure, a method by a terminal in a wireless communication system supporting carrier aggregation is provided. The method includes: receiving a control message including indication information, the indication information indicating that physical uplink control channel (PUCCH) feedback for at least one secondary cell (SCell) is transmitted on a SCell; identifying whether the SCell is configured to the terminal and is activated; and if the SCell is configured to the terminal and is activated, obtaining Type 2 power headroom information for the SCell.

In accordance with another aspect of the present disclosure, a method by a base station in a wireless communication system supporting carrier aggregation is provided: The method includes: transmitting to a terminal a control message including indication information, the indication information indicating that physical uplink control channel (PUCCH) feedback for at least one secondary cell (SCell) is transmitted on a SCell; and receiving from the terminal a message including Type 2 power headroom information for the SCell, wherein the Type 2 power headroom information is included in the message if the SCell is configured to the terminal and is activated.

In accordance with another aspect of the present disclosure, a terminal in a wireless communication system supporting carrier aggregation is provided. The terminal includes: a transceiver for transmitting/receiving signals; and a controller configured to control a reception of a control message including indication information, the indication information indicating that physical uplink control channel (PUCCH) feedback for at least one secondary cell (SCell) is transmitted on a SCell, identify whether the SCell is configured to the terminal and is activated, if the SCell is configured to the terminal and is activated, obtain Type 2 power headroom information for the SCell.

In accordance with another aspect of the present disclosure, a base station in a wireless communication system supporting carrier aggregation is provided. The base station includes: a transceiver for transmitting/receiving signals; and a controller configured to: transmit to a terminal a control message including indication information, the indication information indicating that physical uplink control channel (PUCCH) feedback for at least one secondary cell (SCell) is transmitted on a SCell; and receive from the terminal a message including Type 2 power headroom information for the SCell, wherein the Type 2 power headroom information is included in the message if the SCell is configured to the terminal and is activated.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS disclosure For a more complete understanding of the present disclosure and its advantages, reference is now made to the following description taken in conjunction with the accompanying drawings, in which like reference numerals represent like parts:

FIG. 7 illustrates a first PHR format according to a first embodiment of the present disclosure;

FIG. 8 illustrates a second PHR format according to a first embodiment of the present disclosure;

FIGS. 27A and 27B are flow diagrams that describe an example of the operation of UE operations of UE according to a fourth embodiment of the present disclosure;

DETAILED DESCRIPTION

Figure 1:
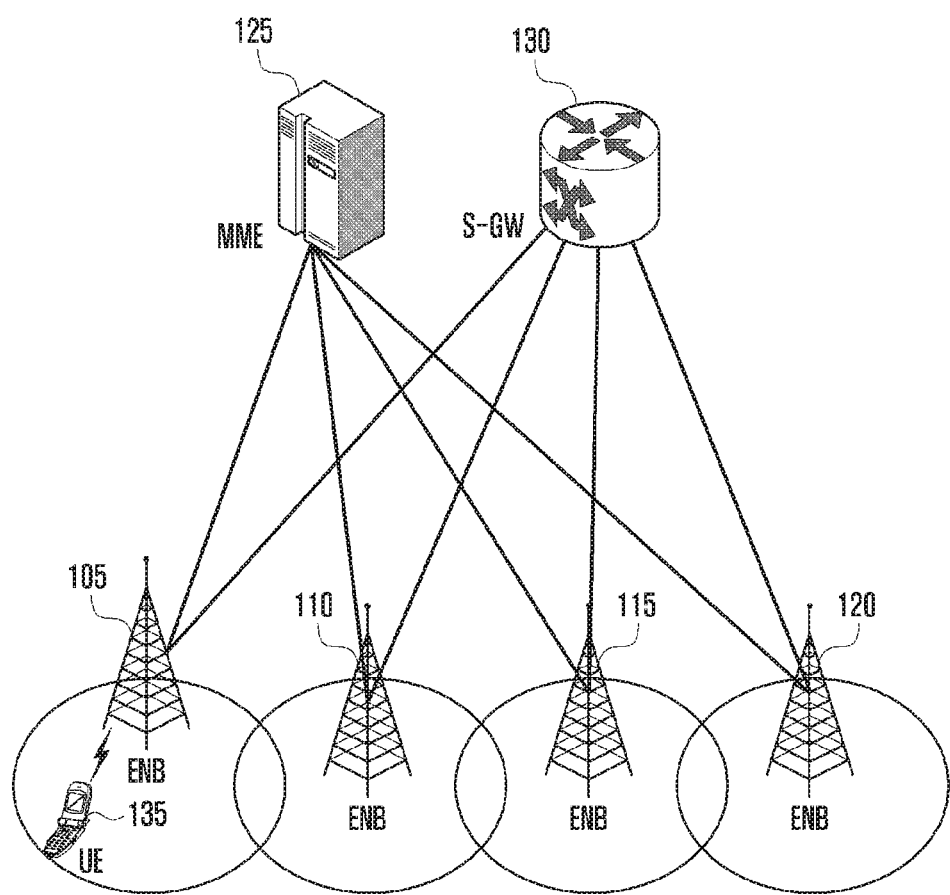
FIG. 1 illustrates a configuration of an LTE system according to the present disclosure.

FIGS. 1 through 40, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure are described in detail with reference to the accompanying drawings. The same reference numbers are used throughout the drawings to refer to the same or similar parts. Detailed descriptions of well-known functions and structures incorporated herein may be omitted to avoid obscuring the subject matter of the disclosure.

In the following description, part of the embodiments of the present disclosure will be described based on Advanced E-UTRA (also called LTE-A) supporting carrier aggregation; however, it will be appreciated to those skilled in the art that the subject matter of the present disclosure can also be applied to various types of communication systems which have the technical background and channel forms similar to those of the present disclosure, without departing from the scope and sprit of the present disclosure. For example, the subject matter of the present disclosure may be applied to multicarrier HSPA supporting carrier aggregation.

In the following description, certain detailed explanations of related art are omitted when it is deemed that they may unnecessarily obscure the essence of the disclosure.

Although the drawings represent embodiments of the present disclosure, they are not necessarily to scale and certain features may be exaggerated or omitted in order to better illustrate and explain the present disclosure. The same reference numbers are used throughout the drawings to refer to the same or similar parts.

The features and advantages of the present disclosure and the method to achieve them will become more apparent from the following detailed description in conjunction with the accompanying drawings. It will be easily appreciated to those skilled in the art that various modifications, additions and substitutions are possible from the embodiments of the disclosure that are illustrated and described in detail in the following description, and the scope of the disclosure should not be limited to the following embodiments. The embodiments of the present disclosure are provided such that those skilled in the art completely understand the disclosure. It should be understood that the disclosure may include all modifications and/or equivalents and/or substations included in the idea and technical scope of the present disclosure. In the drawings, the same or similar elements are denoted by the same reference numbers even though they are depicted in different drawings.

In addition, it should be understood that the processes, operations of the flow diagrams and a combination thereof can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flow diagram. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow diagram therein. In addition, since the computer programming instructions can also be installed to computers or data processing equipment that can be programmed, they can create processes that perform a series of operations therein, described in the blocks of the flow diagram therein.

The blocks of the flow diagram refer to part of codes, segments or modules that include one or more executable instructions to perform one or more logic functions. It should be noted that the functions described in the blocks of the flow diagram may be performed in a different order from the embodiments described above. For example, the functions described in two adjacent blocks may be performed at the same time or in reverse order.

In the embodiments, the terminology '~unit' representing a component refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

The present disclosure is described in detail below, referring to the accompanying drawings.

Referring to FIG. 1, the configuration of an LTE system according to the present disclosure is described.

The LTE system configures the wireless access network, including evolved Node Bs (called ENBs, Node Bs or base stations) 105, 110, 115, and 120, a Mobility Management Entity (MME) 125, and a Serving-Gateway (S-GW) 130. User equipment (called UE or terminal) 135 is connected to an external network via the ENB 105, 110, 115 and 120 and the S-GW 130.

As shown in FIG. 1, ENBs 105, 110, 115 and 120 correspond to conventional Node B of the Universal Mobile Telecommunication System (UMTS). ENBs 105 to 120 are connected to UE 135 via wireless channels, performing more complicated functions than conventional Node B.

In LTE system, since real-time services such as a Voice over IP (VoIP) service and all user traffics are serviced via shared channels, devices are required to collect information regarding states, such as buffer states of UE devices, available transmission power states, channel states, etc., and to make a schedule. These tasks are performed via ENBs 105 to 120. One ENB 105, 110, 115 or 120 is capable of controlling a plurality of cells. In order to implement a high speed transmission rate, LTE systems employ Orthogonal Frequency Division Multiplexing (OFDM) as a wireless access technology, at a bandwidth of 20 MHz. ENB 105, 110, 115 and 120 also employ Adaptive Modulation & Coding (AMC) to determine modulation scheme and channel coding rate, meeting with the channel state of UE 135.

The S-GW 130 is a device that provides data bearers. The S-GW 130 establishes or removes data bearers according to the control of MME 125. The MME 125 manages the mobility of UE 135 and controls a variety of functions. The MME 125 connects to a plurality of ENBs.

Figure 2:
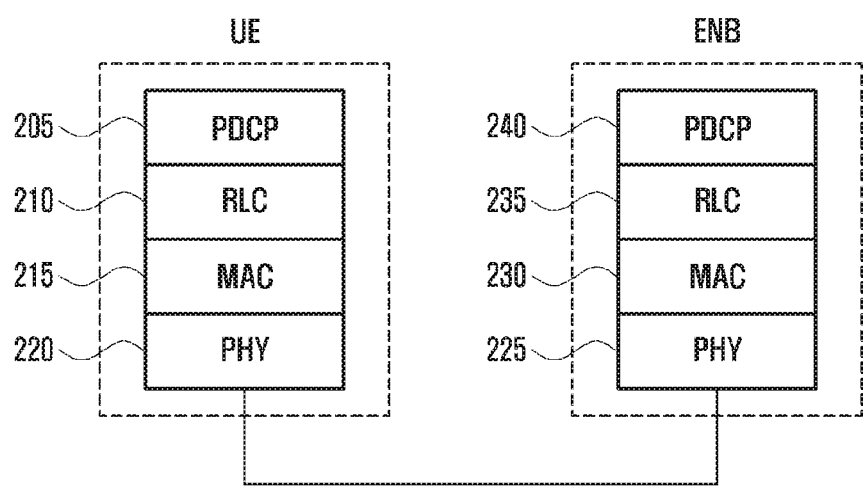
FIG. 2 illustrates a radio protocol stack in an LTE system according to the present disclosure.

FIG. 2 is a diagram of a radio protocol stack in an LTE system according to the present disclosure.

Referring to FIG. 2, in the radio protocol of an LTE system, UE and ENB have Packet Data Convergence Protocol (PDCP) 205 and 240, Radio Link Control (RLC) 210 and 235, and Medium Access Control (MAC) 215 and 230, respectively.

PDCP 205 and 240 perform compression/decompression of Internet Protocol (IP) header. RLC 210 and 235 reconfigure PDCP packet data unit (PDU) in proper size and perform Automatic Repeat reQuest (ARQ).

MAC 215 and 230 connect to a number of RLC layer devices included in one UE device. MAC 215 and 230 multiplex RLC PUDs to MAC PDU and de-multiplex RLC PDUs from MAC PDU. Physical layers (PHY) 220 and 225 channel-code and modulate data from the upper layers, create OFDM symbols, and transmit the symbols via a radio channel. In addition, PHY 220 and 225 demodulate and channel-decode OFDM symbols transmitted via a radio channel, and transfer the symbols to the upper layers.

Figure 3:
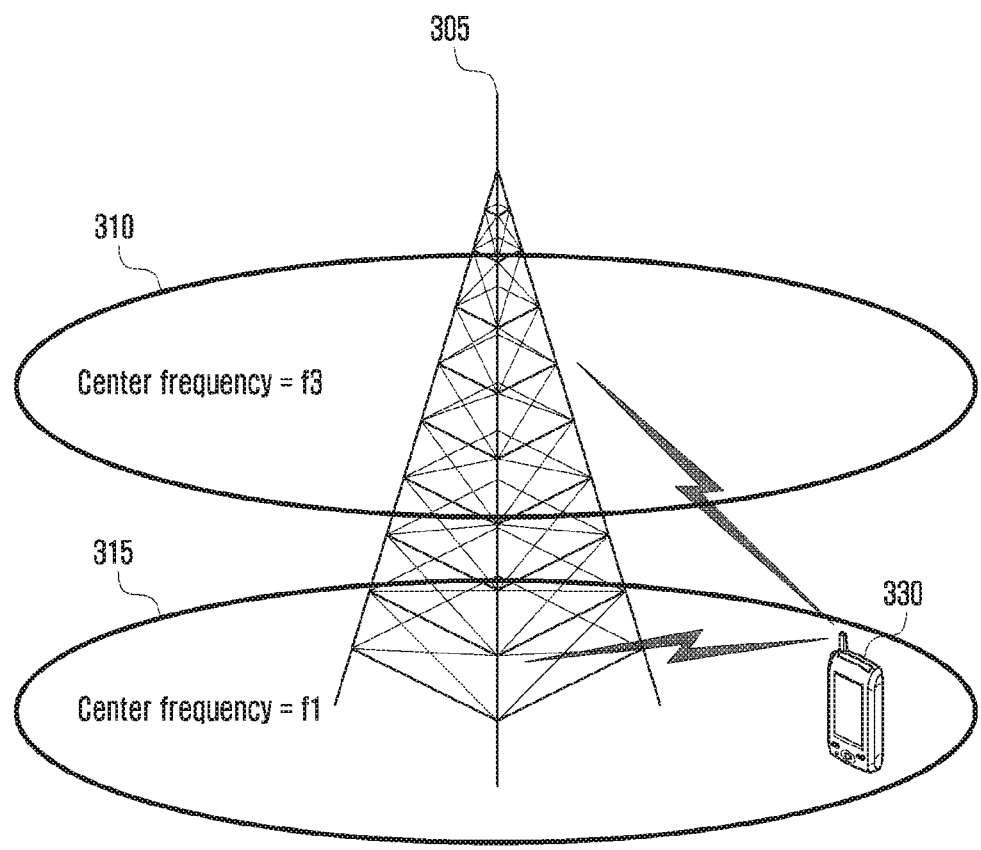
FIG. 3 illustrates intra-ENB carrier aggregation in an LTE system according to various embodiments of the present disclosure.

FIG. 3 is a diagram that describes an intra-ENB carrier aggregation in an LTE system according to various embodiments of the present disclosure.

Referring to FIG. 3, one ENB broadcasts/receives multi-carriers over frequency bands. For example, when an ENB 305 broadcasts a forward carrier 315 of center frequency f1 and a forward carrier 310 of center frequency f3, conventional art allows one UE device to transmit/receive data via one of the two carriers.

However, UE capable of performing carrier aggregation is capable of simultaneously transmitting/receiving data using a number of carriers. ENB 305 allocates more carriers to UE 330 capable of performing carrier aggregation according to the conditions, so that the UE 330 can increase the data transmission rate. As such, the process of aggregating uplink carriers and a forward carrier that one ENB broadcasts/receives is referred to as 'intra-ENB carrier aggregation.' However, according to circumstances, in contrast with the embodiment of FIG. 3, a process can be needed for aggregating uplink carriers and forward carriers broadcast/received by ENBs that differ from each other.

When one cell is configured with one forward carrier broadcast by one ENB and one uplink carrier received by the ENB, the term 'carrier aggregation' can be used in the sense that UE simultaneously transmits/receives data through a number of cells. In that case, the maximum transmission rate and the number of aggregated carriers are correlated positively.

In the following embodiments of the present disclosure, a 'process that UE receives data through a forward carrier or transmits data through a forward uplink carrier' is identical to a 'process that UE transmits/receive data using control channel and data channel provided by a cell corresponding to a center frequency and frequency band characterizing the carrier.' In the embodiments of the present disclosure, 'carrier aggregation' is expressed such as 'a plurality of serving cells are configured,' in which the terms, Primary serving Cell (PCell) and Secondary serving Cell (SCell), or activated serving cell, etc., will be used. These terms have the same sense as used in LTE mobile communication system. In the embodiments of the present disclosure, the term 'carrier,' 'component carrier,' 'serving cell,' etc. can be used in the same sense.

Figure 4:
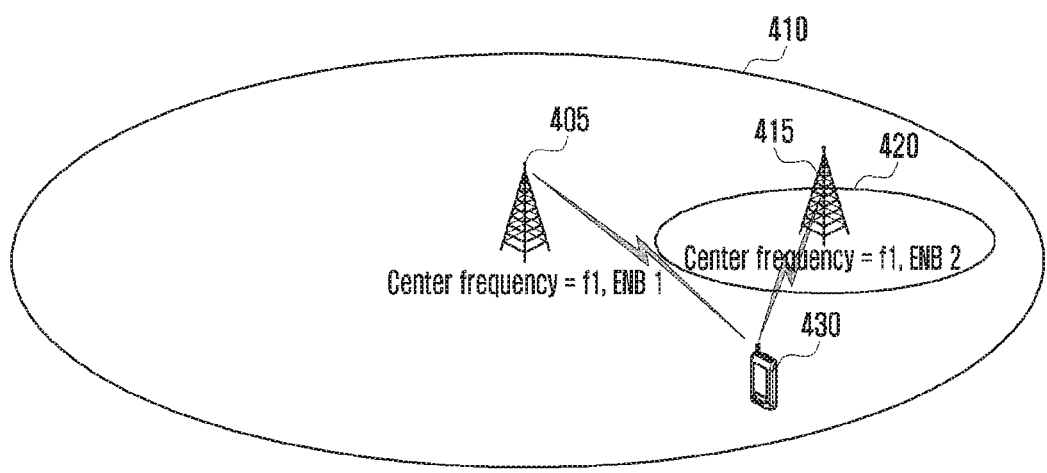
FIG. 4 illustrates inter-ENB carrier aggregation in an LTE system according to various embodiments of the present disclosure.

FIG. 4 is a diagram that describes inter-ENB carrier aggregation in an LTE system according to various embodiments of the present disclosure.

Referring to FIG. 4, ENB 1 (reference number 405) broadcasts/receives a carrier of center frequency f1 and ENB 2 (reference number 415) broadcasts/receives a carrier of center frequency f2. When UE 430 aggregates the forward carrier of center frequency f1 and forward carrier of center frequency f2, this leads to a result that one UE device aggregates carriers that two or more ENBs broadcast/receive. This approach is called 'inter-ENB carrier aggregation (CA)' in the embodiments of the present disclosure. The 'inter-ENB CA' is also referred to as 'Dual Connectivity (DC)' in the embodiments of the present disclosure.

For example, configuration of DC can be used in the sense of configuration of: inter-ENB carrier aggregation; one or more cell groups; Secondary Cell Group (SCG); at least one Secondary Cell (SCell) under the control of an ENB that is not a serving ENB; primary SCell (PSCell); MAC entity for a serving ENB (SENB); two MAC entities to UE; etc.

In the embodiments of the present disclosure, a set of serving cells controlled by the same ENB is defined as a 'Cell Group' or 'Carrier Group' abbreviated as 'CG.' The CG is divided into 'Master Cell Group (MCG)' and 'Secondary Cell Group (SCG).'

The MCG is a set of serving cells that is controlled by an ENB controlling PCell, or Master ENB (MENB). The SCG is a set of serving cells that is controlled by an ENB controlling only SCells, or Slave ENB (SENB), not MENB. ENB is capable of informing UE whether a specific serving cell is MCG or SCG in the process of configuring the serving cell.

One UE device can configure one MSG and one or more SCGs. For the sake of convenience, although the embodiments of the present disclosure are described in such a way that one SCG is configured in one UE device, it should be understood that the present disclosure is not limited to the embodiments. For example, the embodiments can be modified in such a way that one or more SCGs are configured in one UE device. The terms 'PCell' and SCell' are used to refer to types of serving cells. There are differences between PCell and SCell: for example, PCell remains an activated state and SCell is capable of repeating between activated and deactivated states according to, for example, an instruction of ENB. PCells serves as a primary serving cell that primarily controls mobility of UE, and SCell serves as a secondary serving cell that performs transmission/reception of data. In the embodiments of the present disclosure, PCell and SCell are referred to as those defined in LTE specification 36.331 or 36.321, and the like.

Since the reverse transmission causes interferences in the reverse transmission of other cell, the reverse transmission power needs to be maintained in a proper level. To this end, UE calculates reverse transmission power using a function and perform reverse transmission with the calculated reverse transmission power. For example, UE: calculates a required reverse transmission power value as the UE inputs, to the function, scheduling information, such as a level of Modulation Coding Scheme (MCS) to be applied, the amount of allocated transmission resources, etc., and input values used for estimating a channel status, such as a pathway loss value, etc.; and performs the reverse transmission by applying the calculated, required reverse transmission power value thereto. The reverse transmission output value that UE can apply is limited by the maximum transmission value of UE. When the calculated, required reverse transmission power value is greater than the maximum transmission value of UE, the UE performs the reverse transmission by applying the maximum transmission value thereto. In this case, since the UE cannot apply a sufficient amount of reverse transmission power to the reverse transmission, the quality of reverse transmission can be aged. It is preferable that ENBs need to make a schedule so that the required transmission power does not exceed the maximum transmission power value. However, since ENBs do not detect several parameters such as pathway loss, etc., UE transmits its Power Headroom Report (PHR) MAC control information to the ENB, thereby reporting its Power Headroom (PH) information to the ENB.

PH is divided into Type 1 PH and Type 2 PH. Type 1 PH refers to a difference between the maximum transmission power of UE, defined according to serving cells, PCMAX,c and the transmission power required for PUSCH transmission. Type 2 PH refers to a difference between the maximum transmission power of UE PCMAX,c and the transmission power required for PUCCH transmission and PUSCH transmission, which are defined in the specification 36.213.

First Embodiment

As mobile communication systems are evolved, the number of carriers which can be aggregated to one mobile device also increases. In particular, the number of aggregated carriers per mobile device is up to maximum 32 in a high level of development of carrier aggregation (CA) aiming at commercialization around 2017. As the number of aggregated carriers increases, the required capacity of Physical Uplink Control Channel (PUCCH; refer to specification 36.213) also increases. According to the current specification, PUCCH needs to be set in only a PCell and a PSCell, and this limits the increase in the capacity of PUCCH.

In order to resolve the problems, the first embodiment of the present disclosure provides a method of configuring PUCCH in a general SCell as well as in a PCell and a PSCell. In addition, the first embodiment of the present disclosure provides a method of defining: new PUCCH SCell type 2 PH, so that UE can report power headroom (PH) to the ENB, along with the information related to a PUCCH, and of determining whether PUCCH SCell type 2 PH is contained. The present disclosure also provides a new PHR format.

Figure 5:
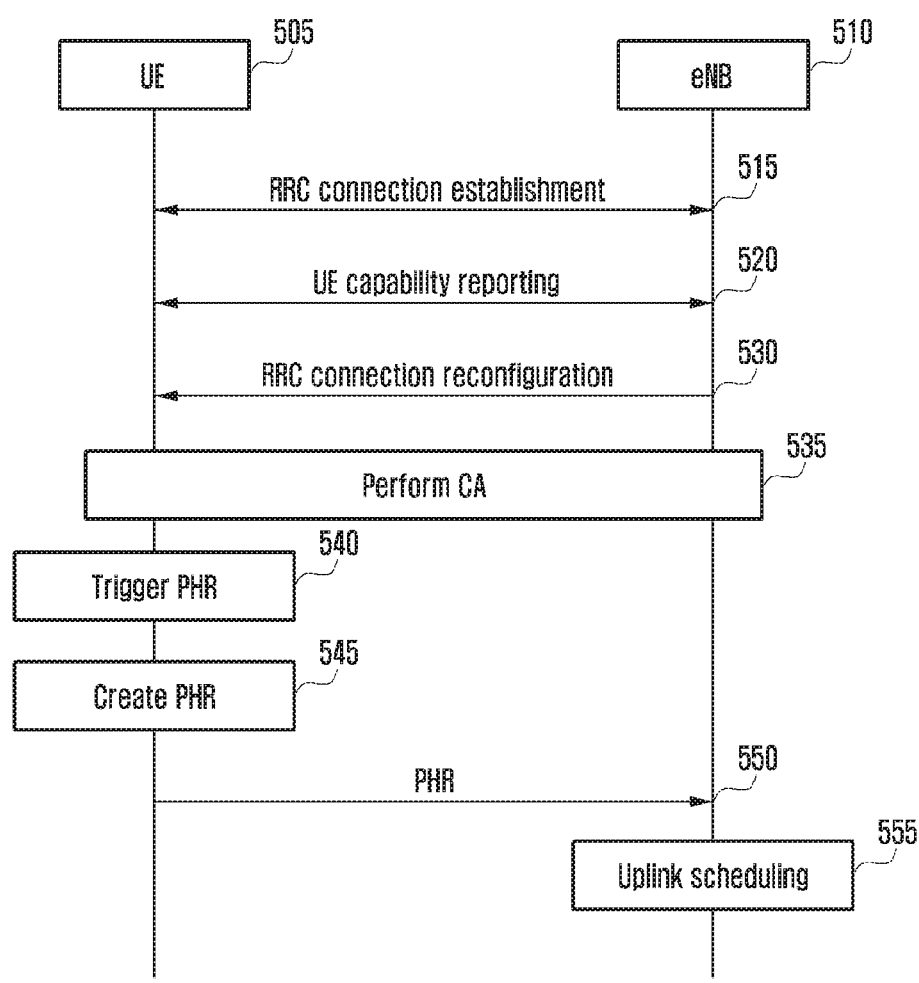
FIG. 5 illustrates a method of performing power headroom report (PHR) according to a first embodiment of the present disclosure.

FIG. 5 is a flow diagram of a method of performing power headroom report (PHR) according to a first embodiment of the present disclosure.

In a mobile communication system configured with a number of carriers and cells, ENB 510 and UE 505, the UE 505 configures RRC connection with the ENB 510 via a serving cell in operation 515. RRC connection can refer to a process of establishing a signaling bear capable of transmission/reception of RRC control messages and a process for an ENB 510 to create an RRC context for UE 515, and is defined in the specification 36.331.

Before performing normal communication with the UE 515, the ENB 510 performs a capability reporting procedure with the UE in order to obtain information regarding the capability of UE in operation 520. The capability reporting procedure includes a process for ENB 510 to transmit a capability enquiry message UECapabilityEnquiry to UE 515 and a process for the UE 505 to transmit the capability information message UECapabilityInformation to the ENB 510. Through the process, the UE 505 is capable of reporting, to the ENB 510, the CA capability, e.g., a combination of bands supporting CA, the number of serving cells supportable according to a combination of bands, etc.

The ENB 510 is capable of configuring a new SCell to the UE based on the received information in operation 530. The ENB 510 transmits, to the UE 505, an RRC connection reconfiguration message containing the SCell configuration information, thereby initiating the SCell configuration process. One control message can include a number of SCell configuration information items. The SCell configuration information includes an identifier of a corresponding SCell, the center frequency of downlink specifying a SCell, information regarding a radio transmission resource, etc. SCell can include only downlink or both downlink and uplink. When a SCell includes an uplink as well as downlink, the SCell configuration information includes information regarding downlink and information specifying the uplink. The ENB 510 is capable of configuring PUCCH in one or more SCells. In the following description, SCell configured with PUCCH is called a PUCCH SCell.

In configuring a PUCCH SCell, the ENB 510 is capable of transmitting the information regarding PUCCH SCell group configuration to the UE 505. A PUCCH SCell can include one PUCCH SCell and general SCell of n (n is 0 or positive integer).

CSI and HARQ feedback, etc. of SCells that belonged to the same PUCCH SCell group are transmitted via a PUCCH SCell of a corresponding cell group. SCell configuration information or a control message containing SCell configuration information can include information indicating a cell group that an SCell and a PUCCH SCell belong to together. HARQ feedback and CSI can be transmitted, via a PUCCH of a PCell, an SCell which is not connected with any PUCCH SCell (i.e., SCell to which information specifying a cell group or information specifying a connected PUCCH SCell is not signaled).

ENB 510 can configure dual connectivity to UE 505. In this case, the ENB is capable of transmitting SCG configuration information to the UE. The SCG configuration information is described in the specification 36.331.

When the SCell configuration has been completed, UE 505 is capable of performing a CA process by using the configured SCell in operation 535. For example, when UE 505 receives a Downlink assignment or an Uplink grant for an SCell, it performs the reception of downlink data or the transmission of uplink data in a corresponding SCell.

When UE 505 ascertains that an event occurred, it is capable of triggering a PHR in operation 540. The conditions for triggering a PHR will be described later.

UE 540 is capable of: determining the size of bitmap to be included in a PHR by using a method which will be described later; recognizing an SCell corresponding to each bit; and marking, on the bitmap, a condition as to whether to include PH of a corresponding SCell in the PHR. UE 540 is also capable of determining whether to include Type2 PH for a SCell in the PHR, by using a method which will be described later. In addition, UE 540 is capable of creating: a bitmap, Type 2 PH, Type 1 PH, etc.; and a PHR containing them in operation 545.

UE 505 is capable of transmitting the created PHR to the ENB 510 in operation 550.

The ENB 510 performs an uplink scheduling so that a lack of reverse transmission power does not arise in the UE 505, referring to the PH information contained in the PHR, in operation 555.

Figure 6:
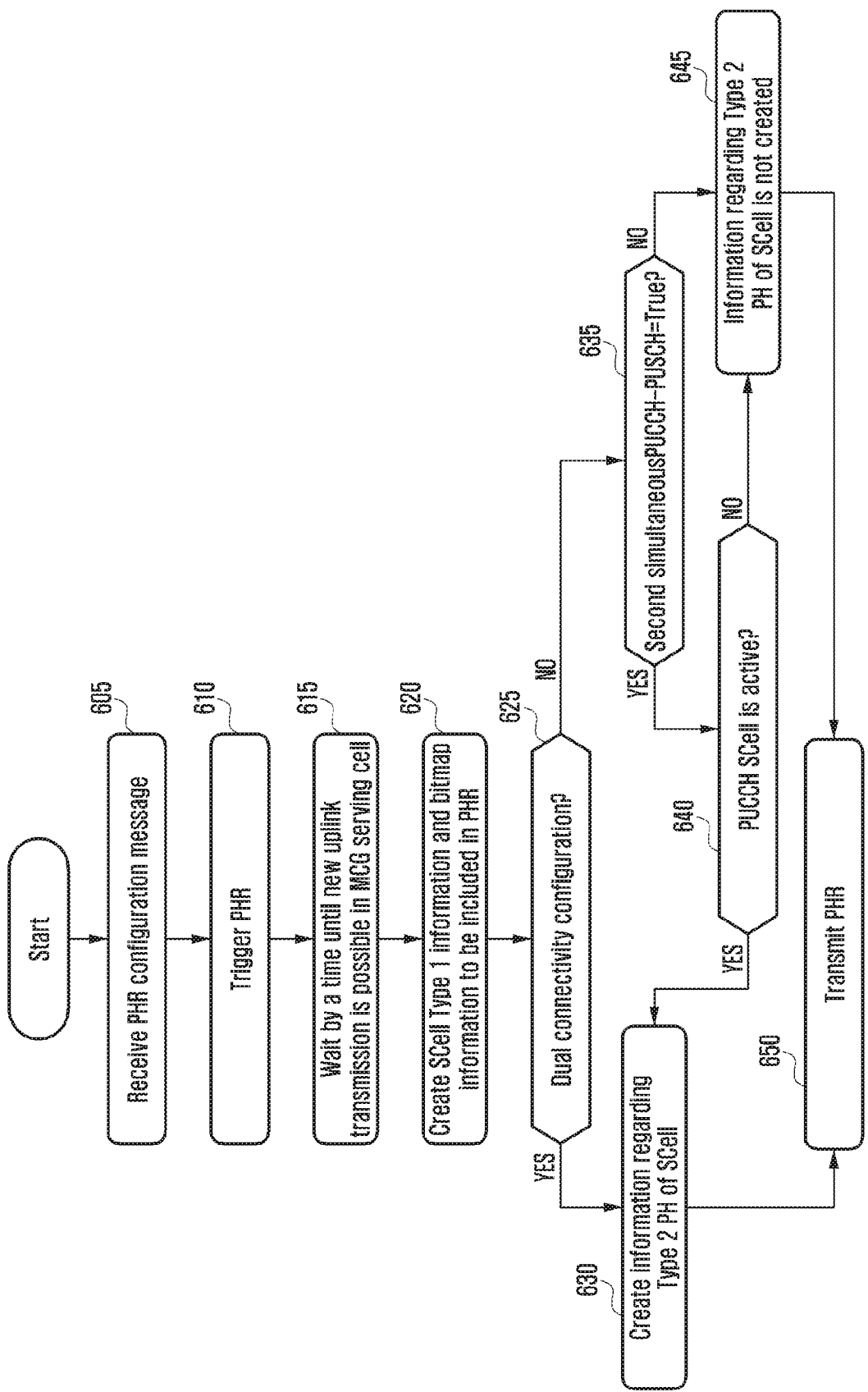
FIG. 6 illustrates a method for UE to perform power headroom report (PHR) according to a first embodiment of the present disclosure.

FIG. 6 is a flow diagram of a method for UE 505 to perform power headroom report (PHR) according to a first embodiment of the present disclosure.

UE receives a control message related to PHR configuration of MENB in operation 605. The control message can include PHR configuration information and information regarding a condition as to whether to perform simultaneous transmission of PUCCH-PUSCH. The indicator regarding a condition as to whether to perform simultaneous transmission of PUCCH-PUSCH, simultaneousPUCCH-PUSCH, can be individually set with respective to a PCell and PUCCH SCell. The simultaneousPUCCH-PUSCH for a PCell (hereafter called a first simultaneousPUCCH-PUSCH) and the simultaneousPUCCH-PUSCH for a PUCCH SCell (hereafter called a second simultaneousPUCCH-PUSCH) can have values that differ from each other.

The PHR configuration information can include information indicating a condition as to whether to report SCell PH, bitmap mapping information (described later), dl-Pathloss-Change information, etc.

PHR can be triggered according to the presence of an event in operation 610. The event triggering PHR can include at least one of the following:
   A change in downlink pathway loss in a SCell is greater than dl-PathlossChange (configured by ENB)
   Activation of an SCell with configured uplink)
   Expiration of a periodic PHR timer, periodicPHR-Timer UE is capable of waiting until a time that MCG uplink transmission is possible arrives, e.g., until uplink grant for MCG serving cell is allocated in operation 615.

UE is capable of calculating Type 1 PHs of SCells currently activated to create information regarding SCell type 1 PH in operation 620. UE is capable of creating information indicating SCells of which PH is reported, as bitmap information, in the PHR. The bitmap information will be described later.

UE proceeds with operation 625 in order to determine whether it includes Type 2 PH for a SCell.

UE determines whether dual connectivity is configured in operation 625. Configuring dual connectivity refers to the sense that: MCG and SCG are configured in UE and PUCCH is transmitted from PSCell of the SCG. When dual connectivity is configured, Type 2 PH of PSCell is important information to an MENB from the point of view of an uplink scheduling process. Therefore, the Type 2 PH of PSCell needs to be included in all PHR transmitted to the MENB regardless of the simultaneousPUCCH-PUSCH configuration for a PSCell. That is, when dual connectivity is configured, UE is capable of creating Type 2 PH of an SCell to create information regarding the SCell Type 2 PH in operation 630. In this case, the SCell is a PSCell.

On the other hand, when dual connectivity is not configured, UE checks whether a second simultaneousPUCCH-PUSCH is configured in operation 635. When a second simultaneousPUCCH-PUSCH is not configured in operation 635, UE proceeds with operation 645. When a second simultaneousPUCCH-PUSCH is configured in operation 635, UE proceeds with operation 640. Proceeding with operation 640 refers to the sense of configuration set to report Type 2 PH for a PUCCH SCell. However, when PUCCH SCell is deactivated, since the inaccuracy of PH information is generated due to a low degree of precision in pathway loss measurement exists and transmission/reception of data via a PUCCH SCell is not performed, the need for PH information is very low and thus PH reporting can deteriorate the scheduling efficiency. Therefore, UE checks whether PUCCH SCell is activated in operation 640. When PUCCH SCell is activated, UE creates Type 2 PH of an Scell in operation 630. On the other hand, when PUCCH SCell is not activated, UE proceeds with operation 645. UE is capable of calculating Type 2 PH of an SCell to create information regarding SCell Type 2 PH in operation 630. In this case, the SCell is PUCCH SCell from among the SCells that belonged to MCG, for example.

UE skips a process of calculating Type2 PH of SCell and does not create information regarding Type 2 PH of SCell in operation 645.

UE is capable of connecting a bitmap, Type 1 PH, Type 2 PH, etc., to each in a preset order to create a PHR and transmitting it to an MENB in operation 650.

UE, transmitting PUCCH to one or more serving cells, is capable of using one of the two PHR formats. A PHR format to be used can be: clearly specified by an ENB; or selected considering the current configuration of the UE in operation 530 shown in FIG. 5. When dual connectivity is set in UE, the UE uses the first format. When n or more serving cells are set in UE, UE is capable of using the second format. An example of the first format is shown in FIG. 7 and an example of the second format is shown in FIG. 8.

Each of the two PHRs can include fields of a bitmap, Type 2 PH, Type 1 PH, and PCMAX,c. The bitmap 705 of the first format used in UE where dual connectivity is set can have a fixed size of 1 byte. The bitmap 805 of the second format used in UE where PUCCH SCell is set can have a variable size of 1~4 bytes.

The bits of the bitmap correspond one-to-one to SCells, respectively. When a corresponding bit has a value (e.g., one), it indicates that Type 1 PH of a corresponding SCell is included in the PHR (or reported via the PHR). When a corresponding bit has another value (e.g., zero), it indicates that Type 1 PH of a corresponding SCell is not included in the PHR (or not reported via the PHR).

When the i+1st bit of a bitmap is Ci, the Ci can be mapped to a SCell by the following two methods.

[Method 1 of Mapping Ci and SCell]

When an SCell with an identifier i from among the SCells set in UE is represented by SCell i, Ci can correspond one-to-one to the SCell i. For example, SCell 1 can correspond to C1 and SCell 2 can correspond to C2. C0 may not be used.

The SCell identifier is allocated by ENB using an RRC control message.

[Method 2 of Mapping Ci and SCell]

When SCells configured with uplinks from among the SCells set in UE are arranged in order from the lower SCell identifier, the SCell with the lowest identifier can correspond to C1 (or C0); the SCell with the second lowest identifier can correspond to C2 (or C1); and the SCell with the nth low identifier corresponds to Cn (or Cn−1). For example, in a state where SCell 1~SCell 10 are set in UE, when SCell 1, SCell 3, and SCell 9 are configured with uplinks, C1 (or C0) corresponds to SCell 1; C2 (or C1) corresponds to SCell 3; and C3 (or C2) corresponds to SCell 9.

When UE selects one of the two mapping methods, it can use an explicit method or implicit method. The explicit method is described as follows. In a process for ENB to configure a PHR in UE, when the ENB signals to the UE along with control information indicating the UE to use method 2 of mapping between Ci and SCell, e.g., when ENB transmits an explicit indicator to the UE in operation 530 shown in FIG. 5, the UE matches Ci with SCell using the method 2. When ENB does not transmit an explicit indicator to the UE in operation 530, the UE can match Ci with SCell using the method 1. The explicit indicator can be an indicator indicating UE to use, for example, Format 2.

The implicit method is described as follows. UE is capable of selecting the mapping method 1 or 2 based on the number of SCells configured to the UE. When the number of SCells configured to UE is less than or equal to n (e.g., n=7), UE is capable of using the mapping method 1. When the number of SCells configured to UE is greater than n, UE is capable of using the mapping method 2. Alternatively, when Format 1 is used, UE uses the mapping method 1. When Format 2 is used, UE is capable of using the mapping method 2.

For example, UE creates Format 1 PHR in the following sequence and ENB is capable of analyzing the Format 1 PHR according to the following sequence.

The bitmap 705 of Format 1 has a fixed size of 1 byte. In the bitmap, C0 is not used; and C1~C7 correspond one-to-one to SCell 1~SCell 7, respectively.

From the next bytes in the bitmap, Type 2 PH of a PCell (710), PCMAX,c (715) used in calculating PCell Type 2 PH, Type 2 PH of PSCell (720), and PCMAX,c (725) used in calculating PSCell Type 2 PH are located. A condition as to whether the Type 2 PH of PSCell (710) and PCMAX,c (715) used in calculating PCell Type 2 PH are included is determined according to a condition as to whether the simultaneousPUCCH-PUSCH is configured with respect to PCell. Type 2 PH (720) of PSCell always exists. PCMAX,c (725) used in calculating PSCell Type 2 PH is included when PSCell Type 2 PH is calculated for the transmission of real PUCCH. However, PCMAX,c (725) may not be included when reference PUCCH format is calculated, instead of calculating the transmission of real PUCCH.

After fields related to the Type 2 PH, Type 1 PH (730) of PCell can be included, and PCMAX,c (735) used for the Type 1 PH can also optionally be included.

Type 1 PH of SCells where a corresponding bit is set to 1 and PCMAX,c can be included in order in the bitmap.

For example, UE is capable of creating Format 2 PHR in the following sequence, and ENB is capable of analyzing the Format 2 PHR according to the following sequence.

The bitmap 805 of Format 2 has a variable size of 1~4 bytes. C0 is not used; and C1~Cn corresponds one-to-one to SCells by using the mapping method 2. The bitmap size can be determined by the number of serving cells configured with uplinks from among the serving cells configured in UE. When the number of serving cells configured with uplinks is n, the bitmap size can be determined by the following equation.

Bitmap size=f(n/8), where f(x) is a function that: if x integer, it returns x; and if x is not integer, it returns an integer which is greater than x but closest to x.

From the next bytes in the bitmap, the individual fields can be contained in the following sequence. Each of the following fields can have a size of 6 bits and each field can be included in one byte.

Type 2 PH (810) of PCell: It is contained, when simultaneousPUCCH-PUSCH for PCell is configured PCMAX,c (815) used in calculating PCell Type 2 PH: It is contained, when PCell Type 2 PH is calculated based on the transmission of real PUCCH Type 2 PH (820) of SCell: It is contained, when simultaneousPUCCH-PUSCH for SCell is configured and a corresponding SCell is activated PCMAX,c (825) used in calculating SCell Type 2 PH: It can be contained, when SCell Type 2 PH is calculated based on the transmission of real PUCCH When a number of PUCHC SCells are configured in UE, a number of SCell Type 2 PH can be contained. In this case, UE contains SCell Type 2 PH in the sequence of identifiers of PUCCH SCell.

Type 1 PH (840) of PCell and PCMAX,c (845)

Type 1 PH of SCell and PCMAX,c in the sequence of SCell identifiers.

Figure 9:
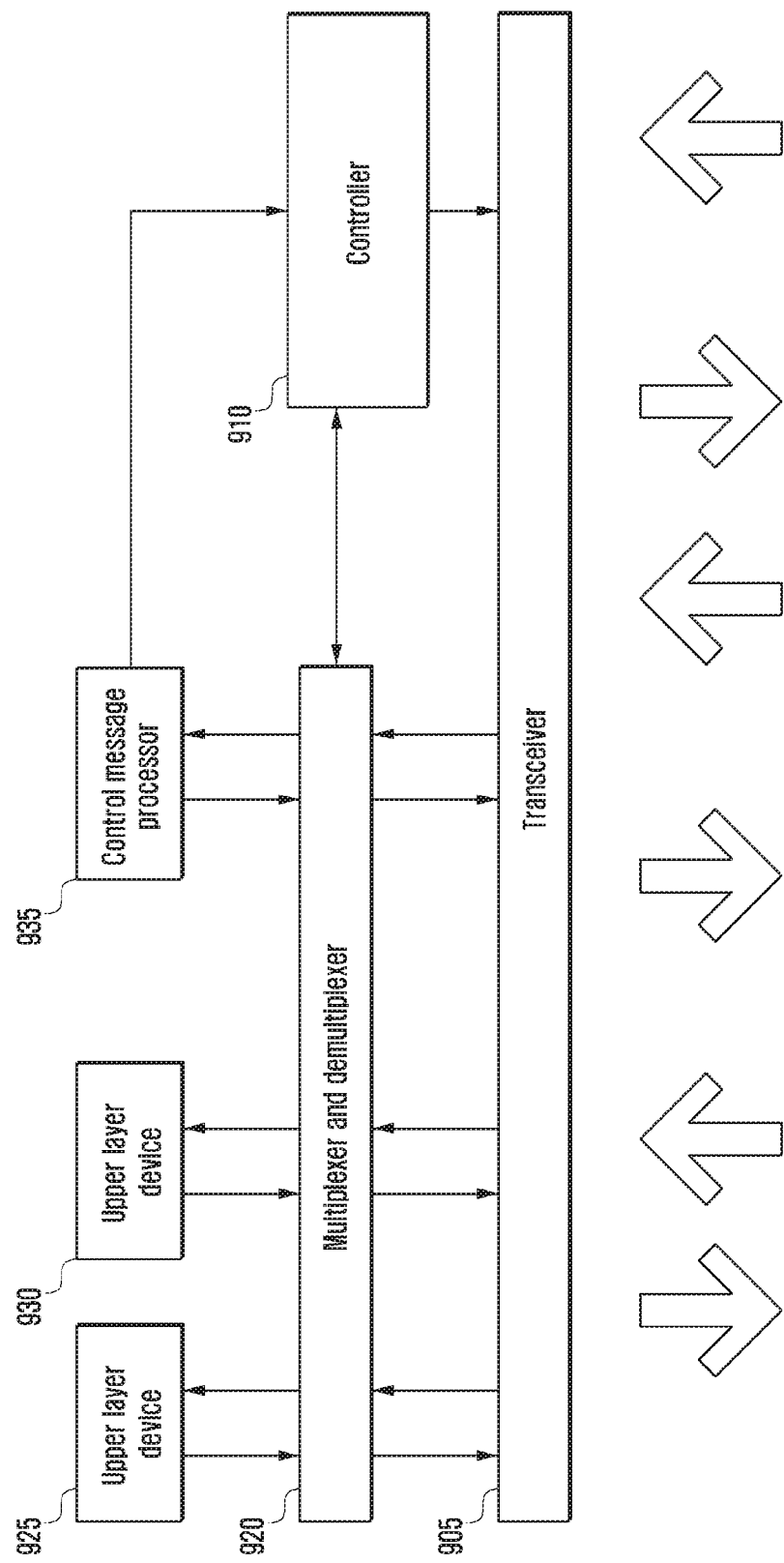
FIG. 9 illustrates the configuration of UE according to a first embodiment of the present disclosure.

FIG. 9 is a diagram showing the configuration of UE according to a first embodiment of the present disclosure;

Referring to FIG. 9, the UE is capable of including at least one of the following: a transceiver 905, a controller 910, a multiplexer and demultiplexer 920, a control message processor 930, and upper layer devices 920 and 925.

The multiplexer and demultiplexer 920 and the controller 910 form an MAC device. Although the embodiment of FIG. 9 is, for the sake of convenience, described without separating components from each other, it can be modified in such a way that an MAC device for MCG and an MAC device for SCG are configured separately when DC is configured.

The transceiver 905 receives data and control signals via the forward channel of a serving cell and transmits data and control signals via the reverse channel. When a number of serving cells are configured, the transceiver 905 is capable of transmission/reception of data and control signals via the serving cells. The transceiver 905 is capable of including one or more Radio Frequency Circuit/Front End and sets the operation frequencies of the Radio Frequency Circuit/Front End according to the control of the controller 910. The transceiver 1805 is capable of performing inter-frequency measurement at a time point according to the control of the controller 910, receiving signals from/a current serving cell at a time point, or transmitting signals to a serving cell at a time point.

The multiplexer and demultiplexer 920 multiplexes data from the control message processor 935 or the upper layer devices 930 and 925, or de-multiplexes data from the transceiver 905 to transfer the processed data to the control message processor 935 or the upper layer devices 930 and 925.

The control message processor 935 refers to an RRC layer device. The control message processor 935 is capable of processing control messages from an ENB, and performing corresponding operations. For example, the control message processor 935 is capable of receiving an RRC control message and transferring PHR configuration information, etc., to the controller 910. The control message processor 935 is capable of creating a measurement report control message and transferring it to the lower layers according to the control of the controller 910.

The upper layer devices 930 and 925 can be configured according to types of services. For example, the upper layer devices 930 and 925 are capable of processing data, created from user services such as File Transfer Protocol (FTP) or Voice over Internet Protocol (VoIP) services, and transferring them to the multiplexer and demultiplexer 920. The upper layer devices 930 and 925 are also capable of processing data, from the multiplexer and demultiplexer 920, and transferring them to the service applications of the upper layers.

The controller 910 is capable of checking a scheduling command received via the transceiver 905, e.g., uplink grants, downlink assignments, etc., and controlling the transceiver 905 and the multiplexer and demultiplexer 920 to perform uplink transmission or downlink reception via proper transmission resources at a proper time point.

The controller 910 is also capable of controlling the transceiver 905 and various operations of the UE, e.g., operations of UE described above referring to FIGS. 5, 6, 7 and 8.

For example, the controller 910 is capable of receiving information indicating a condition as to whether physical uplink control channel (PUCCH) feedback for each secondary cell (SCell) configured to UE is transmitted via an SCell (e.g., PUCCH SCell) from among the SCells.

The indicating information for each SCell refers to information received when the PUCCH SCell is used to transmit the PUCCH feedback, instead of transmitting the PUCCH feedback for each SCell via PCell or PSCell.

The controller 910 is capable of learning a condition as to whether each SCell belongs to a corresponding PUCCH SCell group, through the indication information. When the indication information for an SCell is not received, the controller 910 is capable of determining that the SCell has belonged to a PCell group.

When the UE is configured with PUCCH SCell and the PUCCH SCell is activated, the controller 910 is capable of obtaining Type 2 power headroom information regarding the PUCCH SCell and reporting it to the ENB.

Figure 10:
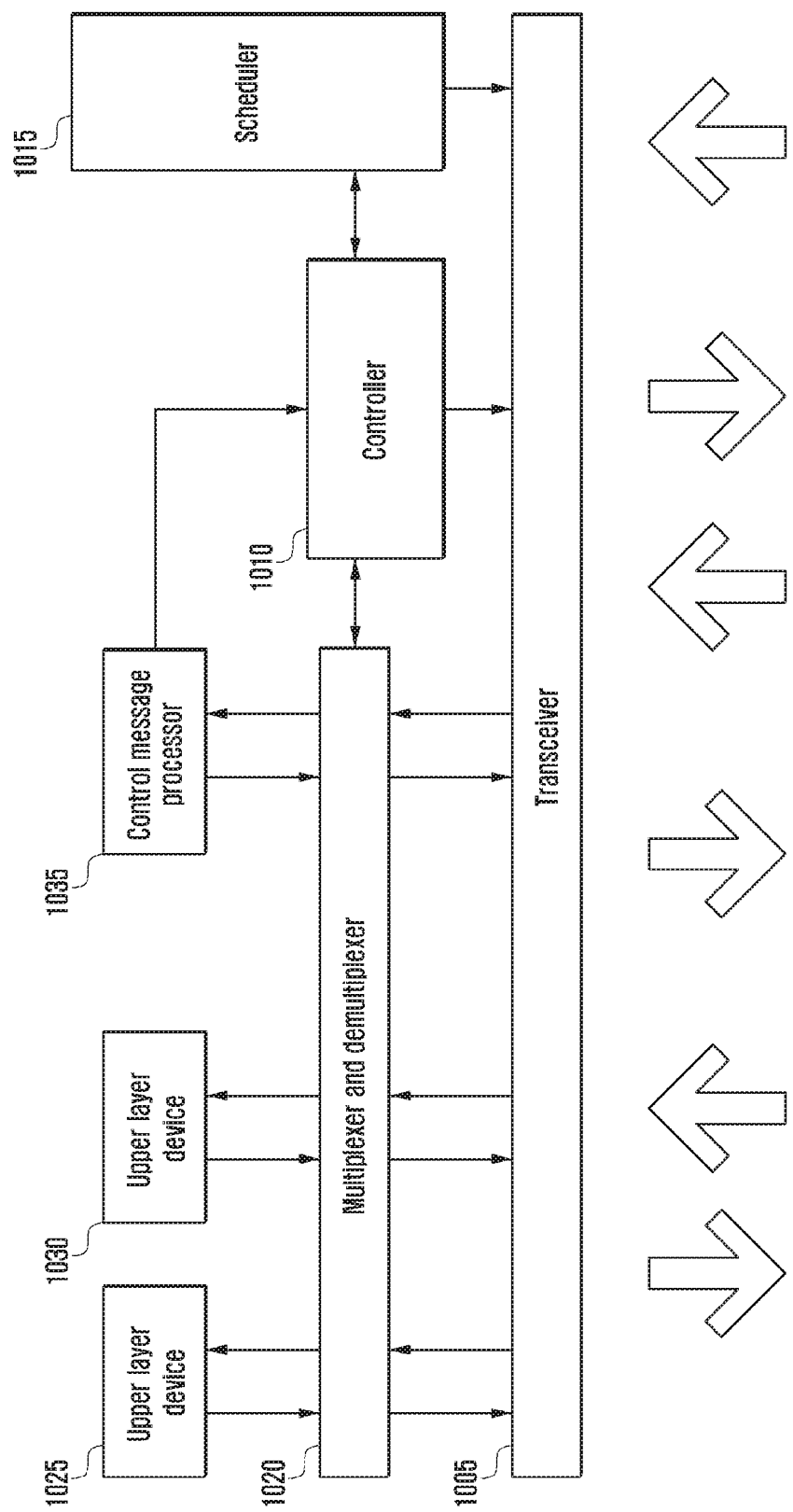
FIG. 10 illustrates the configuration of an ENB according to a first embodiment of the present disclosure.

FIG. 10 is a diagram showing the configuration of an ENB according to a first embodiment of the present disclosure.

The ENB is capable of including at least one of the following: a transceiver 1005, a controller 1010, a multiplexer and demultiplexer 1020, a control message processor 1035, upper layer devices 1025 and 1930, and a scheduler 1015.

The transceiver 1005 is capable of transmitting data and control signals via the forward carriers and receiving data and control signals via the reverse carriers. When a number of carriers are set, the transceiver 1005 is capable of transmitting and receiving data and control signals via the carriers.

The multiplexer and demultiplexer 1020 is capable of multiplexing data from the control message processor 1035 or the upper layer devices 1025 and 1030 or de-multiplexing data from the transceiver 1005 to transfer the processed data to the control message processor 1935, the upper layer devices 1025 and 1030 or the controller 1010.

The control message processor 1035 is capable of processing control messages from the UE and performing corresponding operations. The control message processor 1035 is also capable of creating control messages to be transmitted to the UE and transmitting them to the lower layer.

The upper layer devices 1025 and 1030 can be configured according to bearers. The upper layer devices 1925 and 1930 process data, transmitted from S-GW or another ENB, to RLCPDU, and transfer it to the multiplexer and demultiplexer 1020. The upper layer devices 1025 and 1930 also process RLC PDU, from the multiplexer and demultiplexer 1020, to PDCP SDU, and transfer it to the S-GW or the other ENB.

The scheduler 1015 allocates transmission resources to UE at a proper time point, considering the buffer state, channel state, etc., of the UE. The scheduler 1015 processes: a signal transmitted from UE; or a signal to be transmitted to UE.

The controller 1010 is capable of controls the operations related to the measurement and radio resource control. The controller 1010 is also capable of controlling various operations of the ENB, e.g., operations of ENB described above referring to FIGS. 5, 6, 7 and 8.

For example, the controller 1010 is capable of receiving information indicating a condition as to whether physical uplink control channel (PUCCH) feedback for each SCell configured to UE is transmitted via an SCell (e.g., PUCCH SCell) from among the SCells.

The indicating information for each SCell refers to information received when the PUCCH SCell is used to transmit the PUCCH feedback, instead of transmitting the PUCCH feedback for each SCell via PCell or PSCell.

When the UE is configured with PUCCH SCell and the PUCCH SCell is activated, the controller 910 is capable of obtaining Type 2 power headroom information regarding the PUCCH SCell and reporting it to ENB.

Second Embodiment

As mobile communication systems are evolved, the number of carriers which can be aggregated to one mobile device also increases. As described above, the number of aggregate carriers per mobile device is up to maximum 32 in a high level of development of carrier aggregation (CA) aiming at commercialization around 2017.

The second embodiment of the present disclosure provides an apparatus and method of reducing measurement report overhead of UE aggregated with a number of carriers. The measurement of UE is configured by ENB. One measurement is specified by a measurement identifier, measurement ID (measId), defining objects to be measured, conditions to report measurement result, etc. The object to be measured refers to a measurement object (hereafter expressed by a measObject). The measurement result reporting condition is configured by 'report configuration' which is expressed by 'reportConfig'.

UE can be configured with a number of measurements according to objectives. The number of measurements configured in UE is meaningfully correlated with the number of carriers configured in UE. This is because at least one measurement is in general set for one configured carrier.

When measurement report is triggered, UE request an uplink transmission resource from an ENB. When UE is allocated a transmission resource, is transmits a measurement report message to the ENB via the allocated transmission resource. There can be a considerable delay from a time point that measurement report is triggered to a time point that a measurement report message is transmitted, and during the delay another measurement report can be triggered. That is, there can be a number of measurement reports around a time point that a measurement report is transmitted. In this case, UE needs to determine which measurement report is preferentially transmitted.

One measurement report message includes various items of information most of which are the same as those in the previous measurement report message that has been reported. In a state where the maximum number of carriers is 32 and overhead according to measurement report increases, reporting unnecessary information needs to be reduced.

The second embodiment of the present disclosure provides an apparatus and method that reduces measurement report overhead in UE configured with a number of carriers and sets the order of priority in transmission of a number of measurement reports, thereby preferentially reporting a measurement report with a high degree of importance.

Figure 11:
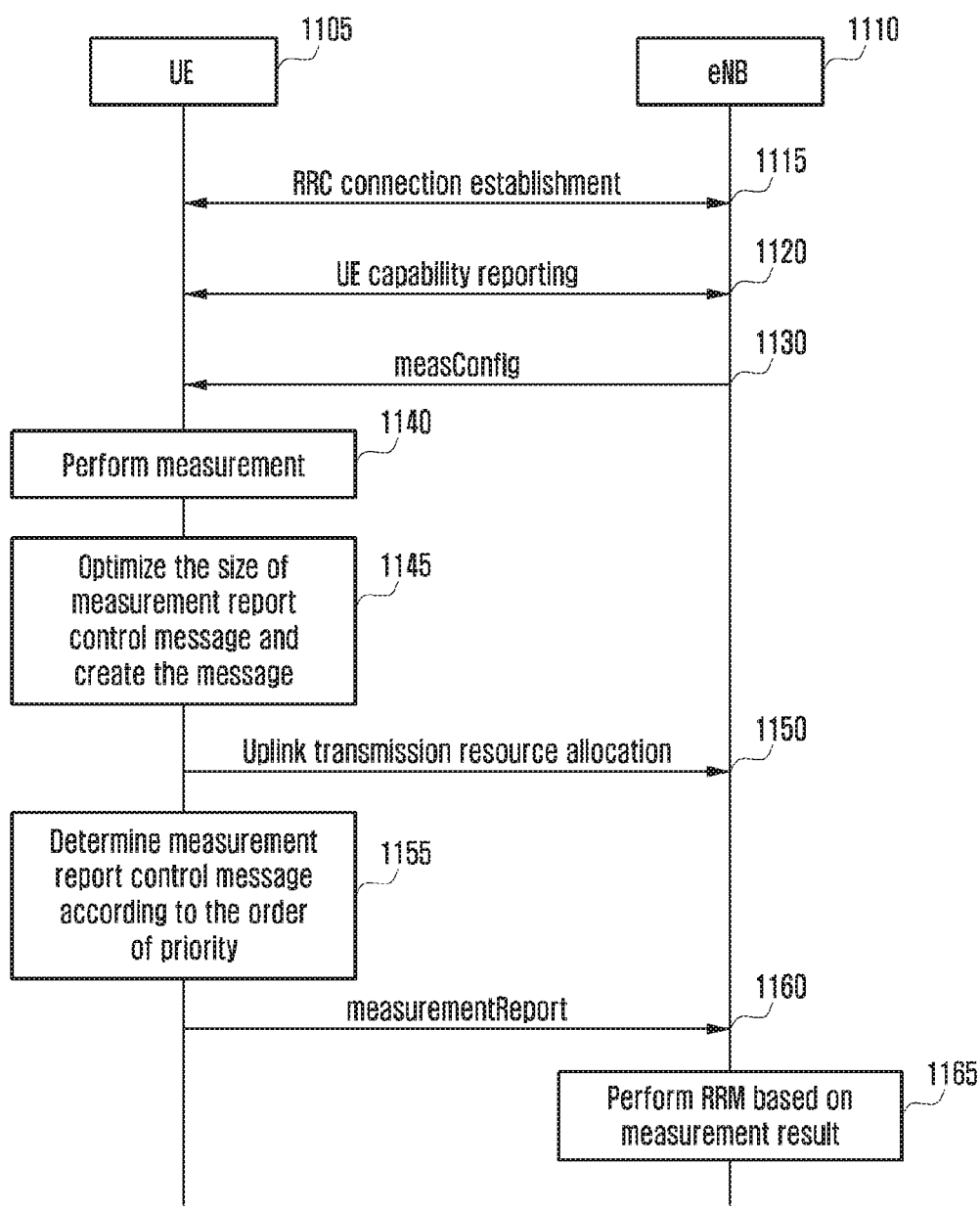
FIG. 11 illustrates a method of performing measurement report (MR) according to a second embodiment of the present disclosure.

FIG. 11 is a flow diagram of a method of performing measurement report (MR) between UE and ENB according to a second embodiment of the present disclosure.

In a mobile communication system configured with a number of carriers and cells, ENB 1110 and UE 1105, the UE 1105 configures RRC connection with the ENB 1110 via a serving cell in operation 1115.

Before performing normal communication with the UE 1105, the ENB 1110 is capable of performing a capability reporting procedure with the UE 1105 in order to obtain information regarding the capability of UE in operation 1120. The capability reporting procedure can include a process for the ENB 1110 to transmit a capability enquiry message UECapabilityEnquiry to the UE 1105 and a process for the UE 1105 to transmit the capability information message UECapabilityInformation to the ENB 1110. Through the procedure, the UE 1105 is capable of reporting, to the ENB 1110, the CA capability, e.g., a combination of bands supporting CA, the number of serving cells supportable according to a combination of bands, etc.

The ENB 1110 is capable of configuring measurements to the UE 1105 based on the received information in operation 1130. Measurements can be configured according to various objectives. For example, measurement can be configured so that the UE 1105 continues to measure nearby cells for a specific frequency in order to ensure the mobility of UE 1105. Measurement can also be set so that UE 1105 measures nearby cells for a frequency capable of performing CA. The ENB 1110 can set one or more measurements to the UE 1105. Individual measurements can be identified by corresponding measurement identifiers, e.g., measIds.

UE 1105 is capable of performing configured measurement based on a specified rule in operation 1140. When one or more measIds satisfy a measurement report condition, UE 1105 can start the measurement report procedure.

UE 1105 is capable of creating measurement report control message in operation 1145. In this case, the size of measurement report control message, i.e., the size of content to be included in the measurement report, can be optimized by using a method which will be described later.

When completing the measurement report control message, UE 1105 requests an uplink transmission resource from ENB 1110 and is allocated the uplink transmission resource in operation 1150. UE 1105 is capable of transmitting the measurement report control message by using the allocated uplink transmission resource.

When UE 1105 has a number of measurement report control messages to be transmitted, it is capable of determining the order of priority in transmission of measurement report control messages in operation 1155. The UE 1105 is capable of transmitting the measurement report messages according to the determined order of priority in operation 1160.

When receiving the measurement report control message, the ENB 1110 is capable of performing radio resource management (RRM), referring to a measurement result of the measurement report message, in operation 1165. For example, the ENB 1110 can: hand over the UE 1105; add a new serving cell to the UE 1105; or replace a serving cell configured in the UE 1105 with another serving cell, referring to a measurement result of the measurement report message.

Figure 12:
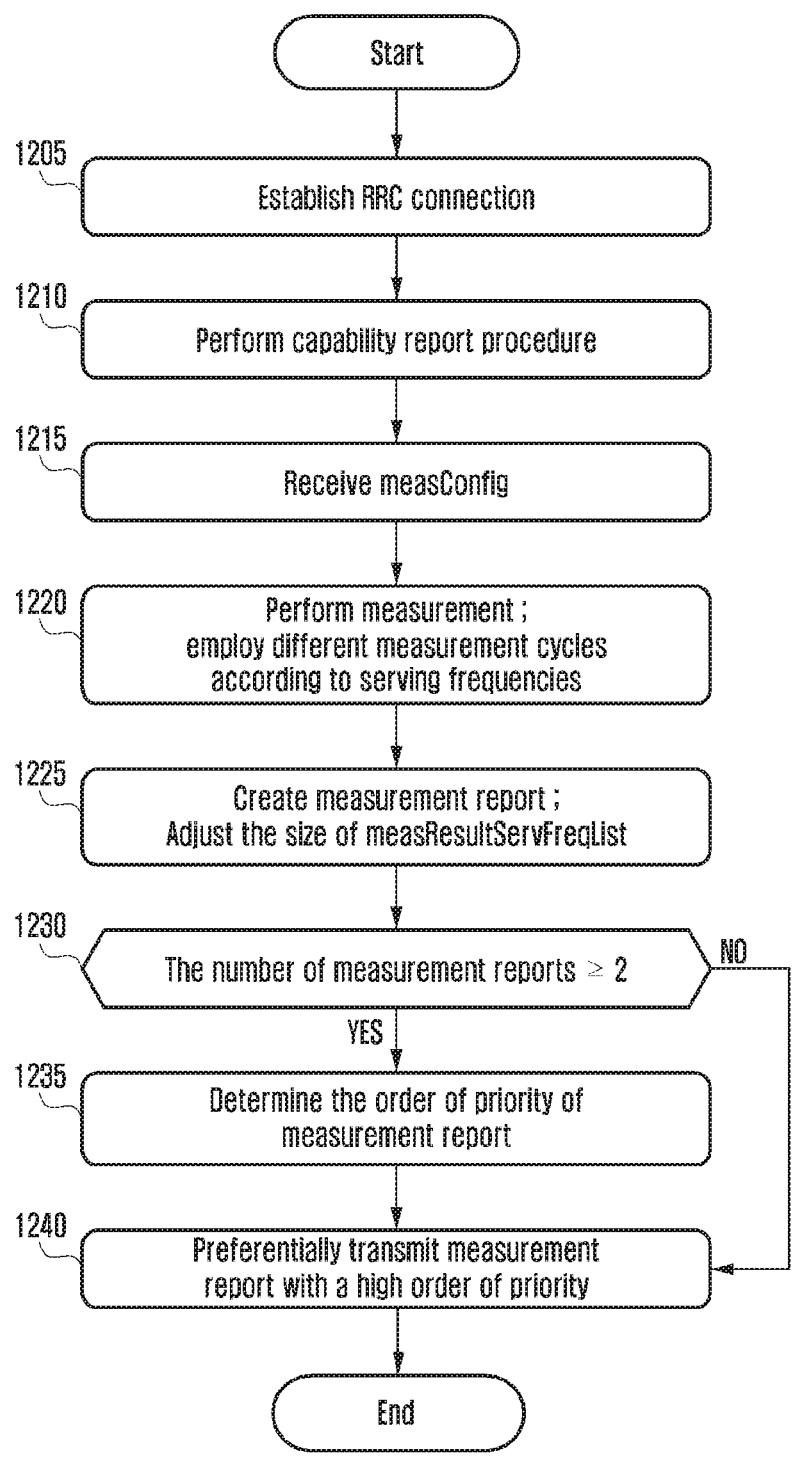
FIG. 12 illustrates a method for UE to perform measurement report (MR) according to a second embodiment of the present disclosure.

FIG. 12 is a flow diagram of a method for UE (e.g., UE 1105) to perform measurement report (MR) according to a second embodiment of the present disclosure.

UE is capable of establishing an RRC connection with an ENB in operation 1205. The RRC connection refers to a control connection required for UE to perform transmission/reception of data via a mobile communication network. The RRC connection is established by exchanging RRC control messages via a random access procedure.

UE and ENB are capable of performing the capability report procedure in operation 1210. The capability report procedure can include a process for ENB to transmit a UE capability enquiry control message to UE and a process for the UE to receive a UE capability information control message from the ENB.

For example, UE capability enquiry control message can include the following information.

Capability enquiry Radio Access Technology (RAT) type:
Control information indicating RAT type of capability to be reported UE. If RAT type is EUTRA, UE reports EUTRA-related capability information Enquired frequency band: Control information indicating a frequency band of capability to be reported to UE Maximum number of serving cells according to enquired frequency bands: Information indicating UE to report a combination of frequency bands (a combination of frequency bands supported by UE, which is called supportedBandCombination) including only the maximum number of serving cells for a specific frequency band. For example, in a state where the maximum number of serving cells according to frequency bands for a frequency band, x, is n, when UE reports the capability of a combination of frequency bands including a frequency band, x, it reports a combination of n serving cells for the frequency band, x, instead of a combination of serving cells of n+1 or more. As another example, the best bandwidth class is used instead of the maximum number of serving cells (refer to specification 36.331). For example, in a state where the best bandwidth class for a frequency band x is indicated to D, when UE reports a combination of frequency bands including the frequency band x, it includes the bandwidth class set to be less than or equal to D therein.

The UE capability information control message includes information regarding a frequency band (frequency band information) supported by UE, information regarding a combination of frequency bands (frequency band combination information) supported by UE, etc. The frequency band combination information corresponds to CA capability information. For a band combination, UE is capable of: including the maximum number of serving cells, which can be set in one of the bands forming a band combination, and the maximum number of serving cells, which can be set in another band, etc. in the frequency band combination information; and reporting the information along with the frequency band combination information.

The ENB is capable of transmitting, to the UE, the measurement configuration control message, measConfig, based on the capability information of the UE, and enabling the UE to set measurement.

UE is capable of receiving the measConfig from the ENB in operation 1215. For example, the measConfig can include information described in the following table 1.

TABLE 1

| Type of information | Description |
| --- | --- |
| Configuration information for measurement object | UE is configured with one or more measurement objects each of which is defined by the following information.<br>measObjectId: It refers to an identifier to specify one of a number of measurement objects. It can use one of: e.g., a first identifier with a value between 1~32 and a second identifier with a value between 33~64.<br>Carrier Frequency: It refers to information indicating the center frequency of measurement object.<br>BlackCells: It specifies a cell where UE needs not to perform measurement, from among the cells with a center frequency, indicated as measurement objects. It is specified by Physical Cell Identity (PCI). |
| Information regarding report | UE is configured with one or more report configurations 'reportConfig' each of which is defined by the following information. |

TABLE 1-continued

| Type of information | Description |
| --- | --- |
| configuration | reportConfigId: It refers to an identifier to specify one of a number of report configurations and has a value between, e.g., 1~32.<br>Event type: It refers to information regarding an event for triggering measurement report. Event A1, A2, A3, A4, A5, etc. are defined (refers to Specification 36.331)<br>maxReportCells: It refers to the maximum number of cells that can be included in the measurement result report. It includes measurement report of a serving cell. |
| Measurement identifier | One measurement is defined with report configuration and measurement object and specified by a measurement identifier. One measurement is mapped with measId, reportConfigId, and measObjectId, which are considered to be linked to each other. For example, when measId x, reportConfig y, and measObjectId z are used to define one measurement, reportConfig y is linked with measId x, and measObjectId z is also linked with measId x. |
| Measurement result: information related to size optimization | It refers to information for controlling UE so that an excessive amount of overhead is not created by measurement result report.<br>The information will be described later. |
| Measurement result, information related to the order of priority | When a number of measurement result reports exist, it refers to information for controlling UE to preferentially transmit the measurement results reports from the highest degree of importance.<br>The information will be described later. |

UE is capable of performing measurement in operation 1220. UE performs measurement for measObject which does not need a measurement gap in measurement, from among the measObject linked to measId. For measObject that needs a measurement gap, UE performs, when it has been configured with a measurement gap, measurement for it. On the other hand, when measObject has not been configured with a measurement gap, UE reserves measurement for it.

Measurement for a measurement object is performed at a preset cycle. The cycle can be set to different values according to whether a corresponding measurement object is a serving frequency or non-serving frequency. A serving frequency for UE refers to a frequency set by a serving cell of the UE. According to various embodiments of the present disclosure, the cycle for a serving frequency can be set according to the number of serving cells configured in UE.

The measurement cycle for a serving frequency can be an n×DRX cycle when DRX is configured in UE and n×40 ms when DRX is not configured in UE. For example, UE is capable of processing and estimating a representative one of the values measured every measurement cycle, e.g., an average, on RRC, every 5× measurement cycle, and determining whether the processed result satisfies the measurement result report condition. n denotes a variable determined according to the number of serving cells configured in UE. When the number of serving cells configured in UE is less than a threshold, n can be a first value. When the number of serving cells configured in UE is greater than a threshold, n can be a second value. For example, the first value can be set to 1, and the second value can be set to 2. Alternatively, n can be set in such a way that the first m serving cells have the first value and the remaining serving cells have the second value. Alternatively, n can also be set in such a way that: serving cells satisfying a condition, e.g., PCell, PSCell, and SCell configured with Physical Uplink Control Channel (PUCCH), and the serving frequencies related thereto have the first value; SCells satisfying a condition, from among the remaining SCells, and the serving frequencies related thereto have the first value; and the remaining SCells and the serving frequencies related thereto have the second value. The condition can be defined based on, for example, a serving cell identifier SCellIndex (refer to specification 36.331) or according to the amount of transmission/reception data. For example, the first can be applied to SCell that is select: in order of an amount of data transmission/reception from largest to smallest, recently, for a time interval; or in order of a serving cell identifier from lowest to highest. Alternatively, for SCells of a frequency set to employ the second value when measObject is configured, the second value is applied to the SCells and the first value can be applied to the remaining serving cells. Alternatively, ENB can set n via a control message in such a way that the first value is a fixed value and the second value is a variable value according to the number of serving cells.

When there is a reportConfig triggering a measurement result report, from among the reportConfig linked with valid measId and measObject, UE can trigger the measurement result report process for a corresponding measId in operation 1225.

UE creates a measurement result report control message for measId of which the measurement result report procedure is triggered in operation 1225. The measurement result report control message can contain measResult. The measResult can include information described in the following table 2.

TABLE 2

| Type of information | Description |
| --- | --- |
| measId | Related measurement identifier |
| measResultPCell | Measurement result for PCell; Reference Signal Received Power (RSRP) and Reference Signal Received Quality (RSRQ) measuring a reference signal of PCell are reported. |
| measResultNeighCells | Measurement information for linked measurement object; It can include measurement results according to maxReportCells. One measurement result includes PCI specifying a serving cell and RSRP or RSRQ measuring a reference signal of a corresponding cell. |
| measResultServFreqList | Measurement result for a serving frequency of UE configured with CA; measResultServFreq is reported according to serving frequencies of UE. One measResultServFreq includes measResultSCell and measResultBestNeighCell. measResultSCell is measured RSRP and RSRQ for a reference signal of an SCell configured to a serving frequency. MeasResultBestNeighCell is RSRP of a nearby cell with a highest RSRP measurement result, from among the nearby cells measured at a serving frequency. |

In order to optimize the size of measResult, UE can adjust measResultServFreqList by using one of the following methods.

[Method 1 of Adjusting measResultServFreqList]

ENB is capable of including an indicator indicating a condition as to whether measResultServFreqList is included (hereafter called measResultServFreqList indicator) and a value of a first timer in measConfig, and transmitting it to the UE.

When measResult including measResultServFreqList (or measurement report) is transmitted, UE drives the first timer.

In triggering a measurement result report and creating measResult, when measResultServFreqList indicator is set and the first timer is not being driven, UE creates measResult containing measResultServFreqList. When the measResult is transmitted (or transferred to lower layer), the first timer is driven.

On the other hand, when measResultServFreqList indicator is set and the first timer is being driven, UE is capable of creating measResult without measResultServFreqList and transmitting it to ENB.

When measResultServFreqList indicator is not set, UE creates measResult without measResultServFreqList and transmits it to ENB.

[Method 2 of Adjusting measResultServFreqList]

When measResult including measResultServFreqList (or measurement report) is transmitted, UE stores the reported measResultServFreqList in the memory.

When triggering a measurement report and creating measResult, UE is capable of creating a measResult in such a way that: it does not include measResultServFreq, which has the same measurement value that it has reported or stored, in the measResultServFreqList, but only measResultServFreq, which includes a measurement value that differs from those that it has measured, in the measResultServFreqList.

[Method 3 of Adjusting measResultServFreqList]

ENB is capable of including, in the measConfig, information (measResultServFreqNumber) indicating the number of frequencies to be included in measResultServFreqList, and transmitting it to the UE.

In triggering a measurement result report and creating measResult, UE is capable of including, in measResultServFreqList, (1) measResultServFreq for a serving frequency satisfying a condition (measResultServFreq corresponding to PCell or Primary carrier; measResultServFreq corresponding to PSCell or Primary Secondary Carrier; and measResultServFreq corresponding to Secondary Carrier or SCell configured with PUCCH), and then (2) measResultServFreq satisfying another condition so that the total number of measResultServFreq included in the measResult is measResultServFreqNumber.

The other condition can include at least one of the following: 1) a condition for selecting serving frequencies of measResultServFreqNumber (e.g., m), in order of channel states from lowest to highest, from among the SCells in deactivate state, and including measResultServFreq of a corresponding serving frequency in the measResultServFreqList; 2) a condition for selecting serving frequencies of measResultServFreqNumber (e.g., m), in order of channel states from highest to lowest, from among the SCells in deactivate state, and including measResultServFreq of a corresponding serving frequency in the measResultServFreqList; 3) a condition for selecting serving frequencies of measResultServFreqNumber (e.g., m), in order of channel states from highest to lowest (or lowest to highest), from among the SCells that are in activate state but the measurement results of which have not been included in the measResultServFreqList, and including measResultServFreq of a corresponding serving frequency in the measResultServFreqList; and 4) a condition for selecting and including frequencies in order of SCellIndex. The symbol m refers to the number of serving cells preferentially included in the measResultServFreqList, and can preferably have a value between 1 and 4, for example. When dual connectivity is configured and PUCCH SCell is not configured; or when dual connectivity is not configured and only PUCCH SCell is configured, m can be 2. When dual connectivity is configured and PUCCH SCell is configured in one of the two cell groups, m can be 3. When dual connectivity is configured and PUCCH SCell is configured in the two cell groups, m can be 4.

[Method 4 of Adjusting measResultServFreqList]

For measResultServFreq whose number is x, UE can include measResultSCell and measResultBestNeighCell in the list. For the remaining measResultServFreq, UE can include only measResultSCell in the list. The frequencies of x, including measResultSCell and measResultBestNeighCell, surely include PCell (or Primary carrier) and PSCell (or Primary Secondary Carrier). The remaining frequencies of x−2 can be selected in order of priority as follows.

1) When the number of SCell (or corresponding Secondary Carrier) configured with PUCCH (except for PSCell) is greater than x−2, SCells can be selected in order of SCellIndex from lowest to highest (or highest to lowest).

2) If the number of SCell (or corresponding Secondary Carrier) configured with PUCCH less than x−2, SCells can be selected, from among the SCells not configured with PUCCH, in order of SCellIndex from lowest to highest (or highest to lowest).

Except for PCell carriers, PSCell carriers, and PUCCH SCell carriers, UE can set the remaining serving frequencies so that the measurement results can be reported the same number of times. For example, when the measurement results for serving frequencies 1 and 2 according to a rule are reported to the first measurement result report message, the measurement result for a serving frequency selected from the remaining frequencies excluding serving frequencies 1 and 2 can be reported to the next measurement result report message.

UE is capable of checking whether the number of measurement reports to be triggered (or transmitted) at a corresponding time point is a large number in operation 1230. When there are a number of measurement reports to be transmitted (or they are triggered but not transferred to a lower layer) in operation 1230, UE proceeds with operation 1235. When there is one measurement report to be transmitted in operation 1230, UE proceeds with operation 1240.

In operation 1235, the UE can determine the order of priority in measurement report by one of the following methods.

[Method 1 of Determining the Order of Priority in Measurement Report]

The order of priority in measurement report can be determined in order of triggering (or creation). For example, the highest order of priority can be assigned to the first triggered measurement report.

[Method 2 of Determining the Order of Priority in Measurement Report]

The order of priority can be determined according to events triggering a measurement report. For example, the highest order of priority is assigned to events A3 and A5 which will highly be involved in handover; the second highest order of priority is assigned to events C1 and C2 related to the CoMP operation; and the lowest order of priority is assigned to the remaining events A1, A2, and A4. A higher order of priority can be applied to an event A2 reporting that the quality of measurement object is deteriorated than an event A1 reporting that the quality of measurement object is improved. For example, the order of priority of events can be defined in order of A3, A5, C2, C1, A2, A6, A4, and A1.

[Method 3 of Determining the Order of Priority in Measurement Report]

ENB is capable of explicitly specifying the order of priority according to measId. ENB is capable of receiving the order of priority according to measId from the measConfig information, and UE is capable of first transmitting measurement report related (or linked) to a measId with a high order of priority, according to the explicitly indicated order of priority. Alternatively, ENB is capable of receiving the order of priority according to measObject from the measConfig information, and UE is capable of first transmitting measurement report related (or linked) to a measObject with a high order of priority, according to the explicitly indicated order of priority. Alternatively, ENB is capable of receiving the order of priority according to reportConfig from the measConfig information, and UE is capable of transmitting measurement report related (or linked) to a reportConfig with a high order of priority, according to the explicitly indicated order of priority.

Figure 13:
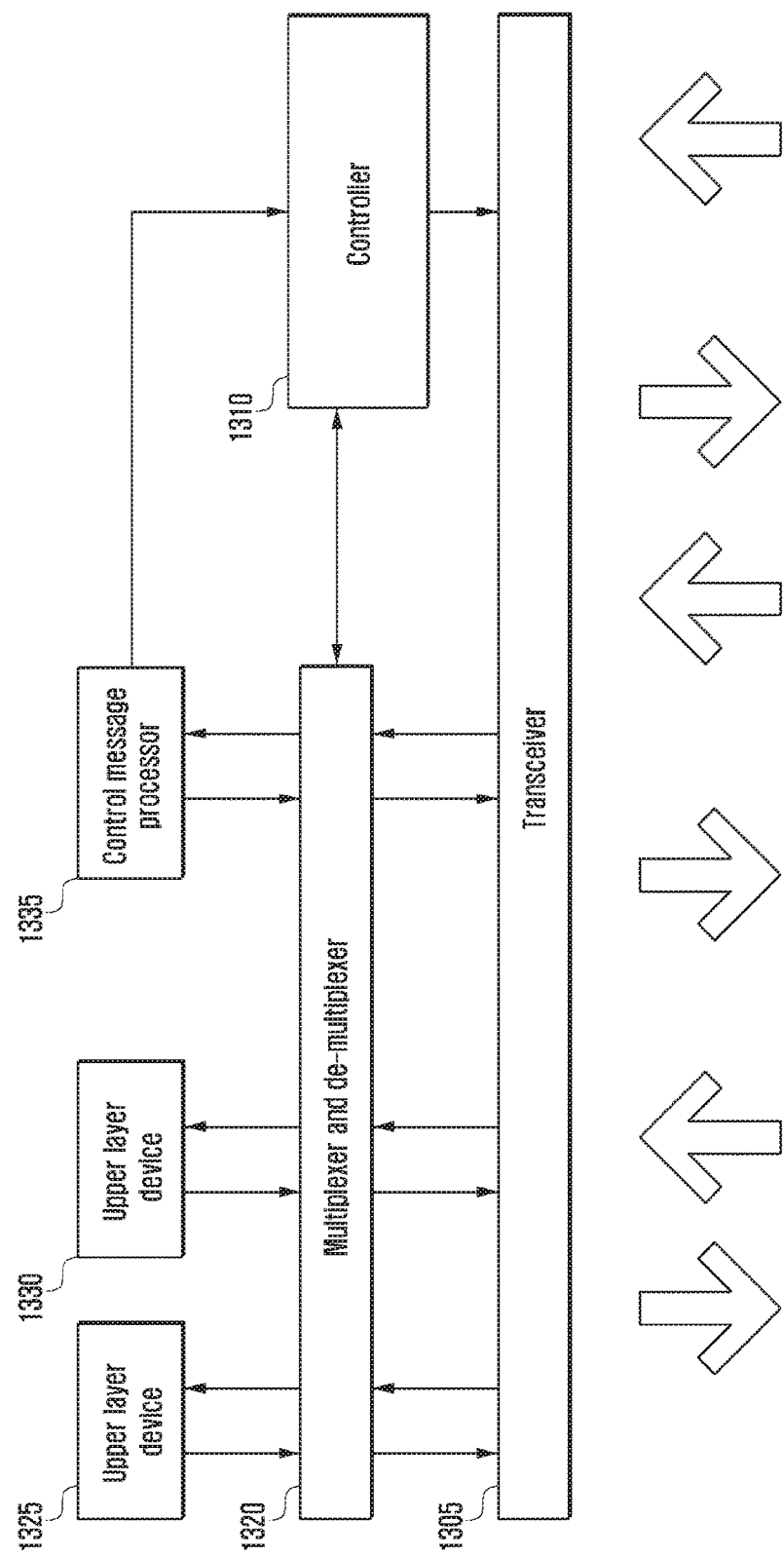
FIG. 13 illustrates the configuration of UE according to a second embodiment of the present disclosure.

FIG. 13 is a diagram showing the configuration of UE according to a second embodiment of the present disclosure.

Referring to FIG. 13, the UE is capable of including at least one of the following: a transceiver 1305, a controller 1310, a multiplexer and demultiplexer 1320, a control message processor 1330, and upper layer devices 1320 and 1325.

The multiplexer and demultiplexer 1320 and the controller 1310 form an MAC device. Although the embodiment of FIG. 13 is, for the sake of convenience, described without separating components from each other, it can be modified in such a way that an MAC device for MCG and an MAC device for SCG are configured separately when DC is configured.

The transceiver 1305 receives data and control signals via the forward channel of a serving cell and transmits data and control signals via the reverse channel. When a number of serving cells are configured, the transceiver 1305 is capable of transmission/reception of data and control signals via the serving cells. The transceiver 1305 is capable of including one or more Radio Frequency Circuit/Front End and sets the operation frequencies of the Radio Frequency Circuit/Front End according to the control of the controller 1310. The transceiver 1305 is capable of performing inter-frequency measurement at a time point according to the control of the controller 1310, receiving signals from/a current serving cell at a time point, or transmitting signals to a serving cell at a time point.

The multiplexer and demultiplexer 1320 multiplexes data from the control message processor 1335 or the upper layer devices 1330 and 1325, or de-multiplexes data from the transceiver 1305 to transfer the processed data to the control message processor 1335 or the upper layer devices 1330 and 1325.

The control message processor 1335 refers to an RRC layer device. The control message processor 1335 is capable of processing control messages from an ENB, and performing corresponding operations. For example, the control message processor 1335 is capable of receiving an RRC control message and transferring measurement configuration information, etc., to the controller 1310. The control message processor 1335 is capable of creating a measurement report control message and transferring it to the lower layers according to the control of the controller 1310.

The upper layer devices 1330 and 1325 can be configured according to types of services. For example, the upper layer devices 1330 and 1325 are capable of processing data, created from user services such as File Transfer Protocol (FTP) or Voice over Internet Protocol (VoIP) services, and transferring them to the multiplexer and demultiplexer 1320. The upper layer devices 1330 and 1325 are also capable of processing data, from the multiplexer and demultiplexer 1320, and transferring them to the service applications of the upper layers.

The controller 1310 is capable of checking a scheduling command received via the transceiver 1305, e.g., uplink grants, downlink assignments, etc., and controlling the transceiver 1305 and the multiplexer and demultiplexer 1320 to perform uplink transmission or downlink reception via proper transmission resources at a proper time point. The controller 1310 is capable of controlling various operations of the UE, described above.

The controller 1310 is capable of controlling operations of the UE, related to the measurement report according to the second embodiment of the present disclosure, i.e., operations of the UE described above referring to FIGS. 11 and 12.

Figure 14:
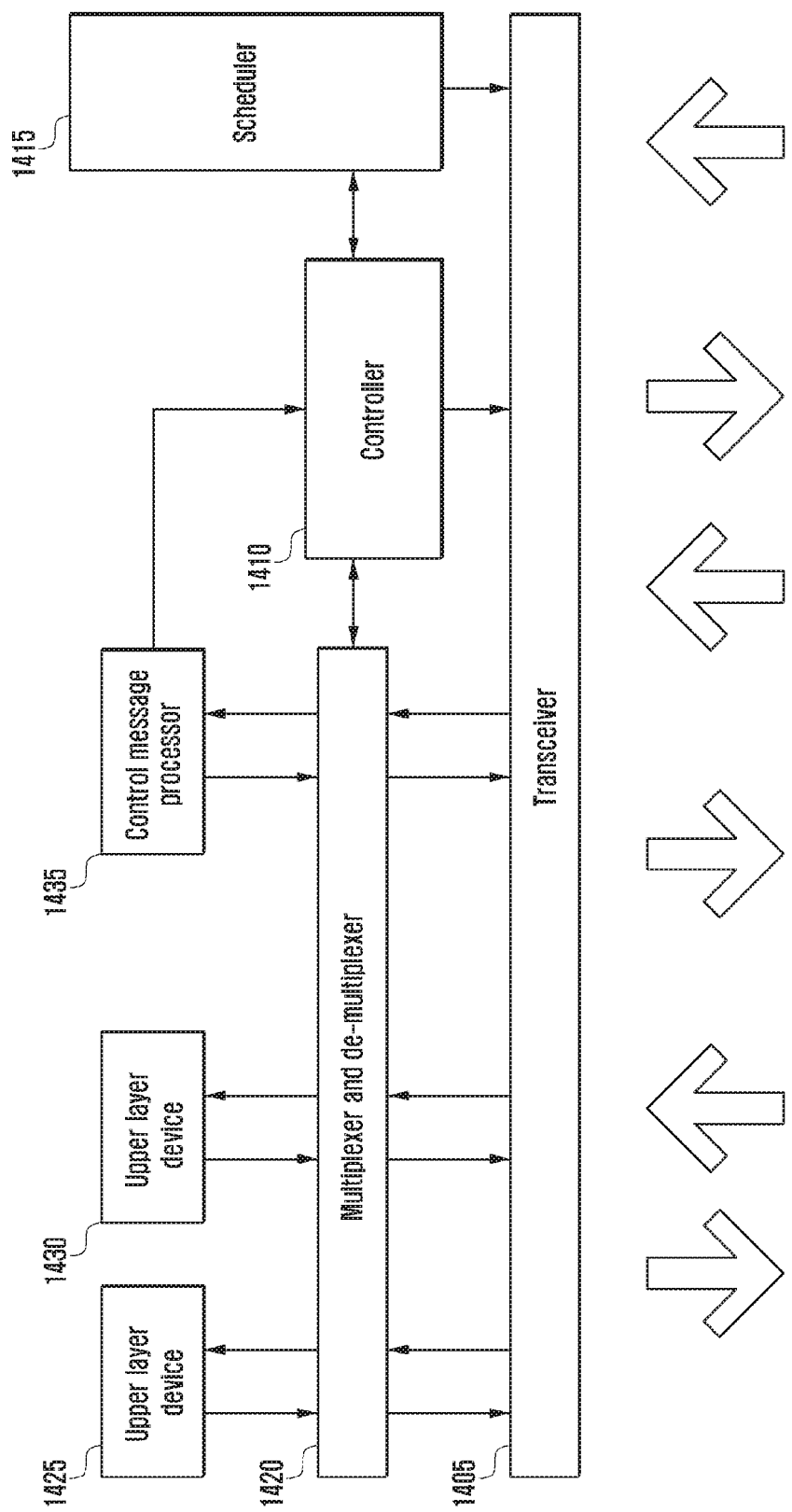
FIG. 14 illustrates the configuration of an ENB according to a second embodiment of the present disclosure.

FIG. 14 is a diagram showing the configuration of an ENB according to a second embodiment of the present disclosure.

The ENB is capable of including at least one of the following: a transceiver 1405, a controller 1410, a multiplexer and demultiplexer 1420, a control message processor 1435, upper layer devices 1425 and 1430, and a scheduler 1415.

The transceiver 1405 is capable of transmitting data and control signals via the forward carriers and receiving data and control signals via the reverse carriers. When a number of carriers are set, the transceiver 1405 is capable of transmitting and receiving data and control signals via the carriers.

The multiplexer and demultiplexer 1420 is capable of multiplexing data from the control message processor 1435 or the upper layer devices 1425 and 1430 or de-multiplexing data from the transceiver 1405 to transfer the processed data to the control message processor 1435, the upper layer devices 1425 and 1430 or the controller 1410.

The control message processor 1435 is capable of processing control messages from the UE and performing corresponding operations. The control message processor 1435 is also capable of creating control messages to be transmitted to the UE and transmitting them to the lower layer.

The upper layer devices 1425 and 1430 can be configured according to bearers. The upper layer devices 1425 and 1430 process data, transmitted from S-GW or another ENB, to RLCPDU, and transfer it to the multiplexer and demultiplexer 1420. The upper layer devices 1425 and 1430 also process RLC PDU, from the multiplexer and demultiplexer 1420, to PDCP SDU, and transfer it to the S-GW or the other ENB.

The scheduler 1415 allocates transmission resources to UE at a proper time point, considering the buffer state, channel state, etc., of the UE. The scheduler 1415 processes: a signal transmitted from UE; or a signal to be transmitted to UE.

The controller 1410 is capable of controls the operations of the ENB, related to the measurement report and the radio resource control, according to the second embodiment of the present disclosure, i.e., operations of the ENB described above referring to FIGS. 11 and 12.

Third Embodiment

The embodiment relates to an apparatus and method of activating secondary carriers with PUCCH in UE aggregated with multi-subcarriers.

Figure 15:
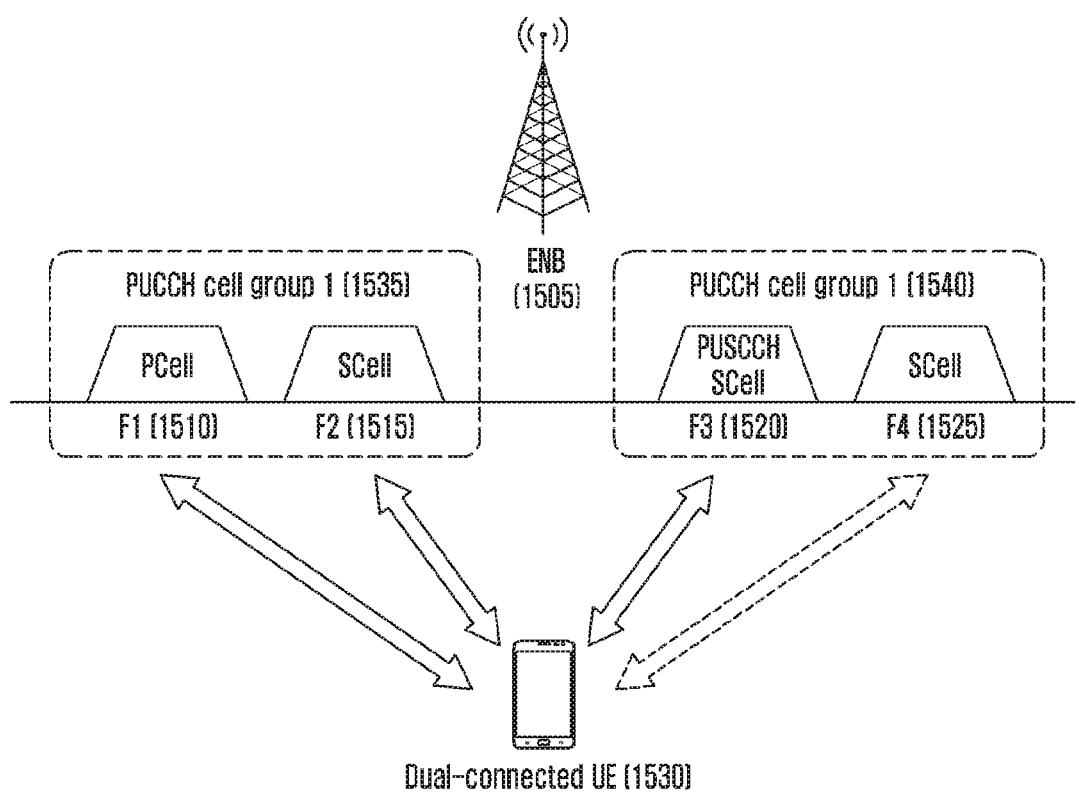
FIG. 15 illustrates carrier aggregation in UE according to a third embodiment of the present disclosure.

FIG. 15 is a diagram that describes improved carrier aggregation in UE according to a third embodiment of the present disclosure.

Referring to FIG. 15, one ENB broadcasts/receives multi-carriers over a number of frequency bands. For example, when an ENB 1505 broadcasts uplink carriers for four cells, conventional art enables one UE device to transmit/receive data by using one of a number of carriers. However, UE 1530 capable of performing carrier aggregation is capable of simultaneously transmitting/receiving data using a number of carriers. In that case, ENB 1505 allocates more carriers to UE 1530 capable of performing carrier aggregation according to the conditions, so that the UE 1530 can increase the data transmission rate.

When one cell is generally configured with one forward carrier and one reverse carrier, broadcast and received by one ENB, the term 'carrier aggregation (CA)' can be used in the sense that UE simultaneously transmits/receives data through a number cells. In that case, the maximum transmission rate increases in proportion to the number of aggregated carriers. The LTE Rel-10 CA technology allows one UE device to configure up to maximum 5 cells therein. One of the configured cells needs to have a PUCCH, and the cell is called a Primary Cell (PCell). The remaining cells without PUCCH are called Secondary Cell (SCell). The PCell also need to perform all function of general serving cells, such as handover, RLF, etc.

In the following description, a process where UE receives data via a forward carrier or transmits data via a reverse carrier can be used in the sense that UE receives/transmits data via a control channel and a data channel provided by a cell corresponding to a frequency band and a center frequency characterizing the carrier. For the sake of convenience, the third embodiment of the present disclosure will be described based on LTE system. However, it should be understood that the present disclosure is not limited to the embodiment and can be applied to all types of wireless communication systems that can support carrier aggregation.

The Rel-10 CA technology allows only a PCell to have a PUCCH. As information to be transmitted to an ENB via a PUCCH increases, it can be difficult for a single PUCCH to process all the amount of information. In particular, discussions have been made on the LTE Rel-13 that supports maximum 32 carriers. In addition to PCell, allowing SCell to have PUCCH has many advantages, such as PUCCH loading dispersion, etc. Therefore, an idea that PUCCH is introduced to SCell as well as PCell is proposed. For example, the third embodiment of FIG. 15 can be implemented in such a way that one SCell 1520 can further include a PUCCH. In the present disclosure, an SCell with a PUCCH is called a PUCCH SCell. In the prior art, all PUCCH-related signals are transmitted to ENBs via PCell. However, when a number of PUCCHs exist, the PUCCH signals for individual SCells need to be classified based on the PUCCHs, so that the signals can be transmitted to the ENBs via the corresponding PUCCHs. As shown in FIG. 15, when it is assumed that there are two PUCCHs, signals can be divided into a group 1535 of cells 1510 and 1515 using a PUCCH of a PCell and a group 1540 of cells 1520 and 1525 using a PUCCH of a specific SCell. In the present disclosure, the group is called a PUCCH cell group. The ENB can inform the UE of an SCell having a PUCCH and a PUCCH cell group corresponding to each SCell, by higher-layer signaling.

The third embodiment of the present disclosure provides operations of UE that receives commands for activating or deactivating an SCell having a PUCCH from an ENB. In the embodiment, when UE receives a command for activating an SCell having a PUCCH, the UE starts part of the operations after a particular time point. When UE receives a command for deactivating an SCell having a PUCCH, the UE ends part of the operations before a particular time point and the other operations after the time point. That is, a time required to perform and end an operation can differ from that required to perform and end another operation. In order to initiate or end the operations at the same time point, the delay for performing activation and deactivation increases by one operation taking more time than the other. For example, immediately on receiving a command received from an ENB, UE cannot use a corresponding SCell for transmission/reception of data. This is because additional time is required to activate devices for using the SCell. In addition, although corresponding devices are activated, part of the operations can take time to operate normally. Additionally, UE can perform operations that differ from those of other SCells having a PUCCH (hereafter called PUCCH SCells). A PUCCH SCell performs an additional operation for reporting Channel Status Information (CSI) for SCells that belonged to the same PUCCH cell group. Examples of the CSI are CQI/PMI/RI/RTI, a Scheduling Request, etc. When UE receives commands for activating and deactivating a PUCCH SCell, the operations need to be proposed in detail.

Figure 16:
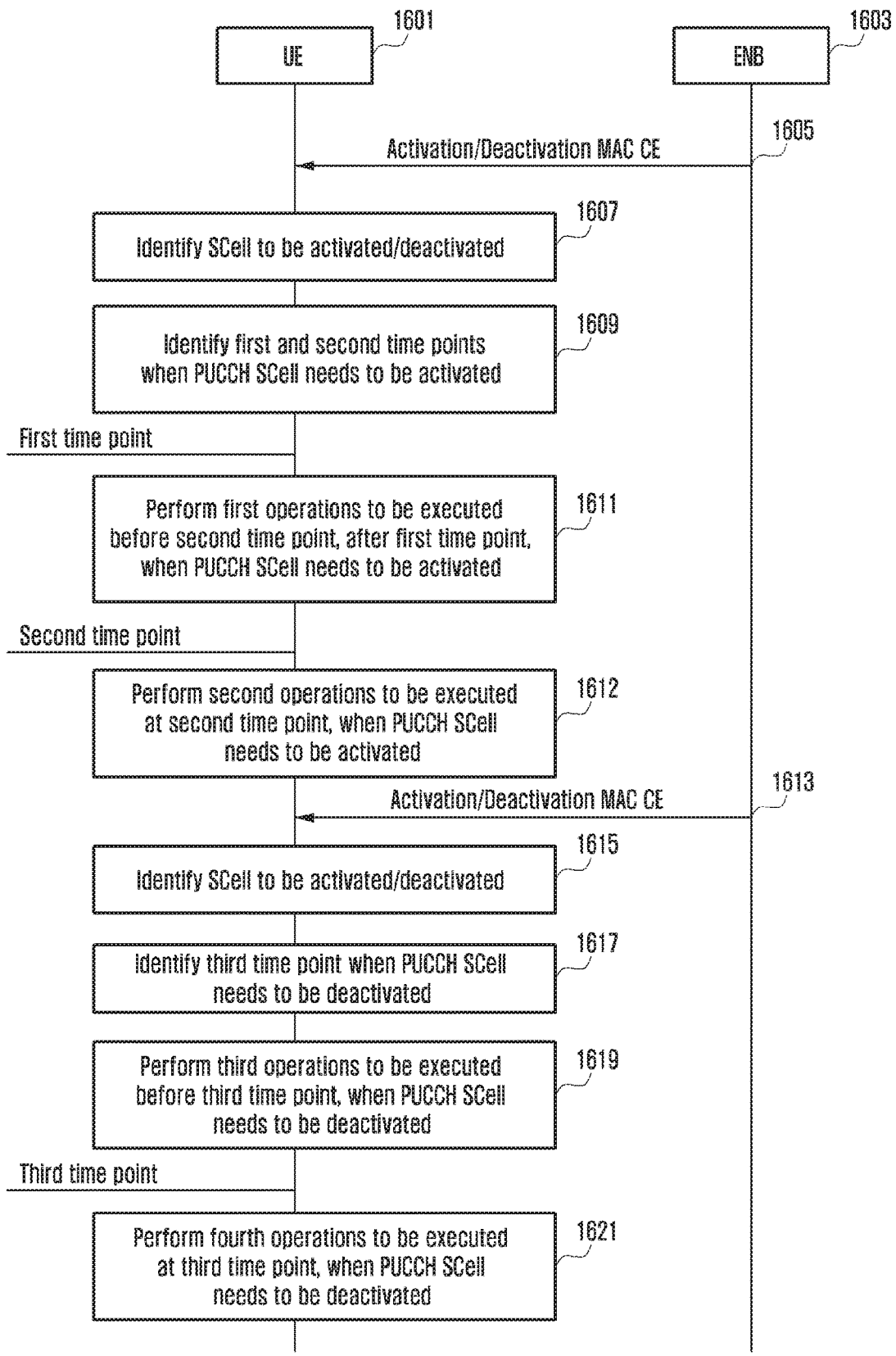
FIG. 16 illustrates a method of activating and deactivating PUCCH SCell according to a third embodiment of the present disclosure.

FIG. 16 is a flow diagram showing a method of activating and deactivating PUCCH SCell according to a third embodiment of the present disclosure.

ENB 1603 informs UE 1601 of SCells to be activated/deactivated from among the SCells configured in the UE 1601, by using Activation/Deactivation MAC Control Element (CE), at the Nth sub-frame, in operation 1605. The Activation/Deactivation MAC CE refers to an MAC CE that has a fixed size of eight bits and includes seven C fields and one R field. The R field is a reserved filed. The seven C fields are expressed by Ci (e.g., C7, C6, C5, C4, C3, C2, C1). When SCell i is set to '1,' the ENB informs the UE of activation for the secondary carriers. When SCell i is set to '0,' ENB informs UE of deactivation for the secondary carriers. Although the embodiment is described in such a way that the number of C fields is 7, it should be understood that the number of C fields can increase in proportion to the increase in the number of serving cells or carriers which are supported.

UE 1601 identifies an SCell to be activated or deactivated according to the received CE in operation 1607. When a PUCCH SCell is to be activated, UE 1601 identifies first and second time points in operation 1609. On the other hand, when activated SCell is not PUCCH SCell, UE performs corresponding functions according to a general, SCell activation procedure. The first and second time points are N+m sub-frame and N+n sub-frame respectively, where m and n are integers greater than or equal to one and m<n (e.g., m=8, n=24 or 34, etc.). The time from the first time point to the second time point refers to a time that UE 1601 can rapidly execute operations from among the operations related to the activation of UE 1601. The m is set based on a time that UE 1601 takes to receive and decode an Activation/Deactivation MAC CE and to detect the meaning. It is preferable that m is set to a relatively large value considering UE of relatively low performance.

After that, UE 1601 is capable of performing first operations related to the PUCCH SCell from the first time point, N+m sub-frame, to the second time point, N+n, in operation 1611. Examples of the first operations are as follows.

Start Power Headroom reporting
The power headroom information indicates available amount of transmission power in corresponding UE.
Start CSI reporting
The CSI includes CQI/PMI/RI/PTI, etc. to assist an ENB to perform link adaptation and scheduling for a corresponding UE. In the embodiment, the CSI is not used to force UE to make an immediate report at the first time point, considering various process speeds of UE, i.e., considering the process rate until the PUCCH SCell has been activated. The CSI can be transmitted between the first and second time points. The CSI is reported not via a PUCCH of a PSCell, but via its PUCCH (i.e., PUCCH of the SCell). The CSI includes: the CSI regarding the PUCCH SCell; and CSI regarding other activated SCells in the PUCCH cell group that the PUCCH SCell belonged to.
Channel Quality Indicator (CQI): in a transmission format recommending a channel satisfying a bit error probability of 10%
Precoding Matrix Index (PMI): an index used for closed-loop spatial multiplexing
Rank Indicator (RI): recommending transmission rank
Precoder Type Indication (PTI)
Start monitoring Physical Downlink Control Channel (PDCCH) from SCell
Start transmitting Sounding Reference Symbol (SRS), only for a case where a sounding reference signal is set
Scheduling Request reporting
Scheduling Request of PUCCH SCell and information regarding scheduling requests of other SCells in the PUCCH cell group that the PUCCH SCell belonged to are reported to ENB In the conventional art, CSI is reported to an ENB via PUCCH of a PCell, immediately at the first time point. When a PUCCH SCell is activated, it needs to prepare for additional PUCCH, unlike other SCells. Therefore, it may not have prepared for the transmission of CSI at the first time point, according to process speeds of UE. In particular, since UE and ENB need to simultaneously and precisely start the CSI reporting, if CSI is not prepared, error can occur. Therefore, unlike the conventional art, the embodiment does not force a series of the processes described above, but enables UE to have flexible time to completely prepare for the activation of the PUCCH SCell. That is, through the best effort delivery, CSI can be transmitted between the first and second time points.

UE 1601 is capable of performing second operations, below, at the second time point in operation 1612.
CSI reporting
UE reports CSI to ENB at the second time point. This is to ensure that UE reports CSI to ENB at least one time since the second time point. The CSI can include the CSI regarding the PUCCH SCell and CSI regarding other SCells in the PUCCH cell group that the PUCCH SCell belonged to.
Start operating sCellDeactivationTimer
When transmission/reception of data is not performed before the timer expires, UE automatically deactivates a corresponding SCell after the timer has expired. UE starts operating the timer at the second time point. The timer re-starts each time that data transmission/reception is performed in the uplink/downlink. When PUCCH SCell is activated, the start point of the sCell-DeactivationTimer is an arrangement between UE and ENB. Therefore, the first time point, N+m, can be defined as the start time point of the sCellDeactivation- Timer. However, when it is assumed that the PUCCH SCell normally executes all functions at the second time point, it is proper to start the sCellDeactivation-Timer at the second time point.

In another embodiment, PUCCH SCell does not employ the sCellDeactiviationTimer, unlike other SCells. Since the PUCCH SCell reports, to the ENB, its PUCCH information and uplink PUCCH information regarding other SCell, when the ENB does not precisely set the timer, UE cannot deactivate the PUCCH SCell. Many methods can be considered so as not to apply sCell-DeactivationTimer to a PUCCH SCell. For example, the timer applied to the PUCCH Sell can be set to the infinity, unlike other SCell. Since the timer set to the infinity does not expire regardless of the starting time point, the UE may not expire for the PUCCH SCell. Another method is to allow PUCCH SCell to ignore the timer operation of the sCellDeactiviationTimer. The SCellDeactivationTimer can apply the same value to all the serving cells in the same cell group. The PUCCH SCell can be defined in such a way that it is not deactivated although the timer expires.

After that, ENB 1603 informs UE 1601 of SCells to be activated/deactivated from among the SCells configured the UE 1601, by using Activation/Deactivation MAC Control Element (CE), at the Pth sub-frame, in operation 1613. The Activation/Deactivation MAC CE refers to an MAC CE that has a fixed size of 8 bits and includes seven C fields and one R field. The R field is a reserved filed. The seven C fields are expressed by Ci (e.g., C7, C6, C5, C4, C3, C2, C1). When the identifier i of SCell is set to '1,' ENB informs UE of activation for the secondary carriers. When the identifier i of SCell is set to '0,' ENB informs UE of deactivation for the secondary carriers. The i refers to an identifier indicating a sub-carrier and is integers between 1 and 7. Each time a new sub-carrier is set, the ENB informs the UE of identifier i along with the subcarrier information. Although the embodiment is described in such a way that the number of C fields is seven, it should be understood that the number of C fields can increase in proportion to the increase in the number of serving cells or carriers which are supported.

UE 1601 is capable of identifying SCells to be activated or deactivated according to the received CE in operation 1615. When a specific SCell is activated, UE 1601 identifies the third time point in operation 1617. The third time point is P+o sub-frame, where o is integers greater than or equal to one (e.g., o=8). The second time point is set to the same value as the first time point. After that, the UE 1601 is capable of performing third operations to be executed before P+o sub-frame as the second time point in operation 1619. Examples of the third operation are as follows. The following operations are not related to the interactions between UE and ENB, so that UE does not need to stop the operations at a preset time point.

Stop operating sCellDeactivationTimer
When UE receives a deactivation command during the operation of sCellDeactiviationTimer, it stops operating sCellDeactivationTimer.
Delete HARQ buffer
HARQ buffer, for a PUCCH SCell and an SCell in the PUCCH cell group that the PUCCH SCell belonged to, is deleted.
Stop monitoring Physical Downlink Control Channel (PDCCH) from SCell
Stop transmitting Sounding Reference Symbol (SRS)
Remove UL-SCH
UL-SCH, related to a PUCCH SCell and an SCell in the PUCCH cell group that the PUCCH SCell belonged to, is deleted
Stop RACH
When random access, for a PUCCH SCell and an SCell in the PUCCH cell group that the PUCCH SCell belonged to, is triggered, but the random access to the ENB has not successfully been performed, the random access is stopped.
Stop SR
When SR, for a PUCCH SCell and an SCell in the PUCCH cell group that the PUCCH SCell belonged to, is triggered, but there is an SR that has not successfully reported to the ENB, the SR is stopped.

After that, UE 1601 is capable of performing fourth operations to be executed at P+o sub-frame as the third time point in operation 1621. Examples of the fourth operations are as follows. Since the following operations are related to the interactions between UE and ENB, when UE does stop the operations at a preset time point, this can deteriorate the performance of the ENB. For example, although UE stops reporting CSI, when the ENB does not recognize the stoppage of CSI reporting by UE, the ENB may not detect a correct channel status of the UE and thus make a schedule incorrectly.

Stop CSI reporting
Stop reporting CSI of PUCCH SCell and CSI of other SCells in the PUCCH cell group that the PUCCH SCell belonged to.

As the UE 1601 performs the processes described above, all the operations are correctly executed.

Figure 17:
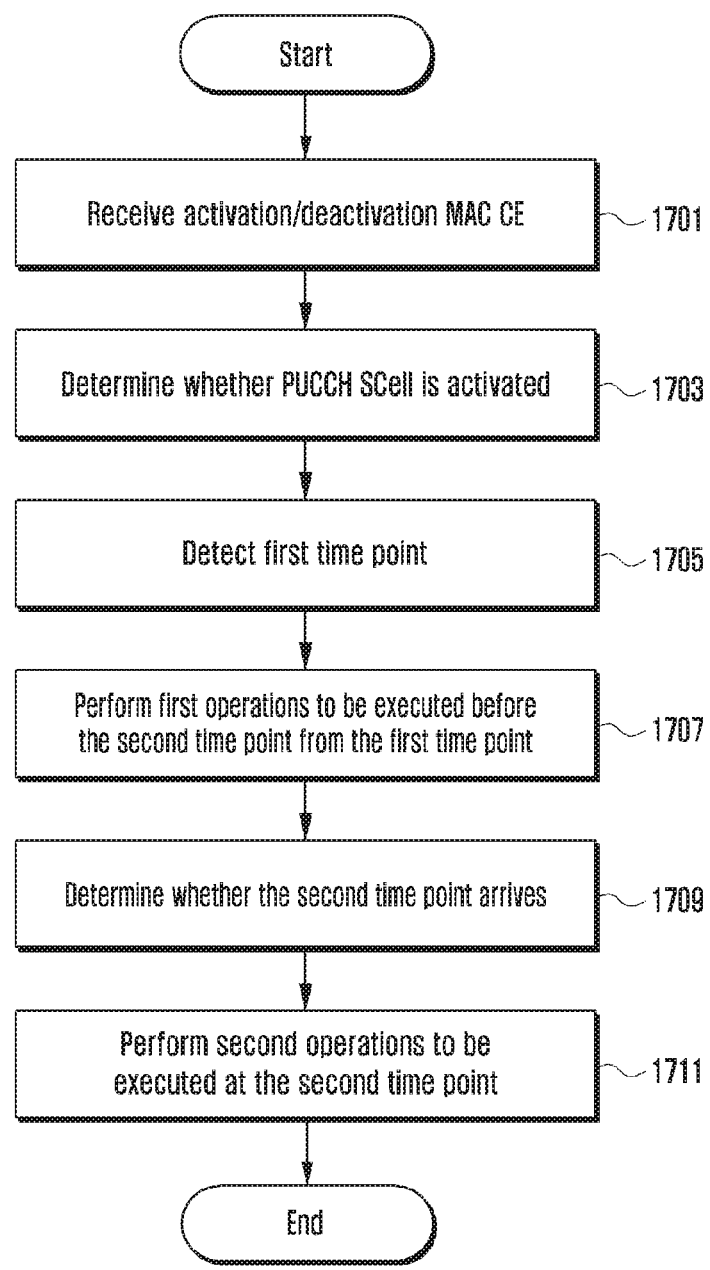
FIG. 17 illustrates a method for UE to activate PUCCH SCell according to a third embodiment of the present disclosure.

FIG. 17 is a flow diagram showing a method for UE (e.g., UE 1701) to activate PUCCH SCell according to a third embodiment of the present disclosure.

UE 1701 is capable of receiving an Activation/Deactivation MAC CE including a bitmap of, e.g., 8 bits, at N sub-frame, in operation 1701. Each of the bits in the bitmap of the MAC CE can indicate a condition as to whether a corresponding SCell is activated or deactivated.

After receiving the MAC CE, the UE 1701 is capable of identifying an SCell to be newly activated and determining whether a PUCCH SCell is activated in operation 1703. For example, UE is capable of identifying deactivated SCells before receiving the MAC CE, and then determining, when receiving the MAC CE, whether the bitmap of the MAC CE has an 'activation' mark for the deactivated SCells.

When UE ascertains that a PUCCH SCell is activated in operation 1703, it is capable of determining whether the first time point arrives in operation 1705. When the first time arrives in operation 1705, UE performs first operations to be executed from the first time point to the second time point in operation 1707. As described above referring to FIG. 16, from the time point that the Activation/Deactivation MAC CE is received at N sub-frame: when a time of m sub-frame has elapsed, N+m sub-frame is the first time point; and when a time of n sub-frame has elapsed, N+n sub-frame is the second time point. UE is capable of performing first operations to be executed between the first time point and the second time point based on N+m subframe. As described above referring to FIG. 16, the first operations can include the following operations.

Start CSI reporting
Start monitoring Physical Downlink Control Channel (PDCCH) from SCell Start transmitting Sounding Reference Symbol (SRS), only for a case where a sounding reference signal is set Start Power Headroom reporting The power headroom information indicates available amount of transmission power in corresponding UE.

Scheduling Request reporting

The m refers to a preset value that UE and ENB have already known (e.g., m=8).

UE is capable of identifying a second time point and determining whether the second time point arrives in operation 1709. When the second time arrives in operation 1709, UE is capable of performing the second operations at the second time point in operation 1711. As described above referring to FIG. 16, the second operations can include the following operations.

Report CSI

Start sCellDeactivationTimer

Figure 18:
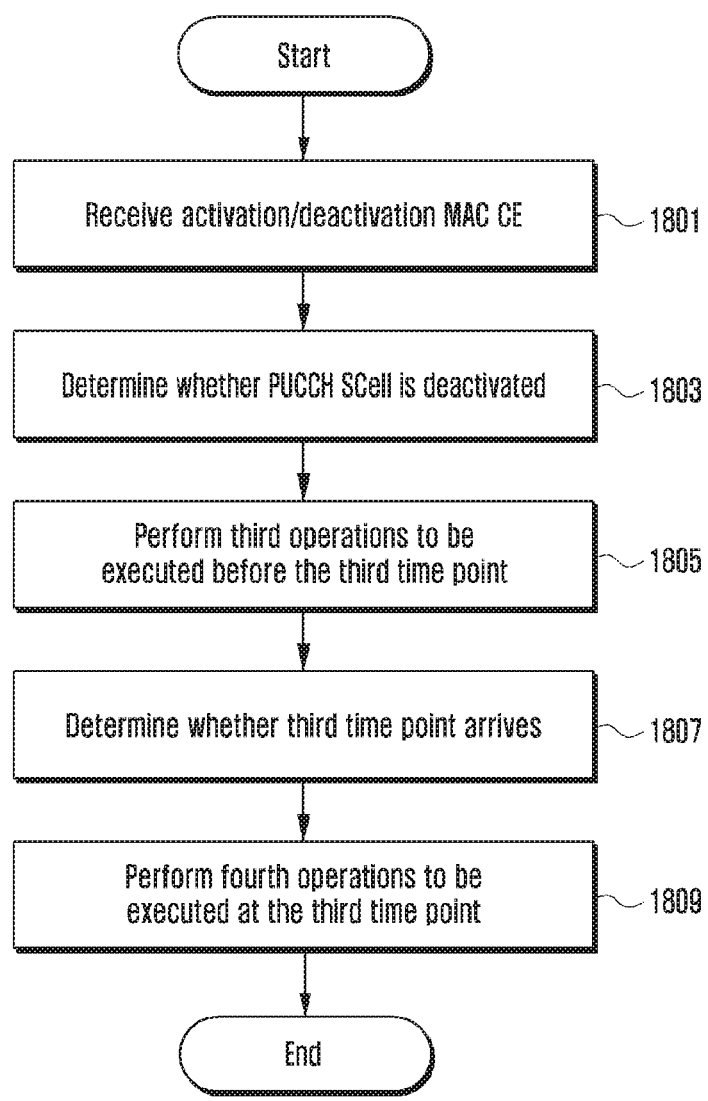
FIG. 18 illustrates a method for UE to deactivate PUCCH SCell according to a third embodiment of the present disclosure.

FIG. 18 is a flow diagram showing a method for UE (e.g., UE 1801) to deactivate PUCCH SCell according to a third embodiment of the present disclosure.

UE 1801 receives an Activation/Deactivation MAC CE including a bitmap of, e.g., 8 bits, at N sub-frame, in operation 1801. Each of the bits in the bitmap of the MAC CE can indicate a condition as to whether a corresponding SCell is activated or deactivated.

After receiving the MAC CE, the UE is capable of identifying an SCell to be newly deactivated and determining whether a PUCCH SCell is deactivated in operation 1803. For example, UE is capable of identifying activated SCells before receiving the MAC CE, and then determining, when receiving the MAC CE, whether the bitmap of the MAC CE has a 'deactivation' mark for the activated SCells.

When UE identifies a PUCCH SCell to be deactivated, it is capable of identifying a third time point and then performing third operations to be executed before the third time point in operation 1805. As described above referring to FIG. 16, the third operations can include the following operations.

Stop monitoring Physical Downlink Control Channel (PDCCH) from SCell

Stop transmitting Sounding Reference Symbol (SRS)

Stop sCellDeactivationTimer

Delete HARQ buffer

Remove UL-SCH

Stop RACH

Stop SR

After that, UE is capable of determining whether the third time point arrives in operation 1807. As described above referring to FIG. 16, from the time point that the Activation/Deactivation MAC CE is received at P sub-frame, when a time of o sub-frame has elapsed, it is the P+o sub-frame. The P+o sub-frame is the third time point. UE is capable of performing fourth operations to be executed, at the third time point, based on the P+o subframe, in operation 1809. As described above referring to FIG. 16, the fourth operations can include the following operations.

Stop CSI reporting

The o value refers to a preset value that UE and ENB have already known (e.g., o=8).

Figure 19:
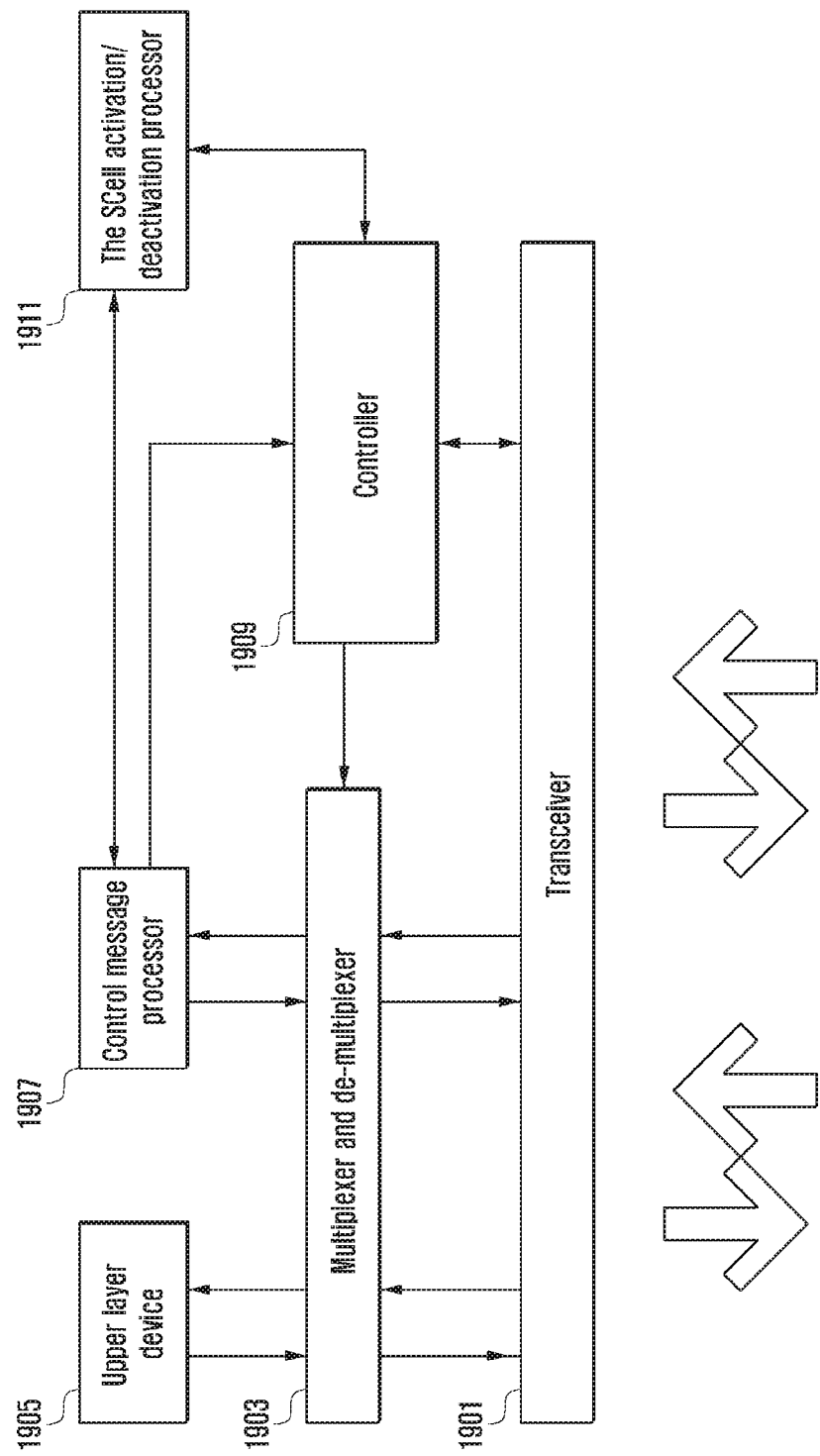
FIG. 19 is a high-level block diagram of UE according to a third embodiment of the present disclosure.

FIG. 19 is a block diagram of UE according to a third embodiment of the present disclosure.

The UE is capable of including at least one of the following: a transceiver 1901, a multiplexer and demultiplexer 1903, a upper layer device 1905, a control message processor 1907, a controller 1909 and an SCell activation/deactivation processor 1911. It should be understood that the present disclosure is not limited to the embodiment. For example, UE can include a communication module (e.g., a transceiver) and at least one processor (e.g., a controller, an SCell activation/deactivation processor, a control message processor, an upper layer device, and a multiplexer and demultiplexer) configured to control the communication module and to perform operations according to the embodiment.

UE is capable of transmitting/receiving data via the upper layer device 1905 and control messages via the control message processor 1907. In transmission of data, the controller 1909 controls the multiplexer-demultiplexer 1903 to multiplex data, and the transceiver 1901 to transmit the multiplexed data. In reception of data, the controller 1909 controls the transceiver 1901 to receive physical symbols and the multiplexer-demultiplexer 1903 to de-multiplex the symbols, and transfers the de-multiplexed data to the upper layer device 1905 or the control message processor 1907 according to the message information.

In the embodiment, when the control message processor 1907 receives the Activation/Deactivation MAC CE, it informs the SCell activation/deactivation processor 1911 of the reception of Activation/Deactivation MAC CE. When a PUCCH SCell is activated, the SCell activation/deactivation processor 1911 determines a first time point. When the first time point arrives, the SCell activation/deactivation processor 1911 instructs the controller 1909 and the control message processor 1907 to perform the first operations at the first time point. When the control message processor 1907 receives a command for deactivating an activated PUCCH SCell, the SCell activation/deactivation processor 1911 determines a third time point, and instructs the controller 1909 and the control message processor 1907 to perform third operations to be operated before the third time point. When the third time point arrives, the SCell activation/deactivation processor 1911 instructs the controller 1909 and the control message processor 1907 to perform fourth operations to be operated at the third time point.

According to the third embodiment of the present disclosure, the method employing a carrier aggregation technology can perform preset operations at preset time points when an SCell is activated or deactivated, thereby preventing communication-malfunctions and performing precise operations.

Fourth Embodiment

Figure 20:
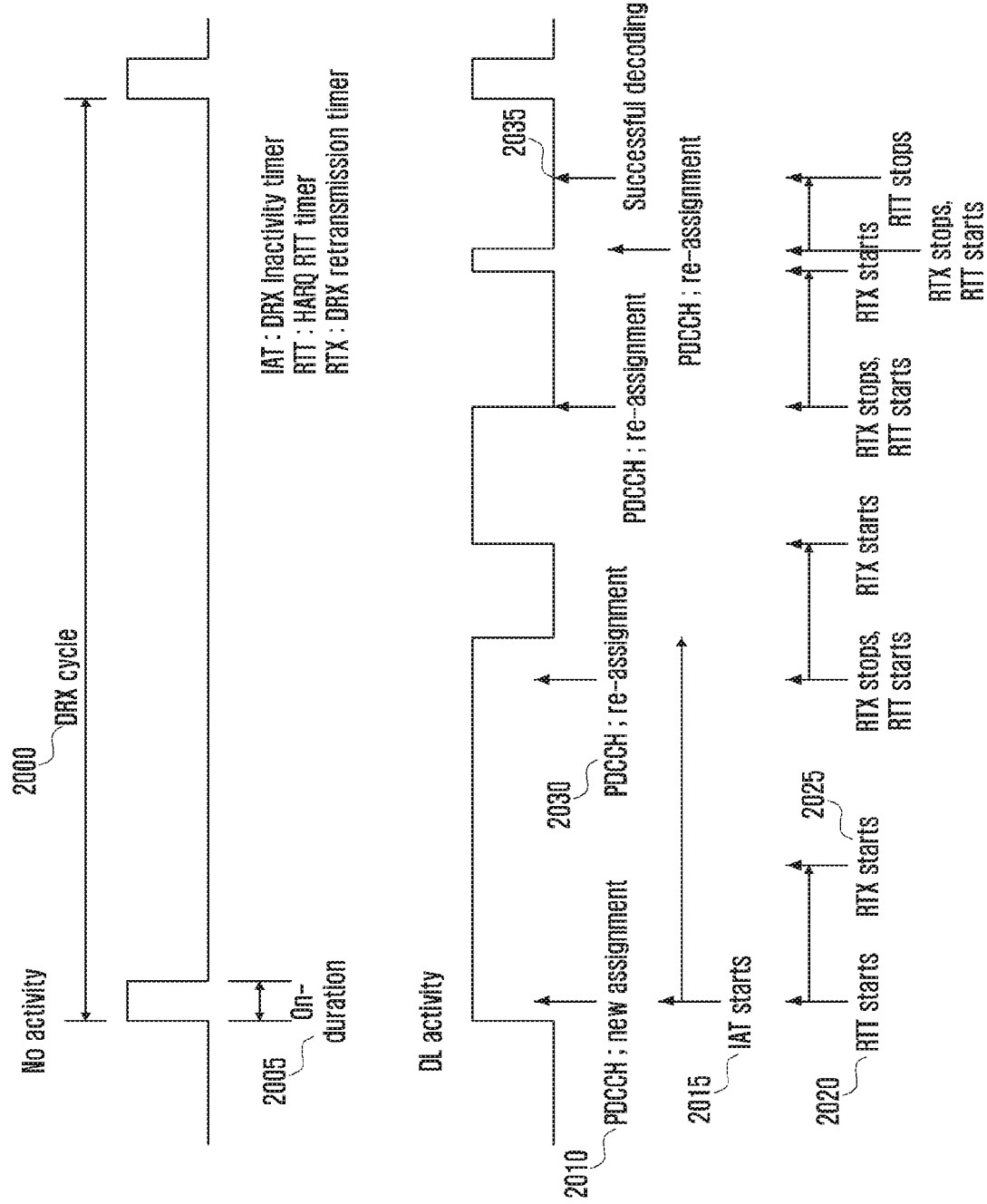
FIG. 20 illustrates discontinuous reception (DRX) according to the present disclosure.

FIG. 20 shows diagrams that describe discontinuous reception (DRX) according to the present disclosure.

DRX is a technology that is used to minimize power consumption in UE and performs a monitoring operation to obtain scheduling information in only a preset PDCCH. DRX can support both a standby mode and a connection mode. DRX operations in a standby mode and connection mode differ from each other. The embodiment of the present disclosure relates to DRX in a connection mode. When UE continuously monitors PDCCH to obtain scheduling information, this can result in high power consumption. Basically, DRX has a DRX cycle 2000 and monitors PDCCH for only on-duration 2005. The DRX cycle can be set to a long DRX and a short DRX in a connection mode. In general, the DRX cycle is set to a long DRX cycle. ENB can trigger a short DRX cycle by using MAC Control Element (CE) as the need arises. After a period of time has elapsed, UE alters the short DRX cycle to the long DRX cycle. The initial scheduling information of a particular UE device is provided to only a preset PDCCH. Therefore, UE periodically monitors only the PDCCH, thereby minimizing the power consumption.

When scheduling information regarding new packets is received via the PDCCH for on-duration 2005 in operation 2010, UE starts DRX inactivity timer 2015. UE maintains the active state for DRX inactivity timer. That is, UE continues monitoring PDCCH. UE also starts HARQ RTT timer 2020. The HARQ RTT timer is used to prevent UE from unnecessarily monitoring the PDCCH for HARQ RTT (Round Trip Time). Therefore, UE does not need to monitor the PDCCH during the time that the timer operates. However, during the time that both the DRX inactivity timer and the HARQ RTT timer are simultaneously operating, UE continues monitoring the PDCCH based on the DRX inactivity timer. The HARQ RTT timer expires and then the DRX retransmission timer 2025 starts to operate. During the time that the DRX retransmission timer is operating, UE needs to monitor the PDCCH. In general, during the time that the DRX retransmission timer operates, scheduling information for HARQ re-transmission is received in operation 2030. When receiving the scheduling information, UE immediately stops the DRX retransmission timer and re-starts the HARQ RTT timer. These operations are continued until the packet is successfully received in operation 2035.

Configuration information related to DRX operations in a connection mode is transmitted to UE via RRCConnectionReconfiguration message. on-duration timer, DRX inactivity timer, and DRX retransmission timer are defined as the number of PDCCH subframes. Since the timer starts to operate, when a preset number of subframes defined as PDCCH subframe have passed by, the timer expires. All the downlink subframes belonged to the PDCCH subframes in FDD. The downlink subframes and special subframes belong to the PDCCH subframes in TDD. The downlink subframe, uplink subframe, and special subframe, in the same frequency band, exist in TDD. Of them, the downlink subframe and special subframe are considered to be the PDCCH subframe.

Figure 21:
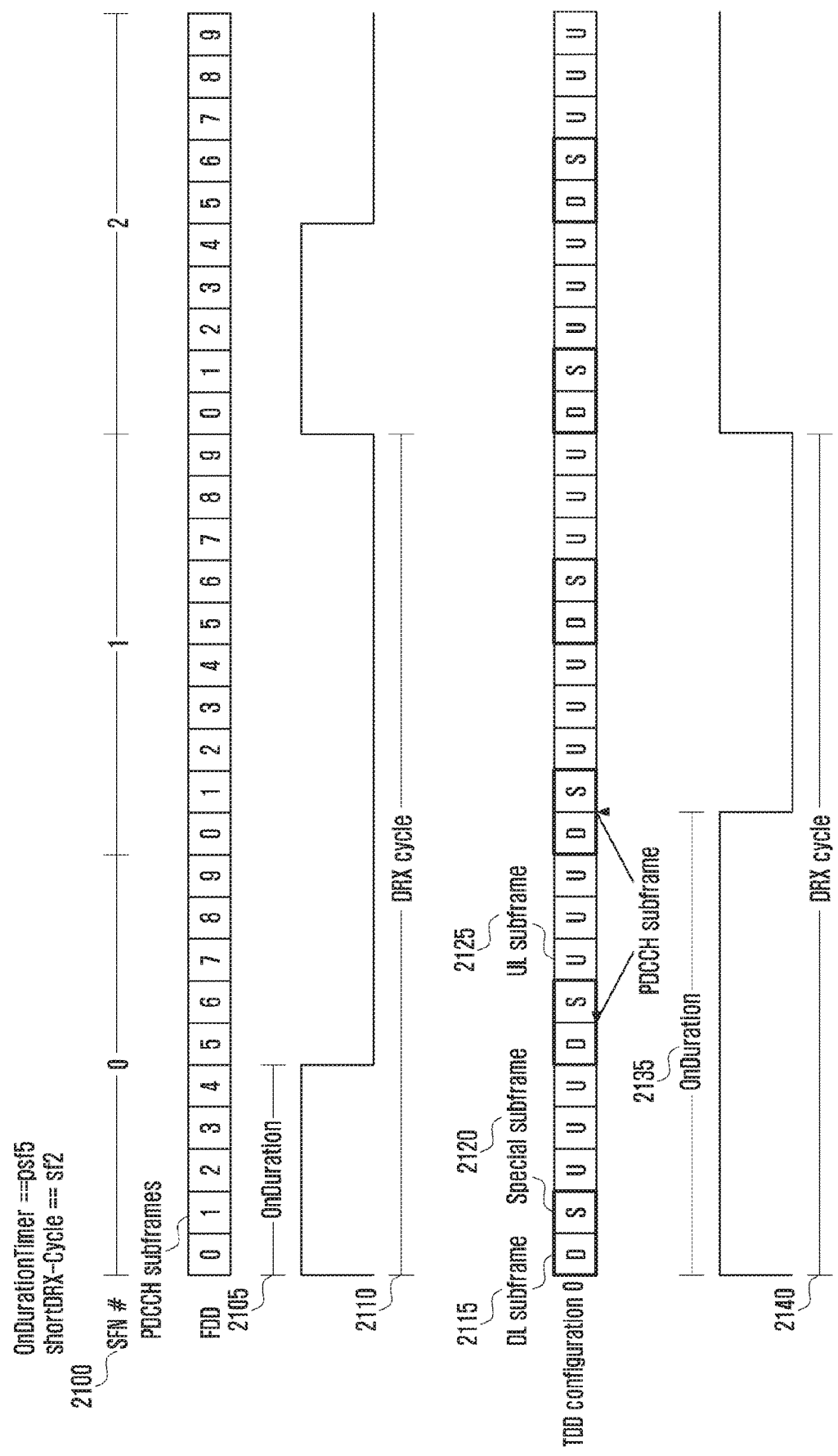
FIG. 21 illustrates a method of calculating an on-duration time in FDD and TDD according to the present disclosure.

FIG. 21 shows diagrams that describe a method of calculating an on-duration time in FDD and TDD according to the present disclosure.

ENB provides UE with a value of the onDurationTimer via a message, RRCConnectionReconfiguration. For example, it is assumed that the value of the timer is defined as 5 PDCCH subframes and the short DRX cycle is 2 frames. In this case, in FDD, all the subframes 2100 are considered to be the PDCCH subframe. Therefore, since the onDurationTimer started to operate, when 5 subframes have passed by, the timer expires. That is, the onDuration time interval is 5 ms. After two frames of the DRX cycle 2110 have passed by, the onDurationTimer re-starts to operate. In TDD, the downlink subframe 2115 and special subframe 2120 are considered to be the PDCCH subframe 2130. Since the onDurationTimer started due to not the PDCCH subframe but due to the uplink subframes 2120, after 11 ms has elapsed, 5 PDCCH subframes are counted. That is, the onDuration time interval is 11 ms. In this case, after two frames of the DRX cycle 2140 have passed by, the onDurationTimer re-starts to operate as described above. Although the embodiment of FIG. 21 is described based on the onDuration time interval, the PDCCH subframe definition can also be applied to the DRX inactivity timer and DRX retransmission timer.

When the LTE system employs the CA technology, the individual serving cells can have different duplex. In addition, although the individual serving cells employ TDD, each subframe interval can have different uplink and downlink subframes according to TDD configurations. Rel-12 LTE standard can employ a technology for dynamically altering uplink and downlink wireless resources according to an amount of uplink and downlink traffic. This is called a flexible TDD configuration in the present disclosure. Specific subframes can be downlink subframes or uplink subframes according to conditions. These specific subframes are called flexible subframes.

Figure 22:
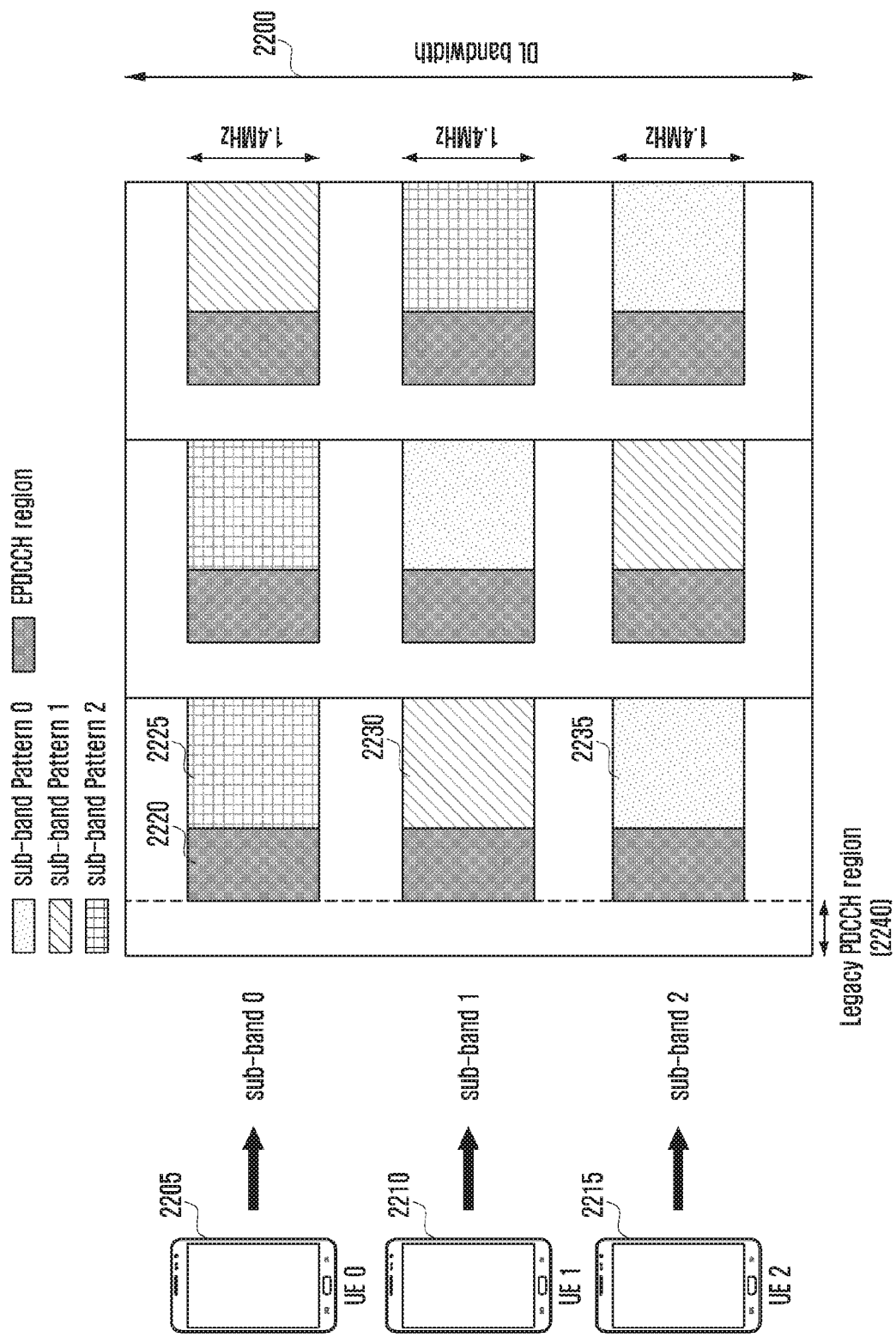
FIG. 22 illustrates EPDCCH and sub-bands that machine type communication (MTC) devices use for access, according to a fourth embodiment of the present disclosure.

FIG. 22 shows diagrams that describe EPDCCH and sub-bands that machine type communication (MTC) devices use for access, according to a fourth embodiment of the present disclosure.

MTC UE employs a limited frequency band of 1.4 MHz. The band of 1.4 MHz can make a frequency hopping. When a number of sub-bands 2225, 2230 and 2235 of 1.4 MHz each exist in a downlink frequency bandwidth 2200, a number of EPDCCH wireless resources 2220 can also exist. According to various embodiments, the EPDCCH wireless resources can be assigned to the sub-frames as shown in FIG. 22 or can be allocated in other ways. MTC devices using a bandwidth of 1.4 MHz are not capable of receiving PDCCH 2240 transmitted via the downlink frequency bandwidth greater than 1.4 MHz. Therefore, MTC devices need a new control channel capable of transmitting scheduling information, instead of the PDCCH. EPDCCH is a control channel that performs transmission in legacy PDSCH region and serves as a PDCCH. Scheduling information for MTC devices can be provided by using the EPDCCH. In this case, individual MTC UE devices 2205, 2210, and 2215 determine a sub-band to use an EPDCCH. In order to disperse load of individual sub-bands, individual MTC UE devices can select one of the sub-bands in random.

Figure 23:
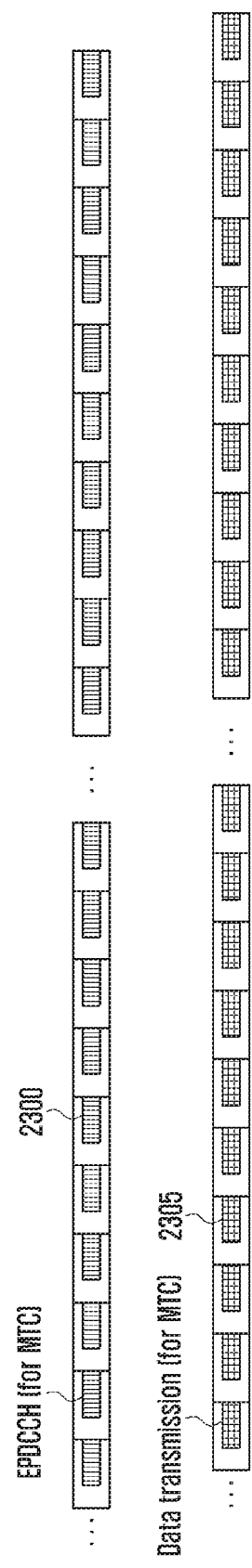
FIG. 23 illustrates a method of re-transmitting data and EPDCCH in order to extend the service area (service coverage) for MTC devices according to a fourth embodiment of the present disclosure.

FIG. 23 shows diagrams that describe a method of re-transmitting data and EPDCCH in order to extend the service area (service coverage) for MTC devices according to a fourth embodiment of the present disclosure.

MTC devices need an extended service area, due to various causes, e.g., employment of a single antenna, low reception performance of a low-priced receiver, installation out of legacy service areas, etc. In order to support an extended service area, ENB repeats the transmission of general data and various control signals for communication. MTC devices process repeatedly transmitted signals via the soft combining technique, so that they can receive corresponding signals at a place remote from and out of the legacy service areas. For example, MTC devices can repeatedly receive EPDDCH 2300 containing scheduling information. The MTC device decodes the received EPDCCHs by soft combining technique. The MTC device receives its data 2305 using the obtained scheduling information. The data can also be received by the repetition transmission.

Figure 24:
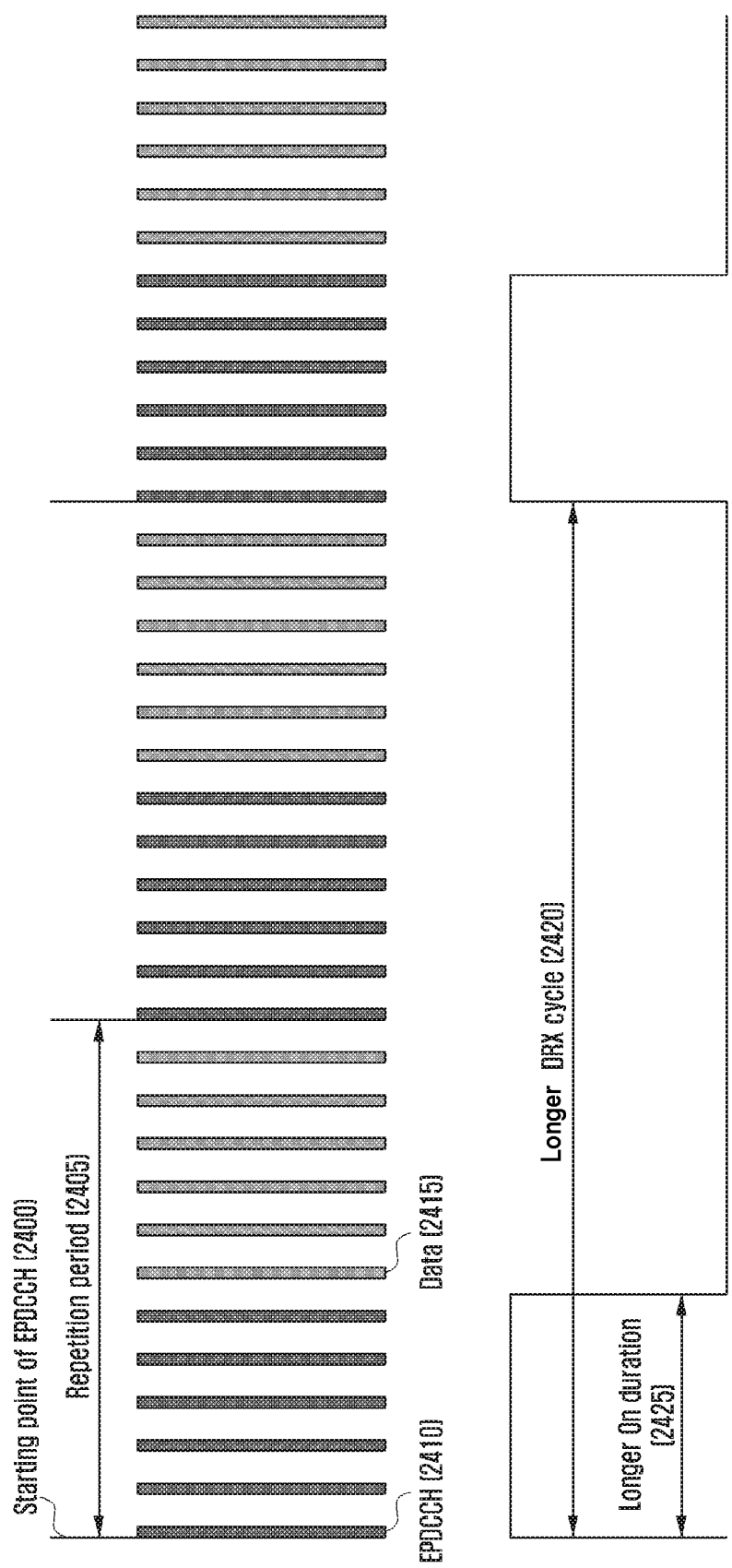
FIG. 24 illustrates a DRX cycle and an EPDCCH repetition period according to a fourth embodiment of the present disclosure.

FIG. 24 shows diagrams that describe a DRX cycle and an EPDCCH repetition period according to a fourth embodiment of the present disclosure.

Although UE employs repetition transmission, it still needs to reduce the power consumption as much as possible. The legacy DRX concept will be used. However, due to repetition transmission, legacy DRX operations cannot be applied to UE. In order to efficiently manage repetition transmission, the repetition transmission starts with a particular timing 2400. That is, repetition transmission of EPDCCH 2410 starts at a predefined timing, and data 2415 indicated by the EPDCCH 2410 is transmitted repeatedly, sequentially. When the repetition transmission of data and EPDCCH is ended, new EPDCCH and data are transmitted repeatedly, sequentially. Therefore, a repetition period 2405 of EPDCCH of a certain size exists between the starting points of a previous EPDCCH and a new EPDCCH. A new DRX cycle 2420 applied to an MTC device can be determined to meet the repetition period. The MTC device wakes up every DRX cycle and needs to obtain EPDCCH. Therefore, if the DRX cycle is not determined to meet the repetition period, the MTC device wakes up in an interval that EPDCCH is not transmitted and attempts to receive EPDCCH. That is, it is preferable that a DRX cycle is set to a multiple of the repetition period of EPDCCH.

The number of repetition of EPDCCH is, for example, 20~200 which is relatively large. Therefore, the repetition period of EPDCCH also increases. This means that the maximum value of the legacy DRX cycle needs to be extended. In addition, the maximum value of the legacy DRX cycle is limited by an SFN cycle. If a DRX cycle of a relatively long value greater than or equal to 10.24 sec is required, the SFN cycle needs to be extended. To this end, SFN bits are additionally provided to the UE.

When a DRX cycle arrives, the MTC device wakes up and needs to receive repeatedly transmitted EPDCCH. This reception needs to be performed within the on-duration 2425. Therefore, the legacy on-duration interval also needs to be extended. The on-duration is so long that the MTC device can receive all repetition transmissions for at least one EPDCCH. For example, when a repetition transmission of EPDCCH is performed every sub-frame for continuous, 40 sub-frames (of 1 ms each), the length of on-duration needs to be at least 40 ms.

Figure 25:
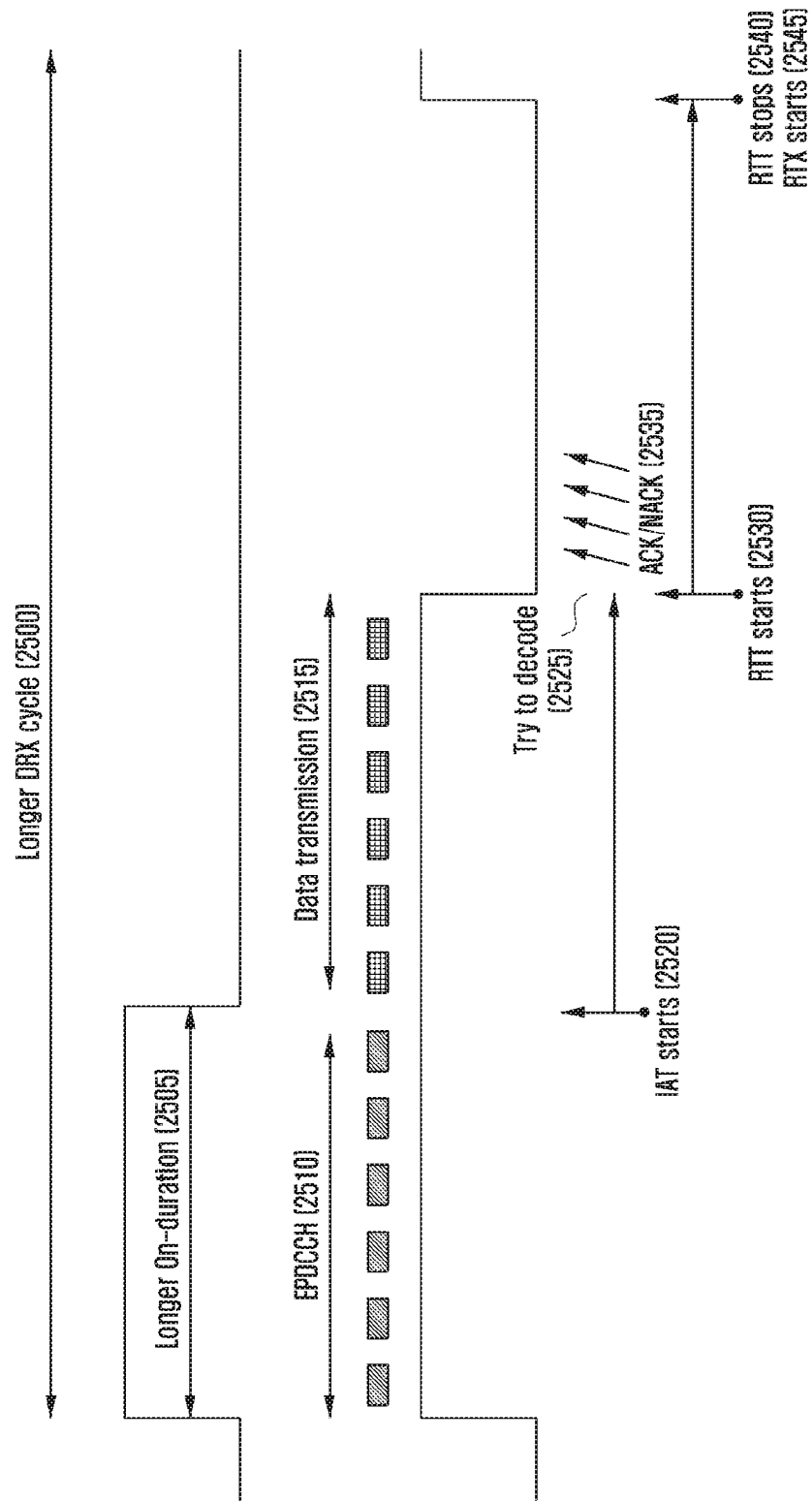
FIG. 25 illustrates an example DRX operation for MTC device according to a fourth embodiment of the present disclosure.

FIG. 25 shows diagrams that describe an example of a DRX operation for MTC device according to a fourth embodiment of the present disclosure;

When an on-duration 2505 arrives within the DRX cycle 2500, the MTC device receives repeatedly transmitted EPDCCH 2510. When the repetition transmission of EPDDCH 2510 is ended, the MTC device decodes the EPDCCH. When the EPDCCH is successfully decoded and contains scheduling information and C-RNTI indicating the MTC device, the MTC device starts a drx-inactivity timer. Otherwise, the MTC device does not start the drx-inactivity timer, and is turned off until the next on-duration arrives. Alternatively, when the EPDCCH decoding fails, the MTC device can inform the ENB of the EPDCCH decoding failure. For example, the MTC device can transmit, to the ENB, an ACK/NACK message for the EPDCCH or an RRC message indicating the reception failure of EPDCCH. Before the repetition transmission of EPDCCH from the ENB is ended, the MTC device attempts to decode only EPDCCH that has been received and can succeed in the EPDCCH decoding. However, the time point that the drx-inactivity timer starts needs to be a time when the repetition transmission of EPDCCH is ended. This is because the ENB ends the repetition transmission of EPDCCH and then starts repetition transmission of data. In addition to the C-RNTI associated with the MTC device, when the EPDCCH includes schedule information, related to TPC-PUCCH-RNTI, TPC-PUSCH-RNTI, Semi-Persistent Scheduling C-RNTI, eIMTA-RNTI, P-RNTI, M-RNTI, SI-RNTI, and RA-RNTI which are associated with the MTC device, the drx-inactivity timer can start.

The MTC device receives its data repeatedly transmitted with the start of the drx-inactivity timer. When the repetition transmission of data is ended (2515), UE decodes the data (2525). The drx-inactivity timer is so long that the MTC device can receive all data repeatedly transmitted. When the MTC device has successfully decoded the data, it transmits the ACK feedback (2535) to the ENB. Otherwise, the MTC device starts an RTT timer (2530). In addition, the MTC device transmits the NACK feedback information (2535) to the ENB. According to an embodiment of the present disclosure, the RTT timer can be started after the repetition reception of data.

The RTT timer of legacy DRX has eight sub-frames (8 ms) in FDD and k+4 sub-frames in TDD. k denotes a time interval between times transmitting HARQ feedbacks related to the downlink transmission. ACK/NACK feedback needs to be re-transmitted in an extended service area mode. Therefore, the legacy RTT timer value is also increased. At least, the legacy RTT timer value needs to include the repetition transmission time interval of the feedback. When the RTT timer stops (2540), the drx-retransmission timer starts (2545). During the operation of the drx-retransmission timer, the MTC device needs to receive EPDCCH. Therefore, the starting point of the drx-retransmission needs to be identical with the starting point of the repletion period (2405) of the EPDCCH, and the period is a multiple of the repletion period of EPDCCH. Alternatively, the time interval of the drx-retransmission is greater than or equal to the repetition transmission interval of the EPDCCH.

The on-duration, the drx-inactivity timer, and the drx-retransmission timer are subjected to the repetition transmission interval of EPDCCH or the repetition transmission of data. Therefore, like the legacy DRX configuration information, the exact values of the timers can be signaled to the MTC device; however, the MTC device can directly obtain the values of the timers, according to a rule, by using the repetition transmission interval of EPDCCH or the repetition transmission interval of data.

Figure 26:
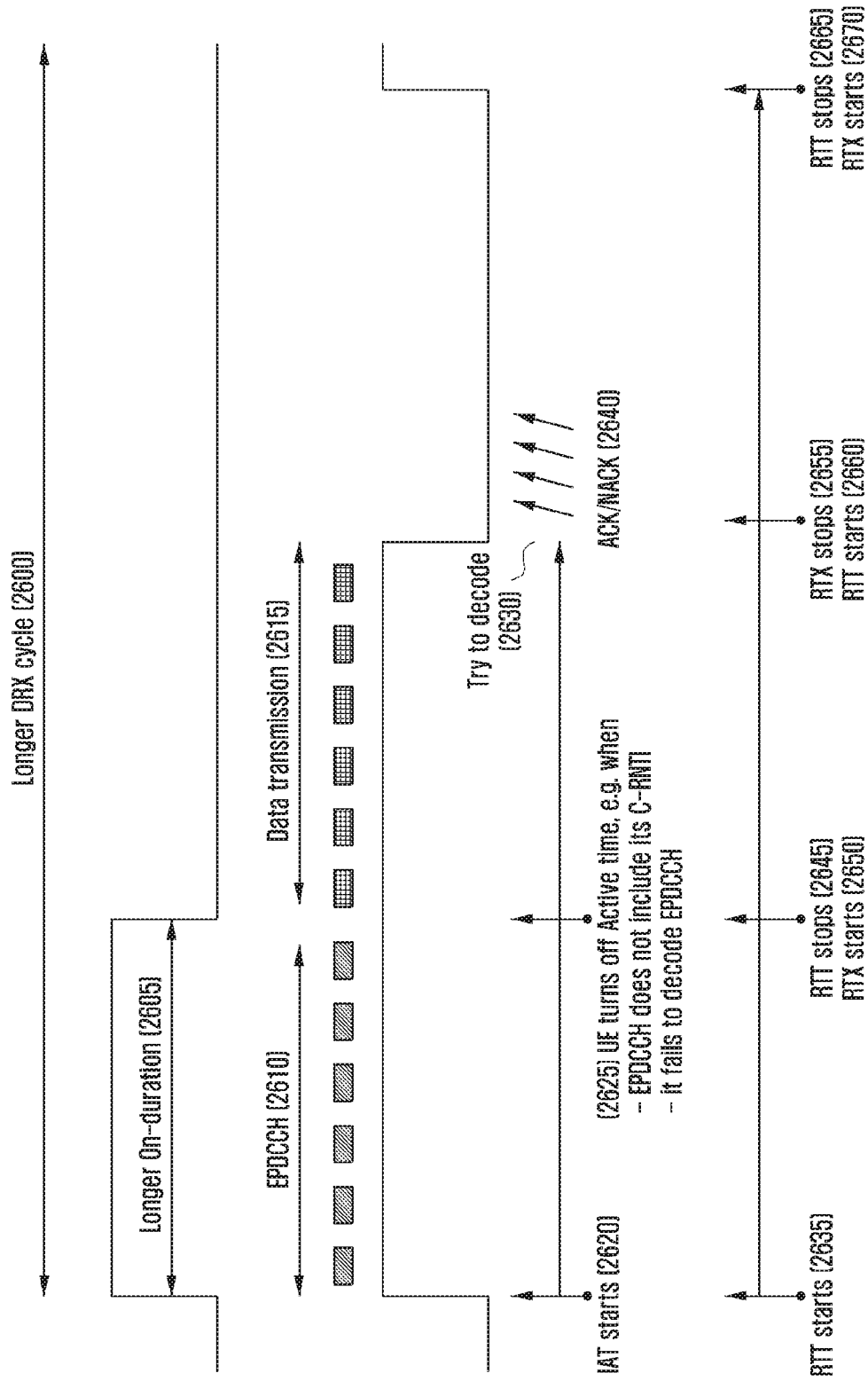
FIG. 26 illustrates another example DRX operation for MTC device according to a fourth embodiment of the present disclosure.

FIG. 26 shows diagrams that describe another example of a DRX operation for MTC device according to a fourth embodiment of the present disclosure.

When an on-duration 2605 arrives within the DRX cycle 2600, the MTC device receives repeatedly transmitted EPDCCH 2610.

In the embodiment, the starting point of the drx-inactivity timer is defined as the starting point of the transmission of EPDCCH (2620). In this case, the length of the drx-inactivity timer is greater than or equal to all the repetition transmission intervals of EPDCCH and data. In order to prevent the MTC device from unnecessarily being active, the drx-inactivity timer is ended: when the decoding is performed after the repetition transmission of EPDCCH is ended; when C-RNTI of the MTC device does not exist; or when the decoding fails. When the decoding fails, the MTC device can inform the ENB of the decoding failure. The RTT timer 2635 starts at the starting point of the transmission of EPDCCH and has the same timer value as the EPDCCH repetition transmission interval (=data repetition transmission interval). Therefore, when the EPDCCH repetition transmission interval is ended, the RTT timer also stops (2645) and the drx-retransmission timer starts (2650).

The MTC device receives its repeatedly transmitted data (2615). When the data repetition transmission is completed, the UE decodes the data (2630). The value of the drx-retransmission timer is identical to the data repetition transmission interval. When the data repetition transmission interval is ended, the drx-retransmission timer also expires (2655). When the MTC device has successfully decoded the data, the UE transmits ACK feedback 2640 to the ENB. On the other hand, when the MTC device has failed to decode the data, it re-starts the RTT timer (2660) and also transmits NACK feedback 2640 to the ENB. When the RTT timer is ended (2665), the drx-retransmission timer re-starts (2670).

Figure 27A:
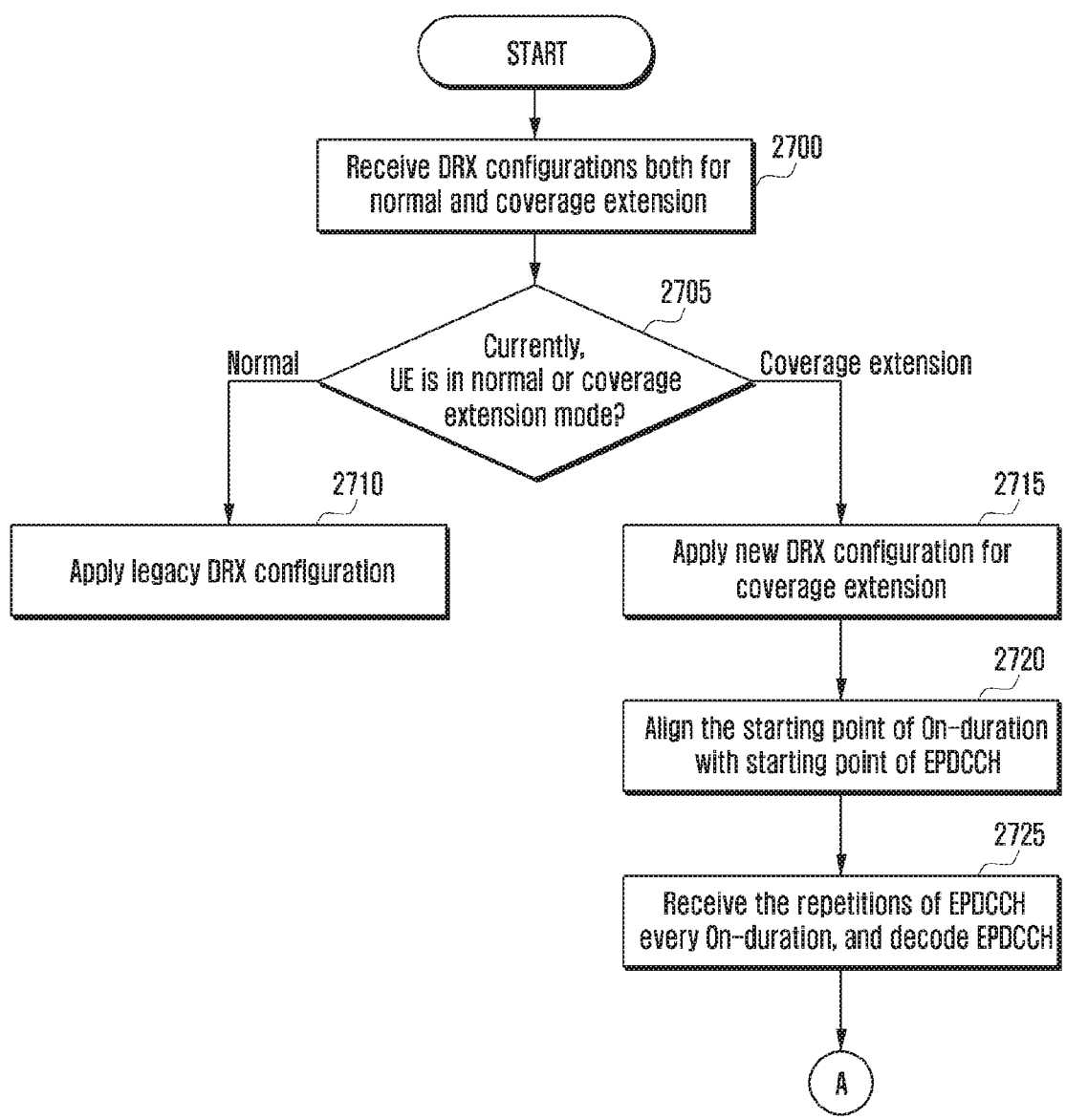

FIGS. 27A and 27B are flow diagrams that describe an example of the operation of UE operations of UE according to a fourth embodiment of the present disclosure. FIGS. 27A and 27B are illustrated, based on the embodiment referring to FIG. 25.

UE receives, from the ENB, general DRX configuration information and DRX configuration information to be applied to an MTC device in operation 2700. Like general DRX configuration information, the DRX configuration information to be applied to an MTC device can be explicitly indicated to the MTC device. The MTC device can derive part of the DRX configuration information, such as on-duration, drx-InactivityTimer, drx-RetransmissionTimer, etc., considering the EPDCCH repetition interval or the data repetition interval, instead of receiving details regarding the DRX configuration from the ENB. For example, the timer value of the drx-RetransmissionTimer and on-duration can be identical with the repetition interval of EPDCCH. The value of the drx-InactivityTimer can be identical with the repetition interval of data. The legacy RTT timer has eight sub-frames in FDD and k+4 sub-frames in TDD. k denotes a time interval between times transmitting HARQ feedbacks related to the downlink transmission timing. The unit is sub-frame. The RTT timer value applied to an MTC device can be a repetition interval of data or the sum of a repetition interval of data and the legacy RTT timer value. In a case where the MTC device derives the DRX configuration information, the ENB needs to transmit, to the MTC device, an indicator informing that DRX configuration information for MTC devices, not legacy DRX configuration information, is available.

The MTC device determines whether its mode is a normal mode or coverage extension mode in operation 2705. When the MTC device is in a normal mode in operation 2705, it can apply general DRX configuration information in operation 2710. When the MTC device is in a coverage extension mode in operation 2705, it can apply new DRX configuration information for coverage extension in operation 2715.

The MTC device matches the starting point of the on-duration timer with the starting point of EPDCCH in operation 2720. The MTC device is capable of receiving the repetitions of EPDCCH every on-duration and attempting to decode the EPDCCH in operation 2725.

The MTC device is capable of determining whether EPDCCH is successfully decoded and the EPDCCH includes C-RNTI associated with the MTC device in operation 2730. The MTC device can also consider RNTI for the determination, in addition to the C-RNTI. Since this was already explained above, its detailed illustration is omitted in FIGS. 27A and 27B. When the MTC device ascertains that EPDCCH does not include C-RNTI in operation 2730, it switches the current mode to a sleep mode in operation 2740. On the other hand, when the MTC device ascertains that EPDCCH includes C-RNTI in operation 2730, it can start the drx-InactivityTimer in operation 2735.

The MTC device receives the repeatedly transmitted data and decodes it in operation 2745. The MTC device determines whether it successfully decodes the data in operation 2750. When the MTC device successfully decoded the data in operation 2750, it switches the current mode to a sleep mode in operation 2760. On the other hand, when the MTC device did not successfully decode the data in operation 2750, it starts the RTT timer in operation 2755. When the RTT timer expires, the MTC device can start the drx-RetransmissionTimer in operation 2765. While the drx-RetransmissionTimer is in operation, the MTC device is capable of receiving the repeatedly transmitted EPDCCH and attempting to decode the EPDCCH in operation 2770. After that, the MTC device can return to operation 2730.

Figure 28:
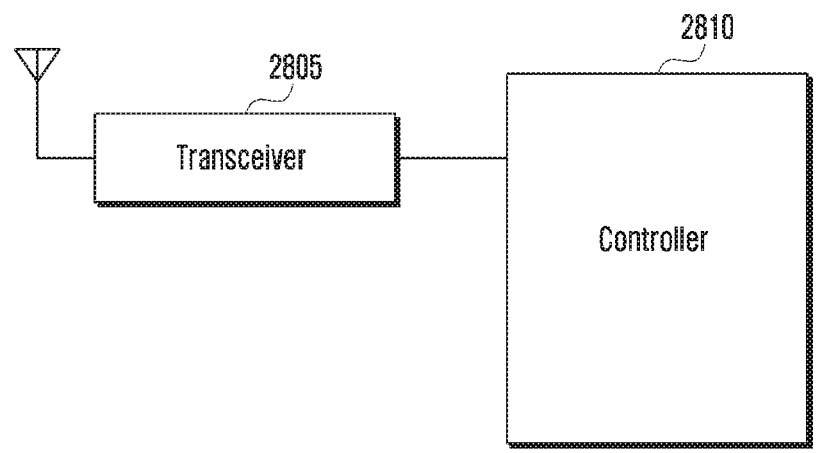
FIG. 28 is a diagram showing the configuration of UE according to a fourth embodiment of the present disclosure.

FIG. 28 is a diagram showing the configuration of UE (e.g., MTC device) according to a fourth embodiment of the present disclosure.

Referring to FIG. 28, the UE is capable of including a transceiver 2805 and a controller 2810.

The transceiver 2805 is capable of transmitting/receiving control signals and data to/from ENB under the control of the controller 2810.

The controller 2810 is capable of controlling operations of the UE according to the fourth embodiment of the present disclosure. For example, the controller 2810 is capable of receiving DRX configuration information and performing DRX configuration. The controller 2810 is capable of controlling the repetition transmission of data and the repetition transmission of EPDCCH for coverage extension. The controller 2810 is capable of executing or ending the drx-InactivityTimer, drx-RetransmissionTimer and HARQ RTT timer, related to the DRX operation.

Figure 29:
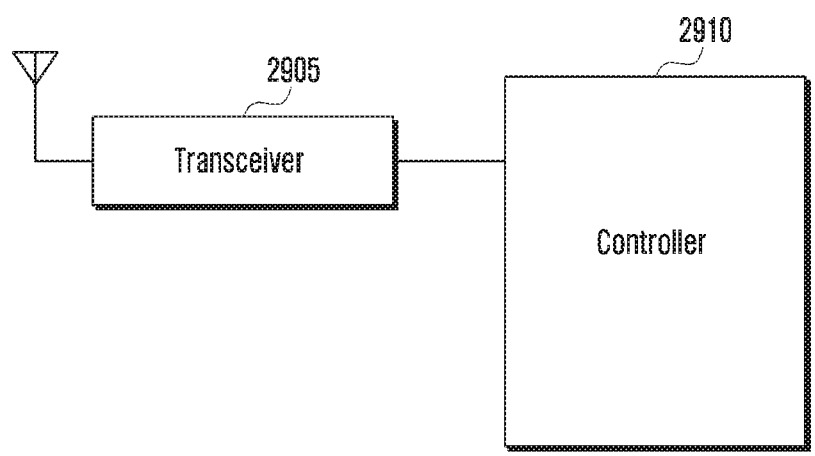
FIG. 29 is a diagram showing the configuration of an ENB according to a fourth embodiment of the present disclosure.

FIG. 29 is a diagram showing the configuration of an ENB according to a fourth embodiment of the present disclosure.

Referring to FIG. 29, the ENB is capable of including a transceiver 2905 and a controller 2910.

The transceiver 2905 is capable of transmitting/receiving control signals and data to/from UE under the control of the controller 2910.

The controller 2910 is capable of controlling operations of the ENB according to the fourth embodiment of the present disclosure. For example, the controller 2910 is capable of controlling the transmission of DRX configuration information including on-duration to UE and also the repetition transmission of data and the repetition transmission of EPDCCH.

Fifth Embodiment

With the rapid development of wireless communication technology, communication systems have also been evolved. One of the systems is an LTE system as the fourth generation mobile communication technology, attracting attention. In the LTE system, various technologies, e.g., carrier aggregation (CA), have been introduced to meet the rapid increase in the demand for traffic. Carrier aggregation (CA) refers to a technology that increases the number of carriers in communication between user equipment (UE) and a base station (E-UTRAN NodeB, ENB), to employ from one carrier in conventional art to a primary carrier and one or more secondary carriers, thereby increasing the amount of transmission by the number of secondary carriers. In LTE technology, a cell where a primary carrier is served is called a Primary Cell (PCell) and a cell where a secondary carrier is served is called a Secondary Cell (SCell). The number of PCell is only one. The number of SCells (based on LTE Release 11) is up to maximum 4, and can increase in the future.

The LTE system refers to a system that a communication service provider uses to provide communication services via a licensed band frequency assigned from a corresponding organization. However, in order to meet the rapid increase in the demand for traffic, a discussion is made on the LTE technology to use in an unlicensed band used for Wireless LAN, Bluetooth, etc., which is called Licensed-Assisted Access (LAA). When the CA technology is applied to the LAA, a scenario will be considered where a PCell uses a licensed band frequency and SCells use an unlicensed band frequency by using the LAA.

Unlike licensed bands, the unlicensed band does not have a specific duplex mode. Therefore, the unlicensed band can be set in different modes according to countries/regions. Since unlicensed bands are already used by existing heterogeneous systems, such as wireless LAN, Bluetooth, etc., they can have serious interference issues, compared with licensed bands. Therefore, when measurement is configured to use unlicensed bands, the potential issues need to be considered, unlike the licensed bands.

Hereinafter, the fifth embodiment of the present disclosure is described in detail with reference to the accompanying drawings.

Hereinafter, a technology to provide dual connectivity in a wireless communication system is described in detail.

In the following description, terms for identifying access nodes and terms for indicating: network entities; messages; interfaces between network entities; various identifications; etc., are used for the sake of convenience. Therefore, it should be understood that the present disclosure is limited by the terms and can also employ any other terms to equivalently indicate the same components corresponding thereto.

For the sake of convenience, the embodiment of the present disclosure is described based on the terms and titles defined in the 3rd Generation Partnership Project Long Term Evolution (3GPP LTE), but not limited thereto. It should be understood that the present disclosure can also be applied to systems following other specifications.

The Physical layer of LTE systems has a structure of Radio Frame of 10 ms to transmit downlink and uplink data, and provides two types of radio frame as follows.

Type 1: applied to Frequency Division Duplex (FDD)
Type 2: applied to Time Division Duplex (TDD)

Each of the two types of radio frames is 10 ms in length and configured with 10 sub-frames of 1 ms each. That is, one radio frame is divided into 10 subframes, numbered from Subframe 0 to Subframe 9.

In FDD, the uplink and downlink use different frequency regions and are separated from each other. Each of the uplink and downlink is divided into 10 subframes.

In TDD, each sub-frame of one radio frame is divided into a downlink sub-frame, an uplink sub-frame, and a special sub-frame, according to the settings. The special sub-frame is divided into Downlink Pilot Time Slot (DwPTS), Guard Period (GP), and Uplink Pilot Time Slot (UpPTS). The special sub-frame serves as a branch switching between the downlink and uplink. DwPTS, GP, and UpPTS can be set to different lengths, but the sum of their length is 1 ms like the other sub-frames.

Figure 30:
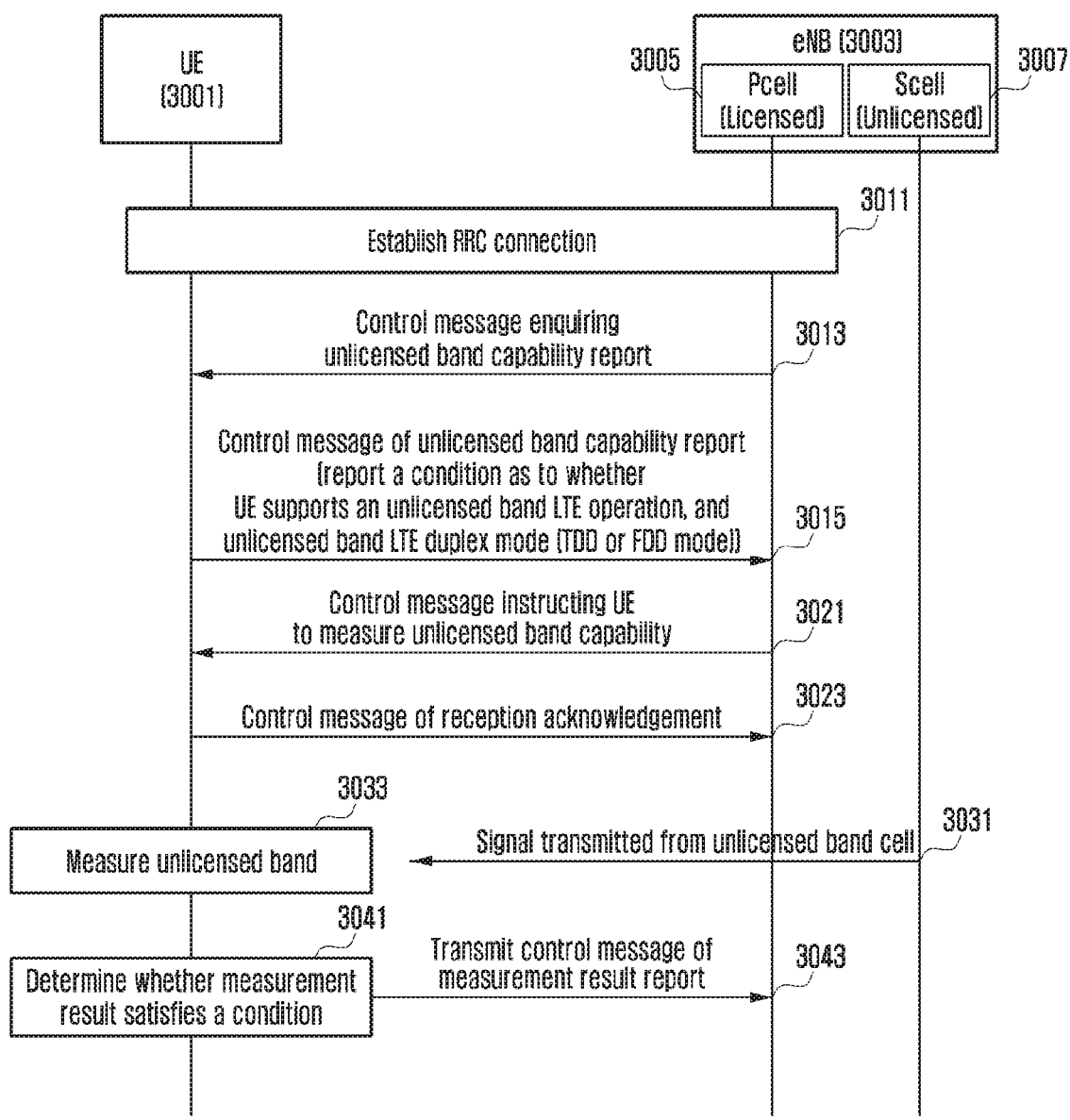
FIG. 30 is a flow diagram showing an example of a method of configuring licensed band measurement, according to a fifth embodiment of the present disclosure.

FIG. 30 is a flow diagram showing an example of a method of configuring licensed band measurement, according to a fifth embodiment of the present disclosure. In the embodiment, it is assumed that the ENB 3003 controls both licensed bands and unlicensed bands and additionally configures a licensed band to PCell 3005 and an unlicensed band to SCell 3007.

UE 3001 is capable of attempting to access a cell 3005 using a licensed band of the ENB 3003 and establishing a connection with the ENB 3003 in operation 3001. The expression 'to establish a connection' is used in the sense that UE and ENB are connected to each other and performs transmission/reception of data therebetween. The connection is established by using messages of Radio Resource Control (RRC) layer.

For example, UE 3001 transmits a message, RRCConnectionRequest, to the ENB 3003 to request connection from the ENB 3003. The ENB 3003 receives the RRCConnectionRequest message from the UE 3001, and transmits a message, RRCConnectionSetup, to the UE 3001 to establish a connection with the UE 3001. UE 3001 switches an RRC idle state, RRC_IDLE, to an RRC connected state, RRC_CONNECTED. After receiving the RRCConnectionSetup message, the UE 3001 transmits a message, RRCConnectionSetupComplete, to the ENB 3003 to acknowledge that it has received the RRCConnectionSetup message.

After that, when the ENB 3003 does not have the capability information regarding an unlicensed band of the UE 3001, it is capable of transmitting, to the UE 3001, a control message enquiring an unlicensed band capability report in operation 3013. The capability report enquiring control message can include a UECapabilityEnquiry message of the RRC layer.

After receiving the control message from the ENB 3003, the UE 3001 is capable of reporting, to the ENB 3003, a condition as to whether it supports LTE operations in unlicensed bands (i.e., it supports an LAA function) and an LTE duplex mode (either TDD or FDD or both TDD and FDD) supported in unlicensed bands in operation 3015. The report message can include a UECapabilityInformation message of the RRC layer.

When receiving the report message from the UE 3001, the ENB 3003 detects that a condition as to whether the UE supports LTE operations in unlicensed bands and an LTE duplex mode supported in unlicensed bands. In order to additionally configure (establish) an unlicensed band to the UE 3001, the ENB 3001 is capable of transmitting, to the UE 3001 operating in a licensed band, a control message instructing the UE 3001 to measure the strength/quality of signals of the unlicensed band in operation 3021. This process is performed by the ENB 3003 to request the UE 3001 to measure an unlicensed band used by a cell (e.g., SCell 3007) currently under the control of the ENB 3003, to receive the strength/quality of signals for the cell from the UE 3001, and to determine whether the ENB 3003 additionally establish (configure) the cell to the UE 3001. The measurement instructing control message can include, for example, information related to conditions for a frequency to be measured and a time that the measurement result of the frequency is reported. The measurement instructing control message can be transmitted by using an RRCConnectionReconfiguration message.

After receiving the measurement instructing control message, the UE 3001 is capable of transmitting an acknowledgement informing that the message has been received to the ENB in operation 3023 and starting to measure the configured unlicensed band in operation 3033. In measurement, the UE 3001 is capable of measuring signals from the SCell of the ENB 3003 in operation 3031. The signals can include a physical channel signal such as a Common Reference Signal (C-RS) or a Discovery Reference Signal (D-RS).

The UE 3001 is capable of measuring the signal and determining whether the measured signal satisfies the condition configured in operation 3021, in operation 3041. When the measured signal satisfies the condition in operation 3041, the UE 3001 is capable of reporting, to the ENB 3003, the signal measurement result in a corresponding frequency in operation 3043. After receiving the signal measurement result, the ENB 3003 is capable of determining whether it needs to add (or release) the reported cell to the UE, and then adding (or releasing) the unlicensed band cell to the UE based on the determination. Alternatively, after the ENB is capable of checking the distribution of cells of other operators and the same operators, distributed according to frequencies, by using the information, it is capable of moving a cell, using an unlicensed band frequency and currently under the control of the ENB, to another unlicensed band frequency, or activating a cell of a new unlicensed band frequency.

Figure 31:
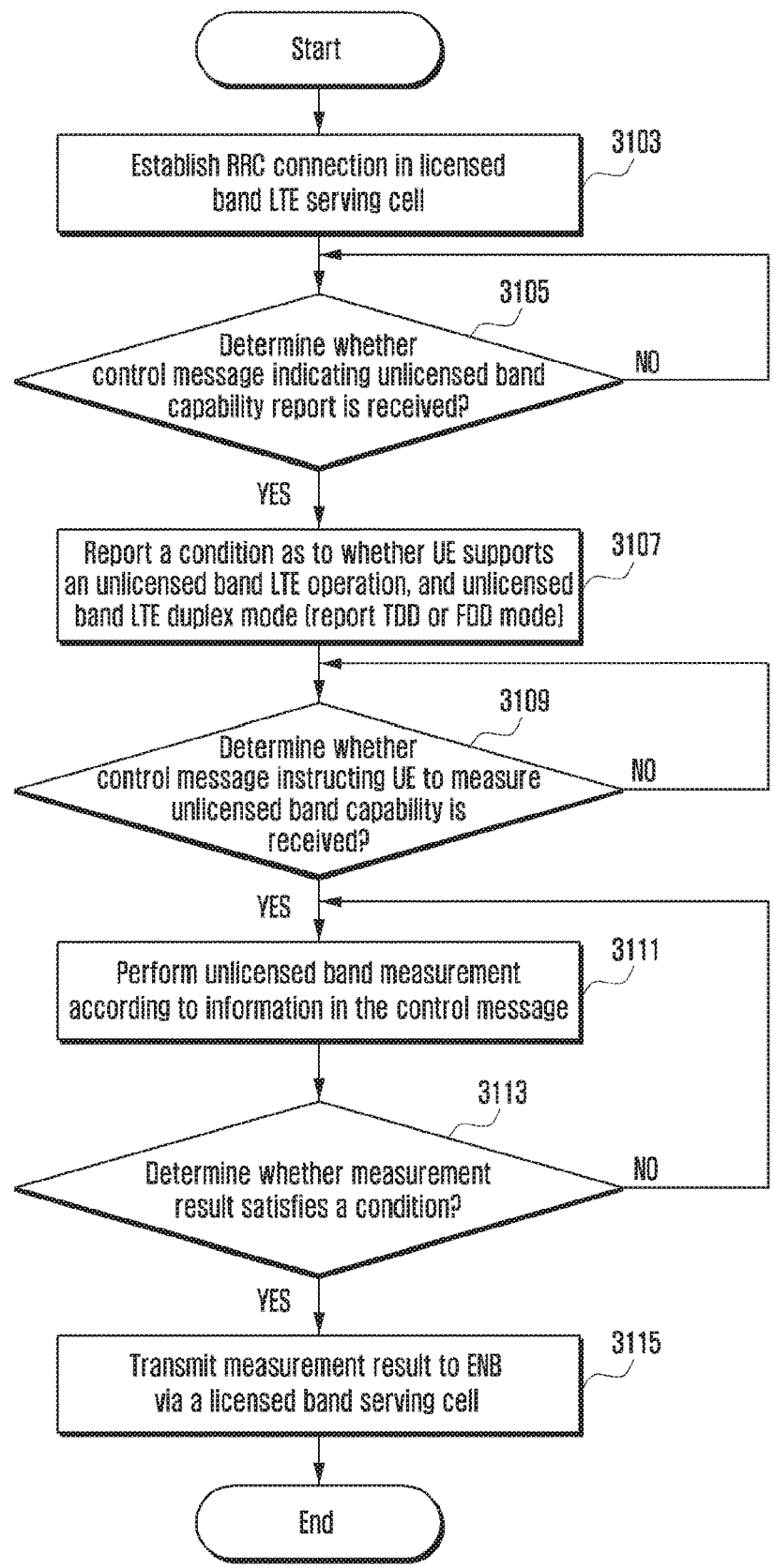
FIG. 31 is a flow diagram showing an example of operations of UE configuring licensed band measurement, according to a fifth embodiment of the present disclosure.

FIG. 31 is a flow diagram showing an example of operations of UE (e.g., UE 3001) configuring licensed band measurement, according to a fifth embodiment of the present disclosure.

UE is capable of establishing an RRC connection in an LTE serving cell of a licensed band in operation 3103. After that, the UE is capable of determining whether it receives, from the ENB, a control message enquiring an unlicensed band capability report in operation 3105. When the UE has received, from the ENB, a control message enquiring an unlicensed band capability report in operation 3105, it is capable of reporting, to the ENB, a condition as to whether it supports an unlicensed band LTE operation and an unlicensed band LTE duplex mode (TDD or FDD) in operation 3107. For example, the capability report enquiring control message can include a UECapabilityEnquiry message of the RRC layer. The report message can include a UECapabilityInformation message of the RRC layer.

The UE is capable of receiving, from the ENB, a control message instructing the UE to measure an unlicensed band according to the capability supported by the UE in operation 3109. The measurement instructing control message can be transmitted by using an RRCConnectionReconfiguration message. When receiving the measurement instructing control message, the UE transmits the reception acknowledgement to the ENB and performs unlicensed band measurement according to the control message in operation 3111. After that, the UE is capable of determining whether the measurement result satisfies a condition according to the information set in the measurement instruction control message in 3113. When the measurement result satisfies a condition according to the information set in the measurement instruction control message in operation 3113, the UE is capable of reporting the measurement result to the ENB via the licensed band serving cell in operation 3115.

Figure 32:
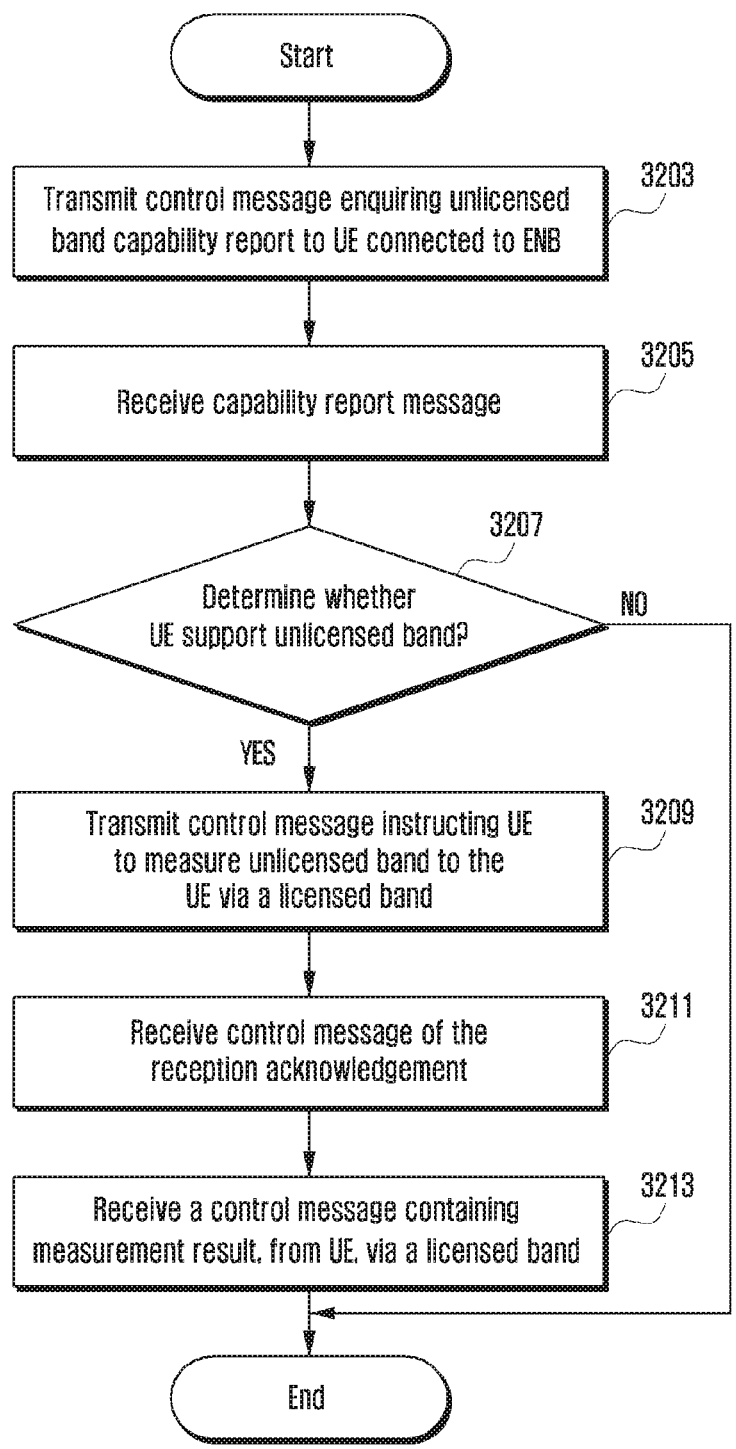
FIG. 32 is a flow diagram showing an example of operations of ENB configuring licensed band measurement, according to a fifth embodiment of the present disclosure.

FIG. 32 is a flow diagram showing an example of operations of ENB (e.g., ENB 3003) configuring licensed band measurement, according to a fifth embodiment of the present disclosure.

The ENB capable of controlling both licensed bands and unlicensed bands is capable of transmitting a control message enquiring an unlicensed band capability report to the UE connected thereto in operation 3203. After that, the ENB receives the capability report message from the UE in operation 3205. For example, the capability report enquiring control message can include a UECapabilityEnquiry message of the RRC layer. The report message can include a UECapabilityInformation message of the RRC layer.

The ENB is capable of determining whether the UE supports an unlicensed band, based on the received capability report message, in operation 3207. When the UE has a capability supporting an unlicensed band, the ENB is capable of transmitting a control message instructing to the UE to measure the unlicensed band to the UE via a licensed band in operation 3209, and receiving the reception acknowledgement of the control message from the UE in operation 3211. The instruction message and the acknowledgement message can employ an RRCConnectionReconfiguration message and an RRCConnectionReconfigurationComplete message, respectively. After that, the ENB is capable of receiving a control message containing the measurement result from the UE via a licensed band in operation 3213.

After receiving the control message from the UE, the ENB determines whether it needs to add (release) the reported cell to the UE, and then adds (or releases) the unlicensed band cell to the UE based on the determination. Alternatively, after the ENB checks the distribution of cells of other operators and the same operators, distributed according to frequencies, by using the information, it moves a cell, using an unlicensed band frequency and currently under the control of the ENB, to another unlicensed band frequency, or activates a cell of a new unlicensed band frequency.

Figure 33:
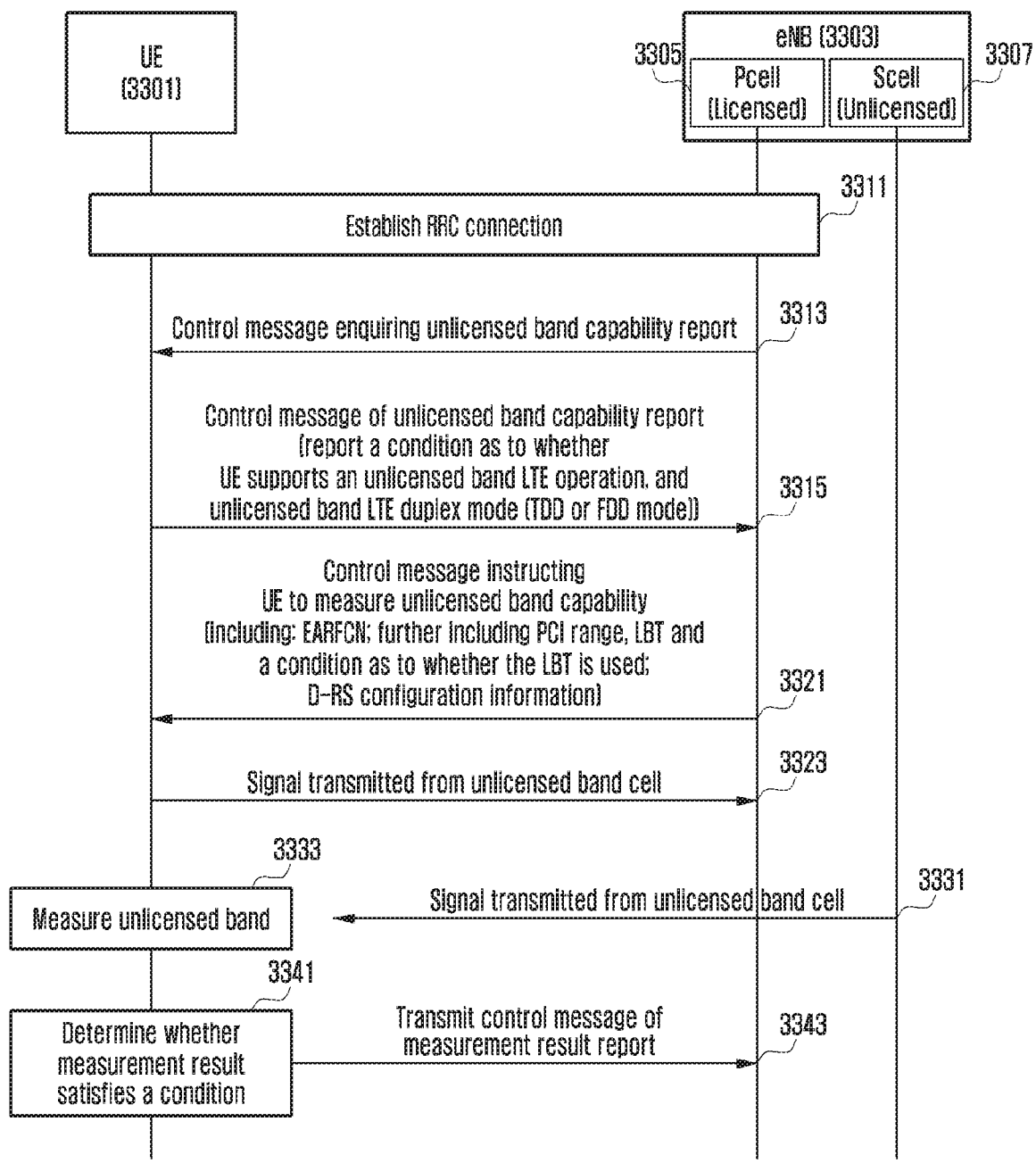
FIG. 33 is a flow diagram showing another example of a method of configuring licensed band measurement, according to a fifth embodiment of the present disclosure.

FIG. 33 is a flow diagram showing another example of a method of configuring licensed band measurement, according to a fifth embodiment of the present disclosure. In the embodiment, it is assumed that the ENB 3303 controls both licensed bands and unlicensed bands and additionally configure (establishes) a licensed band to PCell 3305 and an unlicensed band to SCell 3307.

UE 3301 is capable of attempting to access a cell 3305 using a licensed band of the ENB 3303 and establishing a connection with the ENB 3303 in operation 3311. The expression 'to establish a connection' is used in the sense that UE and ENB are connected to each other and performs transmission/reception of data therebetween. The connection is established by using messages of Radio Resource Control (RRC) layer.

For example, UE transmits a message, RRCConnectionRequest, to the ENB to request connection from the ENB. The ENB receives the RRCConnectionRequest message from the UE, and transmits a message, RRCConnectionSetup, to the UE to establish a connection with the UE. UE switches the RRC idle state, RRC_IDLE, to an RRC connected state, RRC_CONNECTED. After receiving the RRCConnectionSetup message, the UE transmits a message, RRCConnectionSetupComplete, to the ENB to acknowledge that it has received the RRCConnectionSetup message.

After that, when the ENB 3303 does not have the capability information regarding an unlicensed band of the UE 3301, it transmits, to the UE 3301, a control message enquiring an unlicensed band capability report in operation 3313. For example, the capability report enquiring control message can include a UECapabilityEnquiry message of the RRC layer. The enquiry message can include a frequency band indicator specifying an unlicensed band, and enquires the UE to repot whether the UE supports an operation mode for the frequency band. One or two frequency band indicators are configured to one unlicensed band. At least one frequency band indicator for the unlicensed band means that a corresponding unlicensed band operates in FDD. At least one or another frequency band indicator for the unlicensed band means that a corresponding unlicensed band operates in TDD.

After receiving the control message from the ENB 3303, the UE 3301 is capable of transmitting, to the ENB 3303, a report control message including: a condition as to whether it supports LTE operations in unlicensed bands (i.e., it supports an LAA function); and an LTE duplex mode (either TDD or FDD or both TDD and FDD) supported in unlicensed bands in operation 3315. For example, the report control message can include a UECapabilityInformation message of the RRC layer. The report control message can include frequency band indicators specifying a duplex mode and an unlicensed band supported by the UE. When the UE supports both FDD and TDD modes for one unlicensed band, the UE is capable of including the two frequency band indicators for the unlicensed band in the report control message and reporting it to the ENB.

When receiving the report control message from the UE 3301, the ENB 3303 is capable of detecting that a condition as to whether the UE supports LTE operations in unlicensed bands and an LTE duplex mode supported in unlicensed bands. In order to additionally configure (establish) an unlicensed band to the UE 3301, the ENB 3303 is capable of transmitting, to the UE 3301 operating in a licensed band, a control message instructing the UE 3301 to measure the strength/quality of signals of the unlicensed band in operation 3321. This process is performed by the ENB 3303 to request the UE 3301 to measure an unlicensed band used by a cell (e.g., SCell 3307) currently under the control of the ENB 3303, to receive the strength/quality of signals for the cell from the UE 3301, and to determine whether the ENB additionally configure (establish) the cell to the UE 3301.

The measurement instructing control message can be transmitted by using an RRCConnectionReconfiguration message of the RRC layer. The measurement instructing control message can include information related to conditions for: a frequency to be measured; and a time that the measurement result of the frequency is reported. For example, in order to inform the ENB of a frequency to be measured, the measurement instructing control message can include information indicating an object to be measured, i.e., an unlicensed band frequency channel to be measured and information regarding a mode to be applied to measurement of the frequency channel, e.g., TDD or FDD. The frequency channel information can specify an unlicensed frequency channel using E-UTRA Absolute Radio Frequency Channel Number (EARFCN). The EARFCN refers to information specifying the center frequency of a frequency band to be measured. One EARFCN is related to one unlicensed band indicator (i.e., indicating an operation mode of TDD or FDD. Therefore, the ENB selects and determines a frequency channel corresponding to a duplex mode supported by UE according to radio frequency channels. After receiving the EARFCN, the UE detects a frequency band corresponding to the radio frequency channel and a type of duplex mode to be used for measurement, from the received EARFCN.

Additionally, the measurement instructing control message can include information additionally specifying nearby cells that do not need measurement result report when UE performs measurement in a frequency band of the unlicensed band. This information has a form of a Physical Cell Identifier (PCI) range. Cells have unique PCIs respectively. For example, a PCI range to be used for cells owned by operators can be limited according to operators. When the UE received the information, it can also receive a PCI range which needs the measurement result report or a PCI range which does not need the measurement result report, and may not perform measurement for nearby cells that do not need the measurement result report.

Additionally, the measurement instructing control message can include information specifying a channel access method of a cell operating in an unlicensed band, e.g., Listen-Before-Talk (LBT), to measure signals of the cell operating in an unlicensed band, when the UE performs measurement in a frequency band of the unlicensed band. LBT is a technique where a transmitter first listens to a condition as to whether a corresponding band is congested when transmitting signals in unlicensed band and then transmits (talks) the signals only if the band is not congested.

Examples of the channel access method are a Load Based Equipment (LBE) method and a Frame Based Equipment (FBE) method. The LBE refers to a method that, when an ENB ascertains that a channel is congested in a state where the ENB transmits signals in an unlicensed band, allows the ENB to delay transmission of data, in a unit of slot (e.g., 20 μs), by a number selected from 1 to q (q is set by the ENB), and to transmit the data. Therefore, when an ENB informs UE that it employs LBE, it can also transmit, to the UE, the slot length and q value, so as to assist the UE to measure signals from the ENB. The FBE refers to a method that, when an ENB ascertains that a channel is congested in a state where the ENB transmits signals in an unlicensed band, allows the ENB to delay time by a fixed length and to re-attempt transmission of signals. Therefore, when an ENB informs UE that it employs FBE, it can also transmit the information, such as the fixed length, etc., to the UE.

In addition, the measurement instructing control message can include details for configuring a signal (3331) which is used for measurement and transmitted from an unlicensed band cell. For example, the signal used for measurement can be a D-RS. When a D-RS is used for measurement, a D-RS transmission cycle, a condition as to whether LBT is performed in transmitting a D-RS, etc. can also be transmitted. The condition as to whether to perform LBT in transmitting a D-RS refers to the method: when a D-RS is transmitted, a condition as to whether the transmission is always performed at a preset cycle or a condition as to whether a channel is congested is checked, without performing LBT, and the D-SR is transmitted only if the channel is not congested; however, when data needs to be transmitted, a condition as to whether a channel is congested is checked, and the data is transmitted only if the channel is not congested.

After receiving the measurement instructing control message including the parameter(s), the UE 3301 is capable of transmitting an acknowledgement message that the measurement instructing control message has been received to the ENB 3303 in operation 3323. The UE 3301 is capable of starting to measure the configured unlicensed band in operation 3333. The UE 3301 measures a signal (3331) from the SCell 3307 of the ENB. An example of the signal is a physical channel signal such as a Common Reference Signal (C-RS) or a Discovery Reference Signal (D-RS). According to the received, parameter(s), the UE 3301 is capable of: obtaining information regarding cells with PCIs according to frequencies, information regarding duplex mode (FDD or TDD) where corresponding cells are measured, and also a time that a C-RS or D-RS for a corresponding cell is measured; and measuring the configured unlicensed band frequency.

Measuring an unlicensed band operating in FDD mode means that: in a state where the forward sub-frame structure of cells of a corresponding band follows a particular pattern, UE detects that the pattern of sub-frames transmitting PSS/SSS signals also follows the FDD operation mode, specifies a time interval when signals required for measurement will be received, and performs measurement in the corresponding time interval. In addition, measuring an unlicensed band operating in TDD mode means that: in a state where the forward sub-frame structure of cells of a corresponding band follows another particular pattern, UE detects that the pattern of sub-frames transmitting PSS/SSS signals also follows the TDD operation mode, specifies a time interval when signals required for measurement will be received, and performs measurement in the corresponding time interval.

The UE 3301 is capable of measuring the signal and determining whether the measured signal satisfies the condition configured in operation 3321, in operation 3341. When the measured signal satisfies the condition in operation 3341, the UE 3301 is capable of reporting, to the ENB 3303, the signal measurement result in a corresponding frequency in operation 3343. After receiving the signal measurement result, the ENB 3303 is capable of determining whether it needs to add (or release) the reported cell to the UE 3301, and then adding (or releasing) the unlicensed band cell to the UE 3301 based on the determination. Alternatively, after the ENB 3303 checks the distribution of cells of other operators and the same operators, distributed according to frequencies, by using the information, it is capable of moving a cell, using an unlicensed band frequency and currently under the control of the ENB, to another unlicensed band frequency, or activating a cell of a new unlicensed band frequency.

Figure 34:
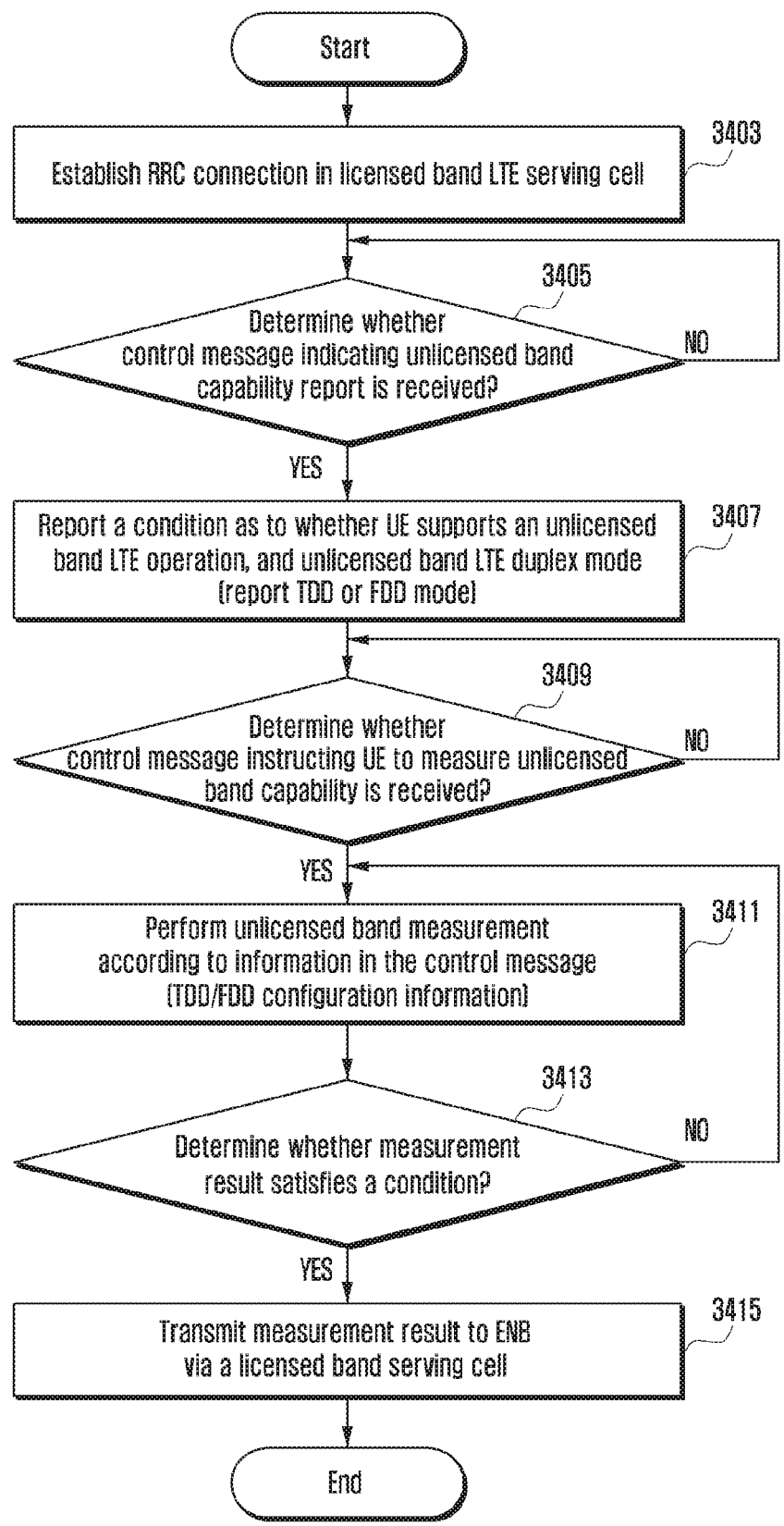
FIG. 34 is a flow diagram showing another example of operations of UE configuring licensed band measurement, according to a fifth embodiment of the present disclosure.

FIG. 34 is a flow diagram showing another example of operations of UE (e.g., UE 3301) configuring licensed band measurement, according to a fifth embodiment of the present disclosure.

UE is capable of establishing an RRC connection in an LTE serving cell of a licensed band in operation 3403. After that, the UE is capable of determining whether it receives a control message enquiring an unlicensed band capability report from the ENB in operation 3405. When the UE receives, from the ENB, a control message enquiring an unlicensed band capability report in operation 3405, it is capable of reporting, to the ENB, a condition as to whether it supports an unlicensed band LTE operation and an unlicensed band LTE duplex mode (TDD or FDD) in operation 3407. For example, the capability report enquiring control message can include a UECapabilityEnquiry message of the RRC layer. The control message can include a UECapabilityInformation message of the RRC layer. The capability report enquiring control message can include a frequency band indicator specifying an unlicensed band, and enquire the UE to repot whether the UE supports an operation mode for the frequency band. One or two frequency band indicators are configured to one unlicensed band. At least one frequency band indicator for the unlicensed band means that a corresponding unlicensed band operates in FDD. At least one or another frequency band indicator for the unlicensed band means that a corresponding unlicensed band operates in TDD. The report control message can include frequency band indicators specifying a duplex mode and an unlicensed band supported by the UE. When the UE supports both FDD and TDD modes for one unlicensed band, the UE is capable of reporting, to the ENB, the report message including the two frequency band indicators for the unlicensed band.

The UE is capable of receiving, from the ENB, a control message instructing the UE to measure an unlicensed band according to the capability supported by the UE in operation 3409. The measurement instructing control message can be transmitted by using an RRCConnectionReconfiguration message. The measurement instructing control message can include at least one of the following: EARFCN information, a PCI range, LBT (e.g., LBE or FBE, and parameter values related to duplex mode), D-RS configuration information, a condition as to whether the transmission of a D-RS follows LBT, etc., as describe above referring to FIG. 33.

When receiving the measurement instructing control message, the UE is capable of transmitting an acknowledgement message that the measurement instructing control message has been received to the ENB in operation and measuring the unlicensed band according to the information in the control message in operation 3411. According to the received, parameter(s), the UE is capable of: obtaining information regarding cells with PCIs according to frequencies, information regarding duplex mode (FDD or TDD) where corresponding cells are measured, and also a time that a C-RS or D-RS for a corresponding cell is measured; and measuring the configured unlicensed band frequency. Measuring an unlicensed band operating in FDD mode means that: in a state where the forward sub-frame structure of cells of a corresponding band follows a particular pattern, UE detects that the pattern of sub-frames transmitting PSS/SSS signals also follows the FDD operation mode, specifies a time interval when signals required for measurement will be received, and performs measurement in the corresponding time interval. In addition, measuring an unlicensed band operating in TDD mode means that: in a state where the forward sub-frame structure of cells of a corresponding band follows another particular pattern, UE detects that the pattern of sub-frames transmitting PSS/SSS signals also follows the TDD operation mode, specifies a time interval when signals required for measurement will be received, and performs measurement in the corresponding time interval.

After that, the UE is capable of determining the measurement result satisfies a condition according to the information set in the measurement instruction control message in operation 3413. When the measurement result satisfies a condition according to the information set in the measurement instruction control message in operation 3413, the UE is capable of reporting the measurement result to the ENB via the licensed band serving cell in operation 3415.

Figure 35:
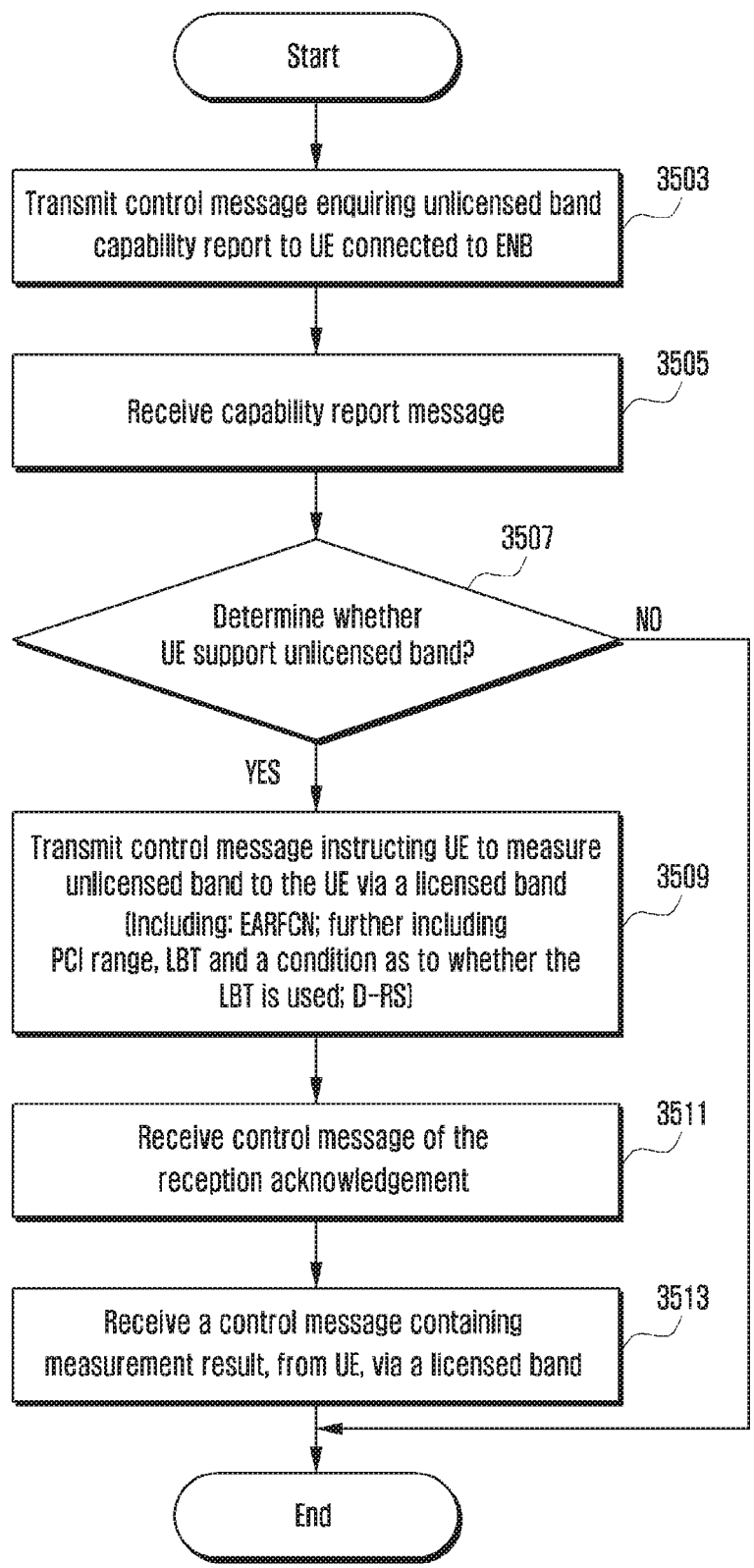
FIG. 35 is a flow diagram showing another example of operations of ENB configuring licensed band measurement, according to a fifth embodiment of the present disclosure.

FIG. 35 is a flow diagram showing another example of operations of ENB (e.g., ENB 3303) configuring licensed band measurement, according to a fifth embodiment of the present disclosure.

The ENB capable of controlling both licensed bands and unlicensed bands is capable of transmitting a control message enquiring an unlicensed band capability report to the UE connected thereto in operation 3503. After that, the ENB is capable of receiving the capability report message from the UE. For example, the capability report enquiring control message can include a UECapabilityEnquiry message of the RRC layer. The report message can include a UECapabilityInformation message of the RRC layer.

The ENB is capable of determining whether the UE supports an unlicensed band, based on the received capability report message, in operation 3507. When the UE has a capability supporting an unlicensed band in operation 3507, the ENB is capable of transmitting a control message instructing to the UE to measure the unlicensed band to the UE via a licensed band in operation 3509. The ENB is capable of receiving the reception acknowledgement of the measurement instructing control message from the UE in operation 3511. The measurement instructing control message and the acknowledgement message can be an RRCConnectionReconfiguration message and an RRCConnectionReconfigurationComplete message, respectively. The measurement instructing control message can include at least one of the following: EARFCN information, a PCI range, LBT (e.g., LBE or FBE, and parameter values related to duplex mode), D-RS configuration information, a condition as to whether the transmission of a D-RS follows LBT, etc., as describe above referring to FIG. 33. After that, the ENB is capable of receiving a control message containing the measurement result from the UE via a licensed band in operation 3513. After receiving the control message from the UE, the ENB determines whether it needs to add (release) the reported cell to the UE, and then adds (or releases) the unlicensed band cell to the UE based on the determination. Alternatively, after the ENB checks the distribution of cells of other operators and the same operators, distributed according to frequencies, by using the information, it moves a cell, using an unlicensed band frequency and currently under the control of the ENB, to another unlicensed band frequency, or activates a cell of a new unlicensed band frequency.

Figure 36:
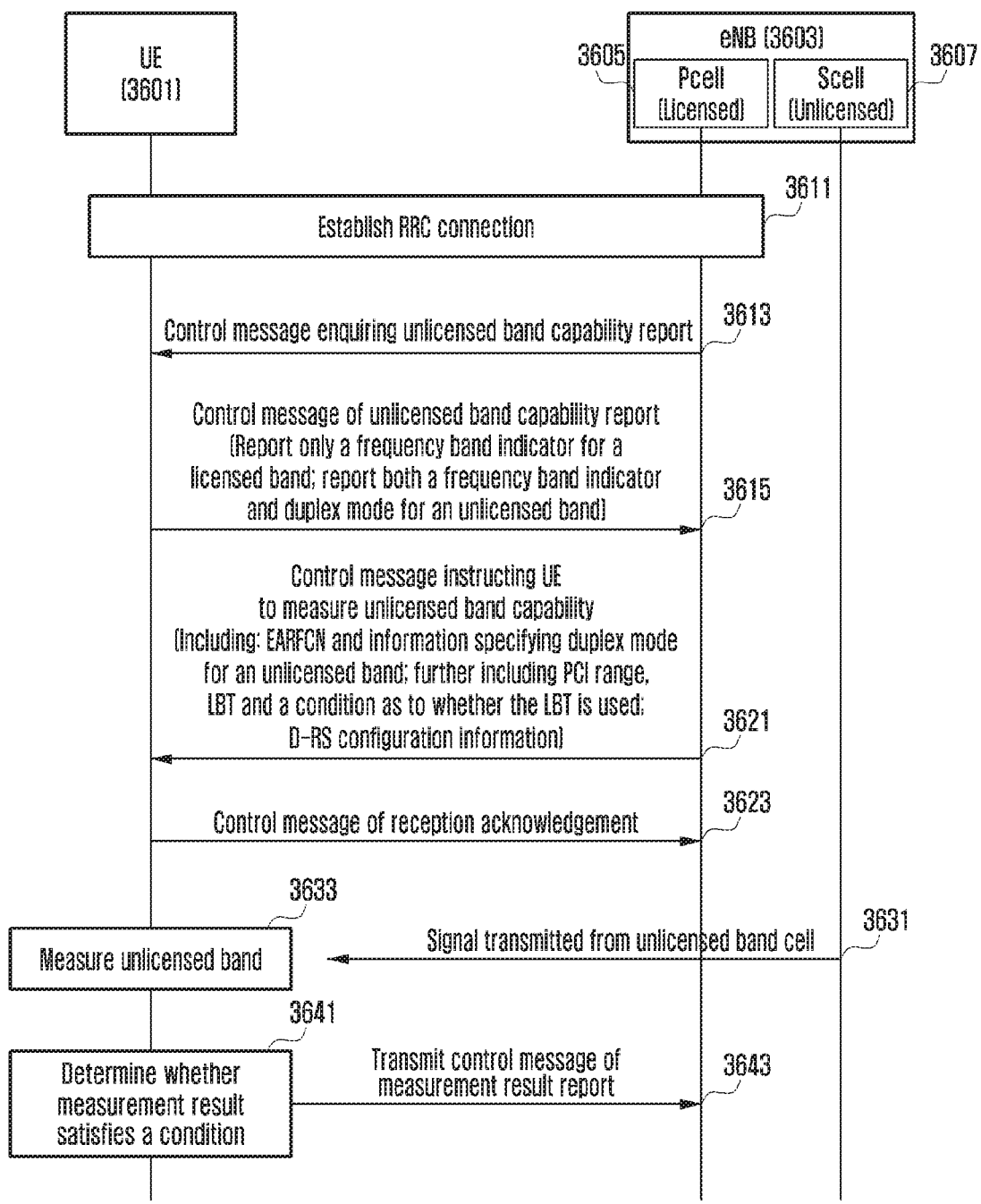
FIG. 36 is a flow diagram showing another example of a method of configuring licensed band measurement, according to a fifth embodiment of the present disclosure.

FIG. 36 is a flow diagram showing another example of a method of configuring licensed band measurement, according to a fifth embodiment of the present disclosure. In the embodiment, it is assumed that the ENB 3603 controls both licensed bands and unlicensed bands and additionally configures (establishes) a licensed band to PCell 3605 and an unlicensed band to SCell 3607.

UE 3601 is capable of attempting to access a cell 905 using a licensed band of the ENB 3603 and establishing a connection with the ENB in operation 3611. The expression 'to establish a connection' is used in the sense that UE and ENB are connected to each other and performs transmission/reception of data therebetween. The connection is established by using messages of Radio Resource Control (RRC) layer.

For example, the UE 3601 is capable of transmitting a message, RRCConnectionRequest, to the ENB 3603 to request connection from the ENB 3603. When receiving the RRCConnectionRequest message from the UE 3601, the ENB 3603 is capable of transmitting a message, RRCConnectionSetup, to the UE 3601 to establish a connection with the UE 3601. The UE 3601 switches the RRC idle state, RRC_IDLE, to an RRC connected state, RRC_CONNECTED. After receiving the RRCConnectionSetup message, the UE 3601 is capable of transmitting a message, RRCConnectionSetupComplete, to the ENB to acknowledge that it has received the RRCConnectionSetup message.

After that, when the ENB 3603 does not have the capability information regarding an unlicensed band of the UE 3601, it is capable of transmitting, to the UE 3601, a control message enquiring an unlicensed band capability report in operation 3613. For example, the capability report enquiring control message can include a UECapabilityEnquiry message of the RRC layer. The enquiry message can include a frequency band indicator specifying an unlicensed band and information indicating a duplex mode of an unlicensed band.

After receiving the control message from the ENB 3603, the UE 3601 is capable of transmitting, to the ENB 3603, a report control message including: a condition as to whether it supports LTE operations in unlicensed bands (i.e., it supports an LAA function); and an LTE duplex mode (either TDD or FDD or both TDD and FDD) supported in unlicensed bands in operation 3615. For example, the report control message can include a UECapabilityInformation message of the RRC layer. The report control message can include information indicating a frequency band supported by the UE. For example, the UE is capable of reporting only a frequency band indicator for a licensed band; however, it can also report a frequency band indicator and duplex mode information for an unlicensed band.

When receiving the report control message from the UE 3601, the ENB 3603 is capable of detecting that a condition as to whether the UE supports LTE operations in unlicensed bands and an LTE duplex mode supported in unlicensed bands. In order to additionally configure (establish) an unlicensed band to the UE, the ENB 3601 is capable of transmitting, to the UE 3601 operating in a licensed band, a control message instructing the UE to measure the strength/quality of signals of the unlicensed band in operation 3621.

This process is performed by the ENB 3603 to request the UE 3601 to measure an unlicensed band used by a cell (e.g., SCell 3607) currently under the control of the ENB 3603, to receive the strength/quality of signals for the cell from the UE 3601, and to determine whether the ENB 3603 adds the cell to the UE 3601.

The measurement instructing control message can be transmitted by using an RRCConnectionReconfiguration message of the RRC layer. The measurement instructing control message can include information regarding conditions for: a frequency to be measured; and a time that the measurement result of the frequency is reported. For example, the measurement instructing control message can include EARFCN specifying a radio frequency channel to be measured and further include information indicating an operation mode of a corresponding radio frequency channel if the radio frequency channel is an unlicensed band. That is, in the embodiment, it is assumed that EARFCN is not related to a particular operation mode. After receiving the EARFCN and the operation mode of a corresponding radio frequency channel, the UE detects a frequency band corresponding to the radio frequency channel from the EARFCN and an operation mode to be used for measurement.

Additionally, the measurement instructing control message can include information additionally specifying nearby cells that do not need measurement result report when the UE performs measurement in a frequency band of the unlicensed band. This information can be created in a form of a Physical Cell Identifier (PCI) range. Cells have unique PCIs respectively. For example, a PCI range to be used for cells owned by operators can be limited according to operators. When the UE received the information, it can also receive a PCI range which needs the measurement result report or a PCI range which does not need the measurement result report. The UE may not perform the measurement for nearby cells that do not need the measurement result report.

Additionally, the measurement instructing control message can include information specifying a channel access method of a cell operating in an unlicensed band, e.g., Listen-Before-Talk (LBT), to measure signals of the cell operating in an unlicensed band, when the UE performs measurement in a frequency band of the unlicensed band. LBT is a technique where a transmitter first listens to a condition as to whether a corresponding band is congested when transmitting signals in unlicensed band and then transmits (talks) the signals only if the band is not congested. Examples of the channel access method are a Load Based Equipment (LBE) method and a Frame Based Equipment (FBE) method. The LBE refers to a method that, when an ENB ascertains that a channel is congested in a state where the ENB transmits signals in an unlicensed band, allows the ENB to delay transmission of data, in a unit of slot (e.g., 20 µs), by a number selected from 1 to q (q is set by the ENB), and to transmit the data. Therefore, when an ENB informs UE that it employs LBE, it can also transmit, to the UE, the slot length and q value, so as to assist the UE to measure signals from the ENB. The FBE refers to a method that, when an ENB ascertains that a channel is congested in a state where the ENB transmits signals in an unlicensed band, allows the ENB to delay time by a fixed length and to re-attempt transmission of signals. Therefore, when an ENB informs UE that it employs FBE, it can also transmit the information, such as the fixed length, etc., to the UE.

In addition, the measurement instructing control message can include details for configuring a signal (3631) which is used for measurement and transmitted from an unlicensed band cell. For example, the signal used for measurement can be a D-RS. When a D-RS is used for measurement, a D-RS transmission cycle, a condition as to whether LBT is performed in transmitting a D-RS, etc. can also be transmitted. The condition as to whether to perform LBT in transmitting a D-RS refers to the method: when a D-RS is transmitted, a condition as to whether the transmission is always performed at a preset cycle or a condition as to whether a channel is congested is checked, without performing LBT, and the D-SR is transmitted only if the channel is not congested; however, when data needs to be transmitted, a condition as to whether a channel is congested is checked, and the data is transmitted only if the channel is not congested.

After receiving the measurement instructing control message including the parameter(s), the UE 3601 is capable of transmitting an acknowledgement message that the measurement instructing control message has been received to the ENB 3603 in operation 3623. The UE 3601 is capable of starting to measure the configured unlicensed band in operation 3633. The UE 3601 measures a signal (3631) from the SCell 3607 of the ENB 3603. For example, the signal can employ a physical channel signal such as a Common Reference Signal (C-RS) or a Discovery Reference Signal (D-RS). According to the received, parameter(s), the UE is capable of: obtaining information regarding cells with PCIs according to frequencies, information regarding duplex mode (FDD or TDD) where corresponding cells are measured, and a time that a C-RS or D-RS for a corresponding cell is measured; and measuring the configured unlicensed band frequency.

Measuring an unlicensed band operating in FDD mode means that: in a state where the forward sub-frame structure of cells of a corresponding band follows a particular pattern, UE detects that the pattern of sub-frames transmitting PSS/SSS signals also follows the FDD operation mode, specifies a time interval when signals required for measurement will be received, and performs measurement in the corresponding time interval. In addition, measuring an unlicensed band operating in TDD mode means that: in a state where the forward sub-frame structure of cells of a corresponding band follows another particular pattern, UE detects that the pattern of sub-frames transmitting PSS/SSS signals also follows the TDD operation mode, specifies a time interval when signals required for measurement will be received, and performs measurement in the corresponding time interval.

The UE 3601 is capable of measuring the signal and determining whether the measured signal satisfies the condition configured in operation 3621, in operation 3641. When the measured signal satisfies the condition in operation 3641, the UE 3601 is capable of reporting, to the ENB 3603, the signal measurement result in a corresponding frequency in operation 3643. After receiving the signal measurement result, the ENB 3603 is capable of determining whether it needs to add (or release) the reported cell to the UE 3601, and then adding (or releasing) the unlicensed band cell to the UE 3601 based on the determination. Alternatively, after the ENB 3603 checks the distribution of cells of other operators and the same operators, distributed according to frequencies, by using the information, it is capable of moving a cell, using an unlicensed band frequency and currently under the control of the ENB, to another unlicensed band frequency, or activating a cell of a new unlicensed band frequency.

Figure 37:
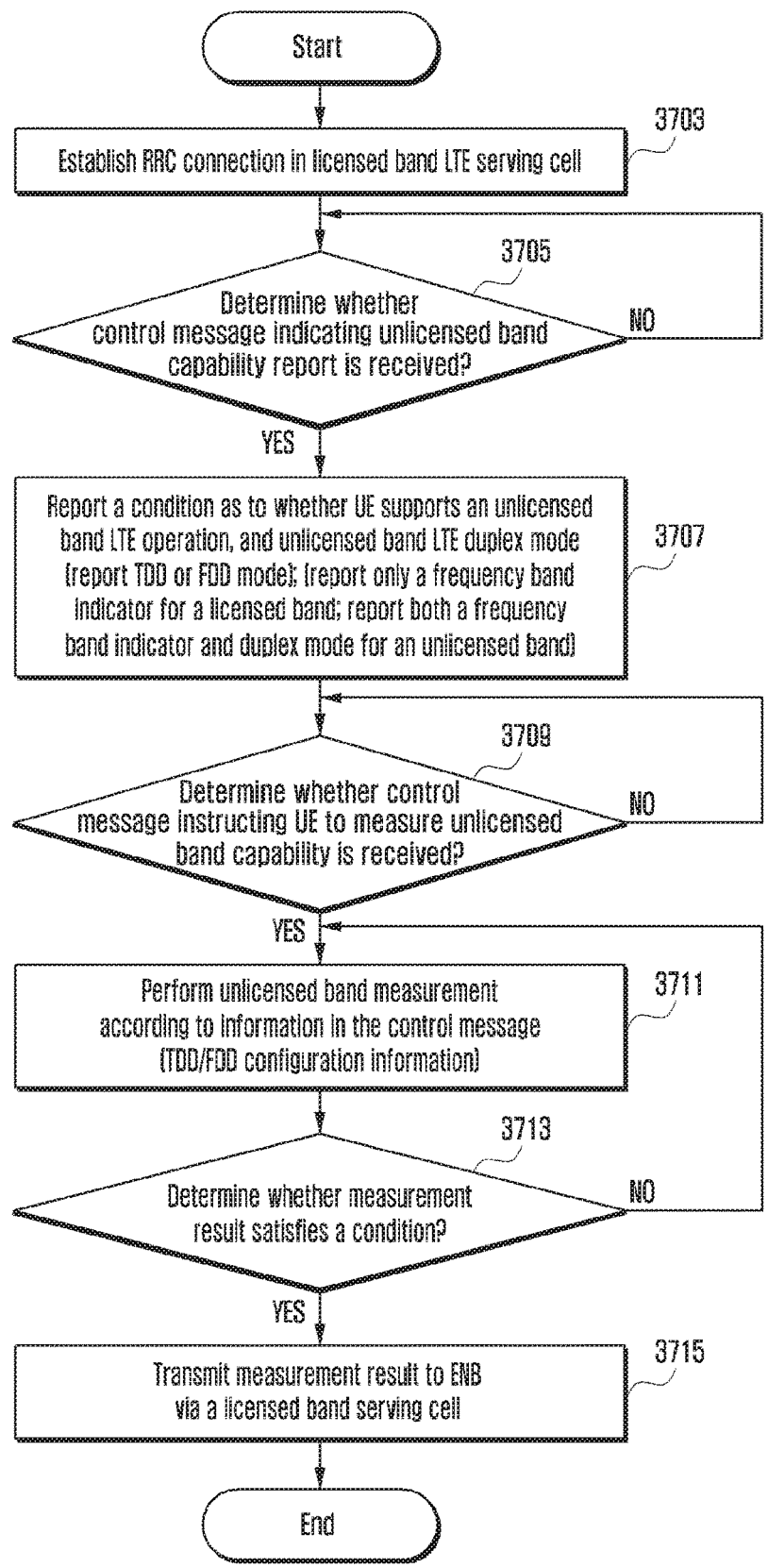
FIG. 37 is a flow diagram showing another example of operations of UE configuring licensed band measurement, according to a fifth embodiment of the present disclosure.

FIG. 37 is a flow diagram showing another example of operations of UE (e.g., UE 3601) configuring licensed band measurement, according to a fifth embodiment of the present disclosure.

UE is capable of establishing an RRC connection in an LTE serving cell of a licensed band in operation 3703. After that, the UE is capable of determining whether it receives a control message enquiring an unlicensed band capability report from the ENB in operation 3705. When the UE receives, from the ENB, a control message enquiring an unlicensed band capability report in operation 3705, it is capable of reporting, to the ENB, a condition as to whether it supports an unlicensed band LTE operation and an unlicensed band LTE duplex mode (TDD or FDD) in operation 3707. For example, the capability report enquiring control message can include a UECapabilityEnquiry message of the RRC layer. The report message can include a UECapabilityInformation message of the RRC layer. The enquiry message can include a frequency band indicator specifying an unlicensed band, and information indicating an operation mode of an unlicensed band. Meanwhile, the report control message can include information indicating a frequency band supported by the UE. The UE is capable of reporting only a frequency band indicator for a licensed band; however, it can report a frequency band indicator and duplex mode information for an unlicensed band. This is because the frequency band indicator does not include duplex mode.

The UE is capable of receiving, from the ENB, a control message instructing the UE to measure an unlicensed band, according to the capability supported by the UE, in operation 3709. The measurement instructing control message can be transmitted by using an RRCConnectionReconfiguration message. For a licensed band, the measurement instructing control message can include EARFCN information, as described above referring to FIG. 36. For an unlicensed band, the measurement instructing control message can include: EARFCN information and duplex mode for a corresponding frequency as described above referring to FIG. 36. For an unlicensed band, the measurement instructing control message can further include at least one of the following: a PCI range, LBT (e.g., LBE or FBE, and parameter values related to duplex mode), D-RS configuration information, a condition as to whether the transmission of a D-RS follows LBT, etc., as describe above referring to FIG. 36.

When receiving the measurement instructing control message, the UE is capable of transmitting an acknowledgement message that the measurement instructing control message has been received to the ENB and measuring the unlicensed band according to the information in the control message in operation 3711. According to the received, parameter(s), the UE is capable of: obtaining information regarding cells with PCIs according to frequencies, information regarding duplex mode (FDD or TDD) where corresponding cells are measured, and a time that a C-RS or D-RS for a corresponding cell is measured; and measuring the configured unlicensed band frequency. Measuring an unlicensed band operating in FDD mode means that: in a state where the forward sub-frame structure of cells of a corresponding band follows a particular pattern, UE detects that the pattern of sub-frames transmitting PSS/SSS signals also follows the FDD operation mode, specifies a time interval when signals required for measurement will be received, and performs measurement in the corresponding time interval. In addition, measuring an unlicensed band operating in TDD mode means that: in a state where the forward sub-frame structure of cells of a corresponding band follows another particular pattern, UE detects that the pattern of sub-frames transmitting PSS/SSS signals also follows the TDD operation mode, specifies a time interval when signals required for measurement will be received, and performs measurement in the corresponding time interval.

After that, the UE is capable of determining whether the measurement result satisfies a condition according to the information set in the measurement instruction control message in operation 3713. When the measurement result satisfies a condition according to the information set in the measurement instruction control message in operation 3713, the UE reports the measurement result to the ENB via the licensed band serving cell in operation 3715.

Figure 38:
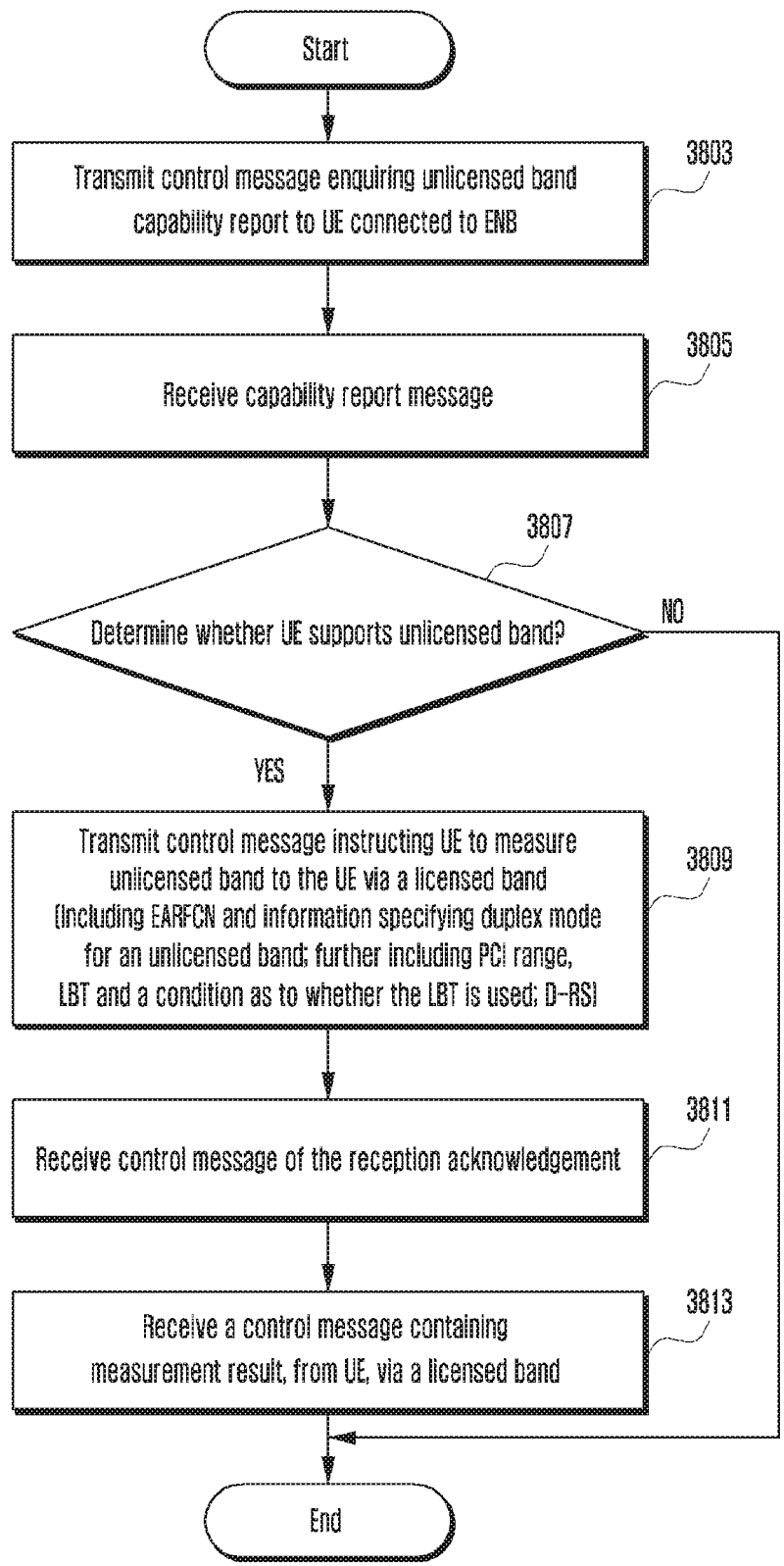
FIG. 38 is a flow diagram showing another example of operations of ENB configuring licensed band measurement, according to a fifth embodiment of the present disclosure.

FIG. 38 is a flow diagram showing another example of operations of ENB configuring licensed band measurement, according to a fifth embodiment of the present disclosure.

The ENB capable of controlling both licensed bands and unlicensed bands is capable of transmitting a control message enquiring an unlicensed band capability report to the UE connected thereto in operation 3803. After that, the ENB is capable of receiving the capability report message from the UE in operation 3805. For example, the capability report enquiring control message can include a UECapabilityEnquiry message of the RRC layer. The report message can include a UECapabilityInformation message of the RRC layer.

The ENB is capable of determining whether the UE supports an unlicensed band, based on the received capability report message, in operation 3807. When the UE has a capability supporting an unlicensed band in operation 3807, the ENB is capable of transmitting, to the UE, a control message instructing the UE to measure the unlicensed band, via a licensed band in operation 3809. The ENB is capable of receiving, from the UE, the reception acknowledgement indicating that the measurement instructing control message has been received in operation 3811. The instruction message and the acknowledgement message can be an RRCConnectionReconfiguration message and an RRCConnectionReconfigurationComplete message, respectively. For a licensed band, the measurement instructing control message can include EARFCN information as described above referring to FIG. 36. For an unlicensed band, the measurement instructing control message can include EARFCN information and duplex mode for a corresponding frequency as described above referring to FIG. 36. For an unlicensed band, the measurement instructing control message can further include at least one of the following: a PCI range, LBT (e.g., LBE or FBE, and parameter values related to duplex mode), D-RS configuration information, a condition as to whether the transmission of a D-RS follows LBT, etc., as describe above referring to FIG. 36.

After that, the ENB is capable of receiving a control message containing the measurement result from the UE via a licensed band in operation 3813. After receiving the control message from the UE, the ENB is capable of determining whether it needs to add (release) the reported cell to the UE, and then adding (or releasing) the unlicensed band cell to the UE based on the determination. Alternatively, after the ENB checks the distribution of cells of other operators and the same operators, distributed according to frequencies, by using the information, it is capable of moving a cell, using an unlicensed band frequency and currently under the control of the ENB, to another unlicensed band frequency, or activating a cell of a new unlicensed band frequency.

Figure 39:
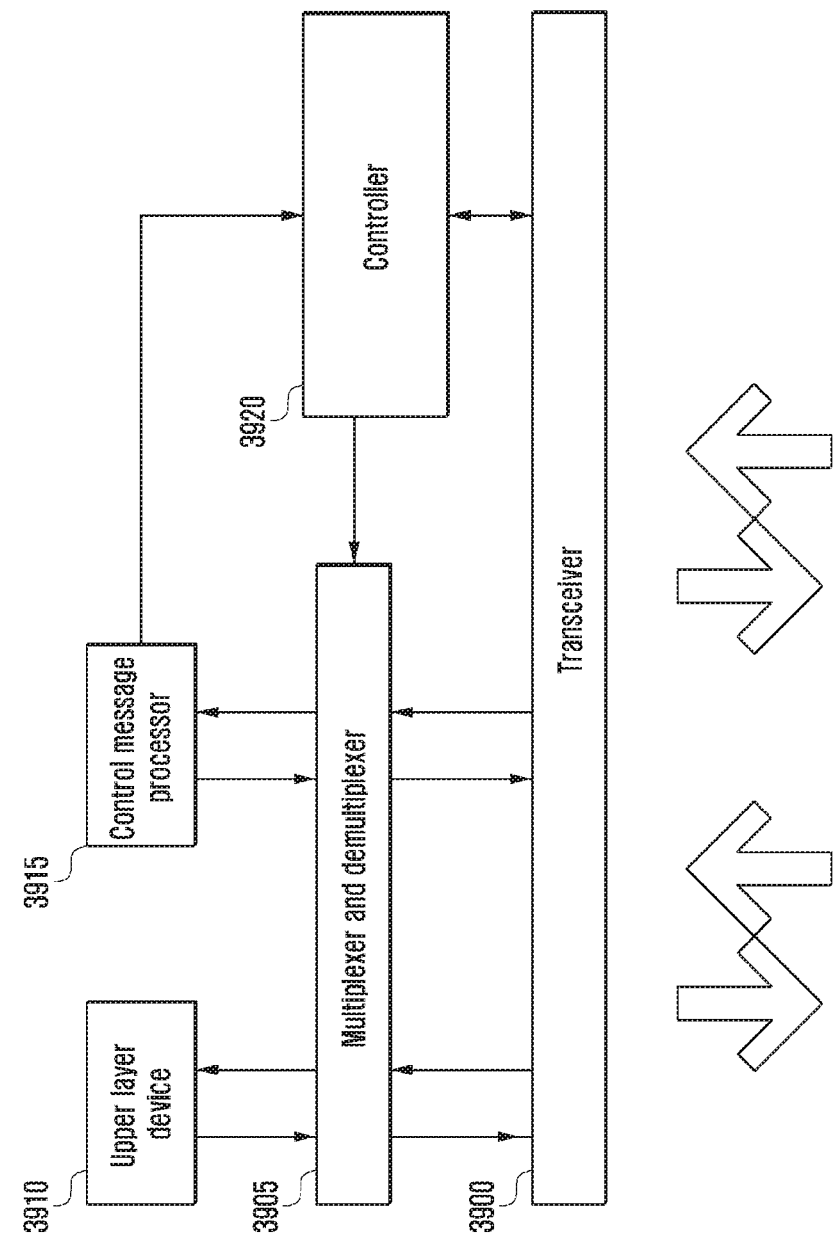
FIG. 39 is a diagram showing the configuration of UE according to a fifth embodiment of the present disclosure.

FIG. 39 is a diagram showing the configuration of UE according to a fifth embodiment of the present disclosure.

Referring to FIG. 39, the UE is capable of including at least one of the following: a transceiver 3900, a multiplexer and demultiplexer 3905, an upper layer device 3910, a control message processor 3915 and a controller 3920. In another example, UE can include a communication module (e.g., a transceiver) and at least one processor (e.g., a multiplexer and demultiplexer, an upper layer device, a control message processor, and a controller).

The UE performs transmission/reception of data, etc., via the upper layer device 3910. The UE performs transmission/reception of control messages via the control message processor 3915. When the UE transmits a control signal or data to an ENB, the controller 3920 controls: the multiplexer 3905 to multiplex data; and the transmitter 3900 to transmit the processed data. When the UE receives a signal or data, the controller 3920 controls: the receiver 3900 to receive physical signals; and the demultiplexer 3905 to de-multiplex the received signal, and transfers the processed signal to the upper layer 3910 or the control message processor 1215, according to information in the individual messages. For example, the messages of the RRC layer correspond to control messages.

Meanwhile, although the embodiment of the UE is implemented in such a way to include a number of blocks that perform different functions, it should be understood that the embodiment is an example and the present disclosure is not limited thereto. For example, the embodiment can be modified in such a way that the function of the demultiplexer 3905 is performed by the controller 3920.

The controller 3920 of the UE according to an embodiment of the present disclosure is capable of: receiving a control message from an ENB; reporting the capability according to the instruction of the ENB; measuring a configured licensed or unlicensed band according to the instruction of the ENB; creating a measurement result message according to a preset condition, via the control message processor; and transmitting the crated message to the ENB.

Figure 40:
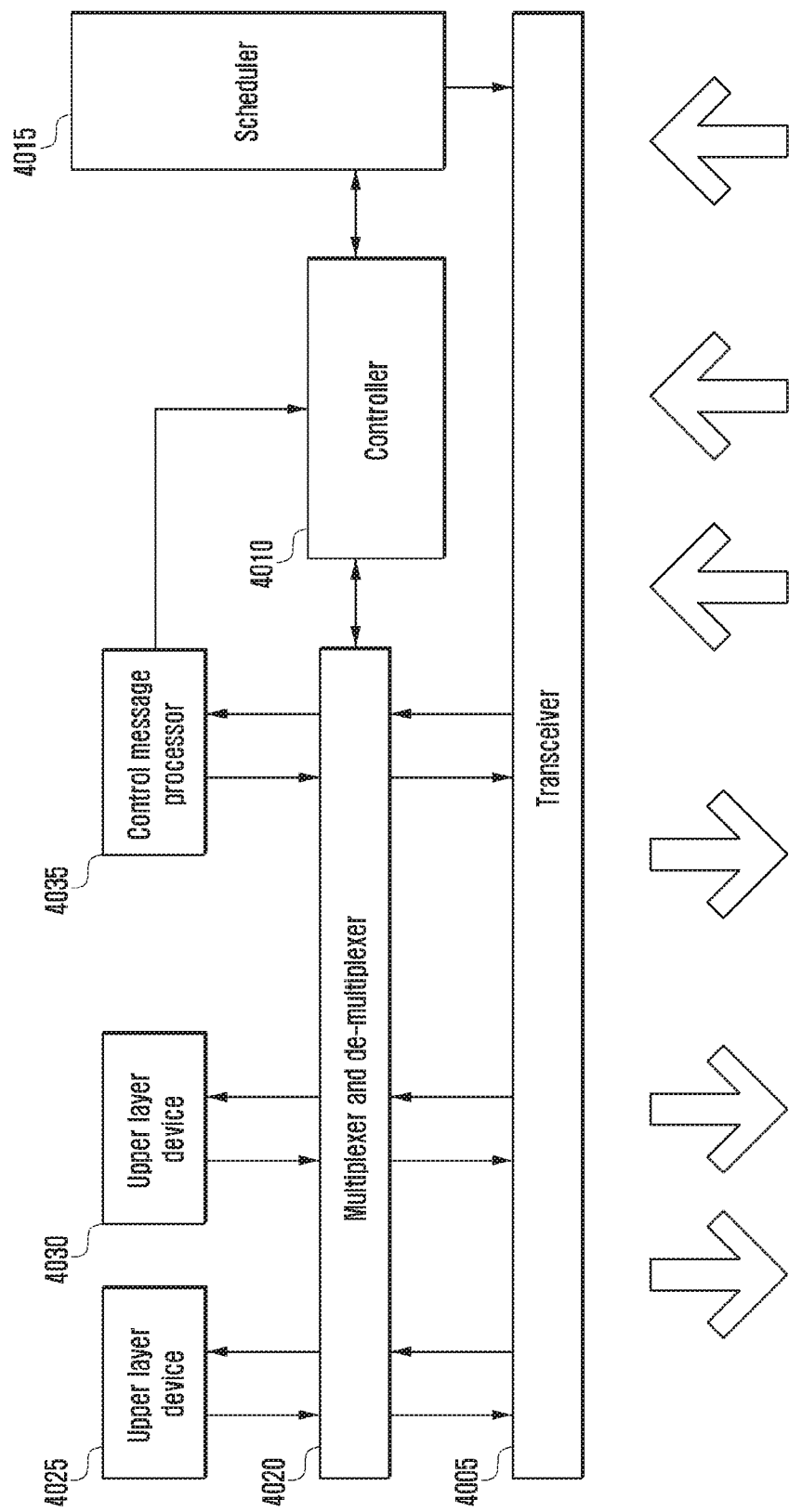
FIG. 40 is a diagram showing the configuration of ENB according to a fifth embodiment of the present disclosure.

FIG. 40 is a diagram showing the configuration of ENB according to a fifth embodiment of the present disclosure.

As shown in FIG. 40, the ENB is capable of including a transceiver 4005, a controller 4010, a multiplexer and demultiplexer 4020, a control message processor 4035, upper layer devices 4025 and 4030, and a scheduler 4015. In another example, ENB can include a communication module (e.g., a transceiver) and at least one processor (e.g., a multiplexer and demultiplexer, an upper layer device, a control message processor, a controller and a scheduler).

The transceiver 4005 is capable of transmitting data and control signals via the forward carriers and receiving data and control signals via the reverse carriers. When a number of carriers are set, the transceiver 4005 is capable of transmitting and receiving data and control signals via the carriers. The multiplexer and demultiplexer 4020 is capable of multiplexing data from the control message processor 4035 or the upper layer devices 4025 and 4030 or de-multiplexing data from the transceiver 4005 to transfer the processed data to the control message processor 4035, the upper layer devices 4025 and 4030 or the controller 4010. The control message processor 4035 is capable of processing control messages from the UE and performing corresponding operations. The control message processor 1335 is also capable of creating control messages to be transmitted to the UE and transferring them to the lower layer.

The upper layer devices 4030 and 4025 can be configured according to types of services by types of UE. The upper layer devices 4030 and 1405 are capable of processing data, created from user services such as File Transfer Protocol (FTP) or Voice over Internet Protocol (VoIP) services, and transferring them to the multiplexer and demultiplexer 4020. The upper layer devices 4030 and 4025 are also capable of processing data, from the multiplexer and demultiplexer 4020, and transferring them to the service applications of the upper layers. The scheduler 4015 allocates transmission resources to UE at a proper time point, considering the buffer state, channel state, active state, etc., of the UE. The scheduler 4015 processes: a signal transmitted from UE; or a signal to be transmitted to UE.

The controller 4010 of the ENB according to an embodiment of the present disclosure is capable of: creating controls message; transmitting the control messages to UE; enquiring the capability of the UE; receiving the capability information from the UE; configuring measurement to the UE, based on to the UE capability; receiving the measurement result report from the UE; and processing the measurement result.

As described above, an embodiment of the present disclosure is capable of configuring PUCCH SCell groups and reporting TYPE 2 headroom information regarding PUCCH SCell in a wireless communication system supporting carrier aggregation.

Another embodiment of the present disclosure is capable of enabling UE to make a measurement report in various modes in a wireless communication system supporting carrier aggregation.

Another embodiment of the present disclosure is capable of controlling the activation and deactivation of PUCCH SCell in a wireless communication system supporting carrier aggregation.

Another embodiment of the present disclosure is capable of performing DRX operations for coverage extension of machine type communication (MTC) devices.

Another embodiment of the present disclosure is capable of using unlicensed band cells, when employing licensed assisted access (LAA) in a wireless communication system supporting carrier aggregation.

The methods according to embodiments described in the claims or description can be implemented with hardware, software, and a combination thereof. When the methods are implemented with software, a computer-readable storage media where one or more programs (software modules) are stored is provided. One or more programs stored in the computer-readable storage media are configured for execution by one or more processors in the electronic devices. One or more programs include instructions for enabling the electronic device to execute the methods according to embodiments described in the claims or in the description. These programs (software modules and software) are stored in: Random Access Memory (RAM), flash memory, non-volatile memory, Read Only Memory (ROM), Electrically Erasable Programmable Read Only Memory (EEPROM), magnetic disc storage device, Compact Disc-ROM (CD-ROM), Digital Versatile Discs (DVDs) or other types of optical storage device, magnetic cassette, etc. or a combination thereof. In addition, two or more of the same type of memories form a memory block. In addition, the programs may also be stored in an attachable storage device accessible through a communication network, such as Internet, Intranet, Local Area Network (LAN), Wide Area Network (WAN), Storage Area Network (SAN) or a combination thereof. This storage device may be connected to the apparatus according to the present disclosure via external ports. In addition, a separate storage device of a communication network may be connected to the apparatus according to the present disclosure.

The terms as used in various embodiments of the present disclosure are merely for the purpose of describing particular embodiments and are not intended to limit the present disclosure. Singular forms are intended to include plural forms unless the context clearly indicates otherwise.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method by a terminal in a wireless communication system, the method comprising:
   receiving, from a base station, a control message for adding one or more secondary cells (SCells) of the base station, wherein physical uplink control channel (PUCCH) feedback for at least one of the one or more SCells is transmitted on a PUCCH SCell among the one or more SCells in case that the control message includes first information for the at least one of the one or more SCells indicating that the PUCCH feedback for the at least one of the one or more SCells is transmitted on the PUCCH SCell, and wherein one of the one or more SCells is configured to the PUCCH SCell on which the PUCCH feedback for the at least one of the one or more SCells is transmitted in case that the control message includes second information indicating that the one of the one or more SCells is the PUCCH SCell;
   identifying whether the PUCCH SCell is configured and is activated;
   transmitting, to the base station, a message including Type 2 power headroom information for a primary cell (PCell) and Type 2 power headroom information for the PUCCH SCell in case that the PUCCH SCell is configured and is activated; and
   transmitting, to the base station, a message including Type 2 power headroom information for the PCell and not including the Type 2 power headroom information for the PUCCH SCell in case that the PUCCH SCell is configured and is not activated,
   wherein the PUCCH feedback for the at least one of the one or more SCells is transmitted on the PCell of the base station in case that the first information for the at least one of the one or more SCells is not included in the control message.

2. The method of claim 1, wherein the first information for the at least one of the one or more SCells is included in the control message, in case that the PUCCH feedback for the at least one of the one or more SCells is not transmitted on the PCell and the PUCCH SCell is used to transmit the PUCCH feedback for the at least one of the one or more SCells.

3. The method of claim 1, wherein the Type 2 power headroom information for the PUCCH SCell is based on a difference between a maximum transmission power of the terminal in the PUCCH SCell and a transmission power required for transmissions of physical uplink shared channel (PUSCH) and PUCCH.

4. The method of claim 1, wherein the message further includes information regarding a maximum transmission power of the terminal in the PUCCH SCell,
   the message further includes a bitmap indicating a presence of power headroom information per SCell,
   a size of the bitmap is determined based on a number of SCells configured with an uplink, and the size of the bitmap is one octet in case that the number of SCells configured with the uplink is less than 8, and the size of the bitmap is larger than one octet in case that the number of SCells configured with the uplink is larger than or equal to 8.

5. A method by a base station in a wireless communication system, the method comprising:

transmitting to a terminal, a control message for adding one or more secondary cells (SCells) of the base station, wherein physical uplink control channel (PUCCH) feedback for at least one of the one or more SCells is transmitted on a PUCCH SCell among the one or more SCells in case that the control message includes first information for the at least one of the one or more SCells indicating that the PUCCH feedback for the at least one of the one or more SCells is transmitted on the PUCCH SCell, and wherein one of the one or more SCells is configured to the PUCCH SCell on which the PUCCH feedback for the at least one of the one or more SCells is transmitted in case that the control message includes second information indicating that the one of the one or more SCells is the PUCCH SCell;

receiving, from the terminal, a message including Type 2 power headroom information for a primary cell (PCell) and Type 2 power headroom information for the PUCCH SCell in case that the PUCCH SCell is configured and is activated; and receiving, from the terminal, a message including Type 2 power headroom information for the PCell and not including the Type 2 power headroom information for the PUCCH SCell in case that the PUCCH SCell is configured and is not activated, wherein the PUCCH feedback for the at least one of the one or more SCells is received on the PCell of the base station in case that the first information for the at least one of the one or more SCells is not included in the control message.

6. The method of claim 5, wherein the first information for the at least one of the one or more SCells is included in the control message, in case that the PUCCH feedback for the at least one of the one or more SCells is not transmitted on a the PCell and the PUCCH SCell is used to transmit the PUCCH feedback for the at least one of the one or more SCells.

7. The method of claim 5, wherein the Type 2 power headroom information for the PUCCH SCell is based on a difference between a maximum transmission power of the terminal in the PUCCH SCell and a transmission power required for transmissions of physical uplink shared channel (PUSCH) and PUCCH.

8. The method of claim 5, wherein the message further includes information regarding a maximum transmission power of the terminal in the PUCCH SCell, the message further includes a bitmap indicating a presence of power headroom information per SCell, a size of the bitmap is determined based on a number of SCells configured with an uplink, and the size of the bitmap is one octet in case that the number of SCells configured with the uplink is less than 8, and the size of the bitmap is larger than one octet in case that the number of SCells configured with the uplink is larger than or equal to 8.

9. A terminal in a wireless communication system, the terminal comprising:

a transceiver; and a controller configured to:

control the transceiver to receive, from a base station, a control message for adding one or more secondary cells (SCells) of the base station, wherein physical uplink control channel (PUCCH) feedback for at least one of the one or more SCells is transmitted on a PUCCH SCell among the one or more SCells in case that the control message includes first information for the at least one of the one or more SCells indicating that the PUCCH feedback for the at least one of the one or more SCells is transmitted on the PUCCH SCell, and wherein one of the one or more SCells is configured to the PUCCH SCell on which the PUCCH feedback for the at least one of the one or more SCells is transmitted in case that the control message includes second information indicating that the one of the one or more SCells is the PUCCH SCell, identify whether the PUCCH SCell is configured and is activated, control the transceiver to transmit, to the base station, a message including Type 2 power headroom information for a primary cell (PCell) and Type 2 power headroom information for the PUCCH SCell in case that the PUCCH SCell is configured and is activated, and control the transceiver to transmit, to the base station, a message including Type 2 power headroom information for the PCell and not including the Type 2 power headroom information for the PUCCH SCell in case that the PUCCH SCell is configured and is not activated, wherein the PUCCH feedback for the at least one of the one or more SCells is transmitted on the PCell of the base station in case that the first information for the at least one of the one or more SCells is not included in the control message.

10. The terminal of claim 9, wherein the first information for the at least one of the one or more SCells is included in the control message, in case that the PUCCH feedback for the at least one of the one or more SCells is not transmitted on and the PUCCH SCell is used to transmit the PUCCH feedback for the at least one of the one or more SCells.

11. The terminal of claim 9, wherein the Type 2 power headroom information for the PUCCH SCell is based on a difference between a maximum transmission power of the terminal in the PUCCH SCell and a transmission power required for transmissions of physical uplink shared channel (PUSCH) and PUCCH.

12. The terminal of claim 9, wherein the message further includes information regarding a maximum transmission power of the terminal in the PUCCH SCell, the message further includes a bitmap indicating a presence of power headroom information per SCell, a size of the bitmap is determined based on a number of SCells configured with an uplink, and the size of the bitmap is one octet in case that the number of SCells configured with the uplink is less than 8, and the size of the bitmap is larger than one octet in case that the number of SCells configured with the uplink is larger than or equal to 8.

13. A base station in a wireless communication system, the base station comprising:
a transceiver; and
a controller configured to:
control the transceiver to transmit, to a terminal, a control message for adding one or more secondary cells (SCells) of the base station, wherein physical uplink control channel (PUCCH) feedback for at least one of the one or more SCells is transmitted on a PUCCH SCell among the one or more SCells in case that the control message includes first information for the at least one of the one or more SCells indicating that the PUCCH feedback for the at least one of the one or more SCells is transmitted on the PUCCH SCell, and wherein one of the one or more SCells is configured the PUCCH SCell on which the PUCCH feedback for the at least one of the one or more SCells is transmitted in case that the control message includes second information indicating that the one of the one or more SCells is the PUCCH SCell,
control the transceiver to receive, from the terminal, a message including Type 2 power headroom information for a primary cell (PCell) and Type 2 power headroom information for the PUCCH SCell in case that the PUCCH SCell is configured and is activated, and
control the transceiver to receive, from the terminal, a message including Type 2 power headroom information for the PCell and not including the Type 2 power headroom information for the PUCCH SCell in case that the PUCCH SCell is configured and is not activated,
wherein the PUCCH feedback for the at least one of the one or more SCells is received on a primary cell (PCell) of the base station in case that the first information for the at least one of the one or more SCells is not included in the control message.

14. The base station of claim 13, wherein the first information for the at least one of the one or more SCells is included in the control message, in case that the PUCCH feedback for the at least one of the one or more SCells is not transmitted on the PCell and the PUCCH SCell is used to transmit the PUCCH feedback for the at least one of the one or more SCells.

15. The base station of claim 13, wherein the Type 2 power headroom information for the PUCCH SCell is based on a difference between a maximum transmission power of the terminal in the PUCCH SCell and a transmission power required for transmissions of physical uplink shared channel (PUSCH) and PUCCH.

16. The base station of claim 13, wherein the message further includes information regarding a maximum transmission power of the terminal in the PUCCH SCell,
the message further includes a bitmap indicating a presence of power headroom information per SCell,
a size of the bitmap is determined based on a number of SCells configured with an uplink, and
the size of the bitmap is one octet in case that the number of SCells configured with the uplink is less than 8, and the size of the bitmap is larger than one octet in case that the number of SCells configured with the uplink is larger than or equal to 8.

* * * * *